(12) United States Patent
Akmal et al.

(10) Patent No.: US 12,321,666 B2
(45) Date of Patent: Jun. 3, 2025

(54) METHODS FOR QUICK MESSAGE RESPONSE AND DICTATION IN A THREE-DIMENSIONAL ENVIRONMENT

(71) Applicant: Apple Inc., Cupertino, CA (US)

(72) Inventors: Shiraz Akmal, Playa Vista, CA (US); Brad K. Herman, Culver City, CA (US); Garrett L. Weinberg, Santa Cruz, CA (US); St. John W. Colon, Los Angeles, CA (US); Viraaj M. Marathe, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 18/295,137

(22) Filed: Apr. 3, 2023

(65) Prior Publication Data

US 2023/0315385 A1    Oct. 5, 2023

Related U.S. Application Data

(60) Provisional application No. 63/362,455, filed on Apr. 4, 2022.

(51) Int. Cl.
*G06F 3/16* (2006.01)
*G10L 15/22* (2006.01)
*G10L 15/26* (2006.01)

(52) U.S. Cl.
CPC .............. *G06F 3/167* (2013.01); *G10L 15/22* (2013.01); *G10L 15/26* (2013.01); *G10L 2015/223* (2013.01); *G10L 2015/225* (2013.01)

(58) Field of Classification Search
CPC .......... G06F 3/167; G06F 3/011; G06F 3/012; G06F 3/013; G06F 3/016; G06F 3/017; G06F 3/04815; G06F 3/04817; G06F 3/0482; G06F 3/04842; G10L 15/22; G10L 15/26; G10L 2015/223; G10L 2015/225

See application file for complete search history.

(56) References Cited

U.S. PATENT DOCUMENTS

| | | |
|---|---|---|
| 1,173,824 A | 2/1916 | Mckee |
| 5,515,488 A | 5/1996 | Hoppe et al. |

(Continued)

FOREIGN PATENT DOCUMENTS

| | | |
|---|---|---|
| CA | 3033344 A1 | 2/2018 |
| CN | 104714771 A | 6/2015 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.

(Continued)

*Primary Examiner* — Cao H Nguyen
(74) *Attorney, Agent, or Firm* — Kubota & Basol LLP

(57) ABSTRACT

In some embodiments, a computer system facilitates user input for sending a quick message to a respective user based on speech input provided by a user of the computer system in the three-dimensional environment. In some embodiments, a computer system facilitates user input for sending an audio message including an animated representation of the user of the computer system to a respective user based on speech input provided by the user.

87 Claims, 34 Drawing Sheets

(56) References Cited

U.S. PATENT DOCUMENTS

| | | |
|---|---|---|
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,756,997 B1 | 6/2004 | Ward et al. |
| 7,035,903 B1 | 4/2006 | Baldonado |
| 7,134,130 B1 | 11/2006 | Thomas |
| 7,137,074 B1 | 11/2006 | Newton et al. |
| 7,230,629 B2 | 6/2007 | Reynolds et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,706,579 B2 | 4/2010 | Oijer |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,341,541 B2 | 12/2012 | Holecek et al. |
| 8,381,135 B2 | 2/2013 | Hotelling et al. |
| 8,593,558 B2 | 11/2013 | Gardiner et al. |
| 8,724,856 B1 | 5/2014 | King |
| 8,793,620 B2 | 7/2014 | Stafford |
| 8,793,729 B2 | 7/2014 | Adimatyam et al. |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,185,062 B1 | 11/2015 | Yang et al. |
| 9,189,611 B2 | 11/2015 | Wssingbo |
| 9,201,500 B2 | 12/2015 | Srinivasan et al. |
| 9,256,785 B2 | 2/2016 | Qvarfordt |
| 9,316,827 B2 | 4/2016 | Lindley et al. |
| 9,348,458 B2 | 5/2016 | Hotelling et al. |
| 9,400,559 B2 | 7/2016 | Latta et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,829,708 B1 | 11/2017 | Asada |
| 9,851,866 B2 | 12/2017 | Goossens et al. |
| 9,864,498 B2 | 1/2018 | Olsson et al. |
| 9,886,087 B1 | 2/2018 | Wald et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 10,049,460 B2 | 8/2018 | Romano et al. |
| 10,203,764 B2 | 2/2019 | Katz et al. |
| 10,307,671 B2 | 6/2019 | Barney et al. |
| 10,353,532 B1 | 7/2019 | Holz et al. |
| 10,394,320 B2 | 8/2019 | George-Svahn et al. |
| 10,431,216 B1 | 10/2019 | Lemon et al. |
| 10,530,731 B1 | 1/2020 | Wu et al. |
| 10,534,439 B2 | 1/2020 | Raffa et al. |
| 10,565,448 B2 | 2/2020 | Bell et al. |
| 10,664,048 B2 | 5/2020 | Cieplinski et al. |
| 10,664,050 B2 | 5/2020 | Alcaide et al. |
| 10,678,403 B2 | 6/2020 | Duarte et al. |
| 10,699,488 B1 | 6/2020 | Terrano |
| 10,732,721 B1 | 8/2020 | Clements |
| 10,754,434 B2 | 8/2020 | Hall et al. |
| 10,768,693 B2 | 9/2020 | Powderly et al. |
| 10,861,242 B2 | 12/2020 | Lacey et al. |
| 10,890,967 B2 | 1/2021 | Stellmach et al. |
| 10,956,724 B1 | 3/2021 | Terrano |
| 10,983,663 B2 | 4/2021 | Iglesias |
| 11,055,920 B1 | 7/2021 | Bramwell et al. |
| 11,079,995 B1 | 8/2021 | Hulbert et al. |
| 11,082,463 B2 | 8/2021 | Felman |
| 11,112,875 B1 | 9/2021 | Zhou et al. |
| 11,199,898 B2 | 12/2021 | Blume et al. |
| 11,200,742 B1 | 12/2021 | Post et al. |
| 11,232,643 B1 | 1/2022 | Stevens et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,348,300 B2 | 5/2022 | Zimmermann et al. |
| 11,461,973 B2 | 10/2022 | Pinchon |
| 11,496,571 B2 | 11/2022 | Berliner et al. |
| 11,573,363 B2 | 2/2023 | Zou et al. |
| 11,574,452 B2 | 2/2023 | Berliner et al. |
| 11,720,171 B2 | 8/2023 | Pastrana Vicente et al. |
| 11,726,577 B2 | 8/2023 | Katz |
| 11,733,824 B2 | 8/2023 | Iskandar et al. |
| 11,762,457 B1 | 9/2023 | Ikkai et al. |
| 11,765,114 B2 * | 9/2023 | Jon .................. H04L 51/10 709/206 |
| 12,099,653 B2 | 9/2024 | Chawda et al. |
| 12,099,695 B1 | 9/2024 | Smith et al. |
| 12,113,948 B1 | 10/2024 | Smith et al. |
| 12,118,200 B1 | 10/2024 | Shutzberg et al. |
| 2001/0047250 A1 | 11/2001 | Schuller et al. |
| 2002/0015024 A1 | 2/2002 | Westerman et al. |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0243926 A1 | 12/2004 | Trenbeath et al. |
| 2005/0044510 A1 | 2/2005 | Yi |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0080702 A1 | 4/2006 | Diez et al. |
| 2006/0156228 A1 | 7/2006 | Gallo et al. |
| 2006/0256083 A1 | 11/2006 | Rosenberg |
| 2006/0283214 A1 | 12/2006 | Donadon et al. |
| 2007/0259716 A1 | 11/2007 | Mattice et al. |
| 2008/0181502 A1 | 7/2008 | Yang |
| 2008/0211771 A1 | 9/2008 | Richardson |
| 2009/0064035 A1 | 3/2009 | Shibata et al. |

(56) References Cited

U.S. PATENT DOCUMENTS

| | | |
|---|---|---|
| 2009/0146779 A1 | 6/2009 | Kumar et al. |
| 2009/0164219 A1 | 6/2009 | Yeung et al. |
| 2009/0231356 A1 | 9/2009 | Barnes et al. |
| 2010/0097375 A1 | 4/2010 | Tadaishi et al. |
| 2010/0150526 A1 | 6/2010 | Rose et al. |
| 2010/0177049 A1 | 7/2010 | Levy et al. |
| 2010/0188503 A1 | 7/2010 | Tsai et al. |
| 2010/0269145 A1 | 10/2010 | Ingrassia et al. |
| 2011/0018895 A1 | 1/2011 | Buzyn et al. |
| 2011/0018896 A1 | 1/2011 | Buzyn et al. |
| 2011/0098029 A1 | 4/2011 | Rhoads et al. |
| 2011/0156879 A1 | 6/2011 | Matsushita et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0254865 A1 | 10/2011 | Yee et al. |
| 2011/0310001 A1 | 12/2011 | Madau et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0113223 A1 | 5/2012 | Hilliges et al. |
| 2012/0124525 A1 | 5/2012 | Kang |
| 2012/0131631 A1 | 5/2012 | Bhogal et al. |
| 2012/0151416 A1 | 6/2012 | Bell et al. |
| 2012/0170840 A1 | 7/2012 | Caruso et al. |
| 2012/0184372 A1 | 7/2012 | Laarakkers et al. |
| 2012/0218395 A1 | 8/2012 | Andersen et al. |
| 2012/0256967 A1 | 10/2012 | Baldwin et al. |
| 2012/0257035 A1 | 10/2012 | Larsen |
| 2012/0272179 A1 | 10/2012 | Stafford |
| 2013/0027860 A1 | 1/2013 | Masaki et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0211843 A1 | 8/2013 | Clarkson |
| 2013/0229345 A1 | 9/2013 | Day et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0326364 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0024324 A1 | 1/2014 | Mumick |
| 2014/0028548 A1 | 1/2014 | Bychkov et al. |
| 2014/0049462 A1 | 2/2014 | Weinberger et al. |
| 2014/0068692 A1 | 3/2014 | Archibong et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0126782 A1 | 5/2014 | Takai et al. |
| 2014/0132499 A1 | 5/2014 | Schwesinger et al. |
| 2014/0139426 A1 | 5/2014 | Kryze et al. |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0247210 A1 | 9/2014 | Henderek et al. |
| 2014/0258942 A1 | 9/2014 | Kutliroff et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0304612 A1 | 10/2014 | Collin |
| 2014/0320404 A1 | 10/2014 | Kasahara |
| 2014/0347391 A1 | 11/2014 | Keane et al. |
| 2014/0351753 A1 | 11/2014 | Shin et al. |
| 2014/0372957 A1 | 12/2014 | Keane et al. |
| 2015/0009118 A1 | 1/2015 | Thomas et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0123890 A1 | 5/2015 | Kapur et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0177937 A1 | 6/2015 | Poletto et al. |
| 2015/0187093 A1 | 7/2015 | Chu et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0227285 A1 | 8/2015 | Lee et al. |
| 2015/0242095 A1 | 8/2015 | Sonnenberg |
| 2015/0255067 A1 | 9/2015 | White et al. |
| 2015/0287403 A1 | 10/2015 | Holzer Zaslansky et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0133052 A1 | 5/2016 | Choi et al. |
| 2016/0171304 A1 | 6/2016 | Golding et al. |
| 2016/0179336 A1 | 6/2016 | Ambrus et al. |
| 2016/0196692 A1 | 7/2016 | Kjallstrom et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0350973 A1 | 12/2016 | Shapira et al. |
| 2016/0357266 A1 | 12/2016 | Patel et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0228130 A1 | 8/2017 | Palmaro |
| 2017/0236332 A1 | 8/2017 | Kipman et al. |
| 2017/0285737 A1 | 10/2017 | Khalid et al. |
| 2017/0308163 A1 | 10/2017 | Cieplinski et al. |
| 2017/0315715 A1 | 11/2017 | Fujita et al. |
| 2017/0344223 A1 | 11/2017 | Holzer et al. |
| 2017/0357390 A1 | 12/2017 | Alonso Ruiz et al. |
| 2017/0358141 A1 | 12/2017 | Stafford et al. |
| 2017/0364198 A1 | 12/2017 | Yoganandan et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0101223 A1 | 4/2018 | Ishihara et al. |
| 2018/0114364 A1 | 4/2018 | Mcphee et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0181199 A1 | 6/2018 | Harvey et al. |
| 2018/0188802 A1 | 7/2018 | Okumura |

(56) References Cited

U.S. PATENT DOCUMENTS

| | | |
|---|---|---|
| 2018/0210628 A1 | 7/2018 | Mcphee et al. |
| 2018/0239144 A1 | 8/2018 | Woods et al. |
| 2018/0275753 A1 | 9/2018 | Publicover et al. |
| 2018/0288206 A1 | 10/2018 | Stimpson et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0018498 A1 | 1/2019 | West et al. |
| 2019/0034076 A1 | 1/2019 | Vinayak et al. |
| 2019/0050062 A1 | 2/2019 | Chen et al. |
| 2019/0080572 A1 | 3/2019 | Kim et al. |
| 2019/0088149 A1 | 3/2019 | Fink et al. |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1 | 5/2019 | Hodge |
| 2019/0146128 A1 | 5/2019 | Cao et al. |
| 2019/0172261 A1 | 6/2019 | Alt et al. |
| 2019/0204906 A1 | 7/2019 | Ross et al. |
| 2019/0227763 A1 | 7/2019 | Kaufthal |
| 2019/0251884 A1 | 8/2019 | Burns et al. |
| 2019/0258365 A1 | 8/2019 | Zurmoehle et al. |
| 2019/0279407 A1 | 9/2019 | Mchugh et al. |
| 2019/0294312 A1 | 9/2019 | Rohrbacher |
| 2019/0310757 A1 | 10/2019 | Lee et al. |
| 2019/0324529 A1 | 10/2019 | Stellmach et al. |
| 2019/0332244 A1 | 10/2019 | Beszteri et al. |
| 2019/0339770 A1 | 11/2019 | Kurlethimar et al. |
| 2019/0346678 A1 | 11/2019 | Nocham |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0026349 A1 | 1/2020 | Fontanel et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0128232 A1 | 4/2020 | Hwang et al. |
| 2020/0129850 A1 | 4/2020 | Ohashi |
| 2020/0159017 A1 | 5/2020 | Lin et al. |
| 2020/0225735 A1 | 7/2020 | Schwarz |
| 2020/0225746 A1 | 7/2020 | Bar-Zeev et al. |
| 2020/0225747 A1 | 7/2020 | Bar-Zeev et al. |
| 2020/0225830 A1 | 7/2020 | Tang et al. |
| 2020/0226814 A1 | 7/2020 | Tang et al. |
| 2020/0285314 A1 | 9/2020 | Cieplinski et al. |
| 2020/0356221 A1 | 11/2020 | Behzadi et al. |
| 2020/0357374 A1 | 11/2020 | Verweij et al. |
| 2020/0371673 A1 | 11/2020 | Faulkner |
| 2020/0387228 A1 | 12/2020 | Ravasz et al. |
| 2020/0387287 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0103333 A1 | 4/2021 | Cieplinski et al. |
| 2021/0125414 A1 | 4/2021 | Berkebile |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0352172 A1 | 11/2021 | Kim et al. |
| 2021/0375022 A1 | 12/2021 | Lee et al. |
| 2021/0407506 A1* | 12/2021 | Drummond ............. G10L 15/26 |
| 2022/0011855 A1 | 1/2022 | Hazra et al. |
| 2022/0012002 A1 | 1/2022 | Bar-Zeev et al. |
| 2022/0030197 A1 | 1/2022 | Ishimoto |
| 2022/0070241 A1 | 3/2022 | Yerli |
| 2022/0083197 A1 | 3/2022 | Rockel et al. |
| 2022/0092862 A1 | 3/2022 | Faulkner et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0229524 A1 | 7/2022 | Mckenzie et al. |
| 2022/0229534 A1 | 7/2022 | Terre et al. |
| 2022/0245888 A1 | 8/2022 | Singh et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0317776 A1 | 10/2022 | Sundstrom et al. |
| 2022/0326837 A1 | 10/2022 | Dessero et al. |
| 2022/0365595 A1 | 11/2022 | Cieplinski et al. |
| 2022/0413691 A1 | 12/2022 | Becker et al. |
| 2023/0004216 A1 | 1/2023 | Rodgers et al. |
| 2023/0008537 A1 | 1/2023 | Henderson et al. |
| 2023/0021861 A1 | 1/2023 | Fujiwara et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0092282 A1 | 3/2023 | Boesel et al. |
| 2023/0093979 A1 | 3/2023 | Stauber et al. |
| 2023/0100689 A1 | 3/2023 | Chiu et al. |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0206921 A1 | 6/2023 | Edelsburg et al. |
| 2023/0244857 A1 | 8/2023 | Weiss et al. |
| 2023/0259265 A1 | 8/2023 | Krivoruchko et al. |
| 2023/0273706 A1 | 8/2023 | Smith et al. |
| 2023/0274504 A1 | 8/2023 | Ren et al. |
| 2023/0308610 A1 | 9/2023 | Henderson et al. |
| 2023/0316634 A1 | 10/2023 | Chiu et al. |
| 2023/0325004 A1 | 10/2023 | Burns et al. |
| 2023/0333646 A1 | 10/2023 | Pastrana Vicente et al. |
| 2023/0350539 A1 | 11/2023 | Owen et al. |
| 2023/0359199 A1 | 11/2023 | Adachi et al. |
| 2023/0384907 A1 | 11/2023 | Boesel et al. |
| 2023/0388357 A1 | 11/2023 | Faulkner et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094882 A1 | 3/2024 | Brewer et al. |
| 2024/0095984 A1 | 3/2024 | Ren et al. |
| 2024/0103613 A1 | 3/2024 | Chawda et al. |
| 2024/0103676 A1 | 3/2024 | Pastrana Vicente et al. |
| 2024/0103684 A1 | 3/2024 | Yu et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104873 A1 | 3/2024 | Pastrana Vicente et al. |
| 2024/0104877 A1 | 3/2024 | Henderson et al. |
| 2024/0111479 A1 | 4/2024 | Paul |

(56) References Cited

U.S. PATENT DOCUMENTS

| | | |
|---|---|---|
| 2024/0119682 A1 | 4/2024 | Rudman et al. |
| 2024/0221291 A1 | 7/2024 | Henderson et al. |
| 2024/0272782 A1 | 8/2024 | Pastrana Vicente et al. |
| 2024/0291953 A1 | 8/2024 | Cerra et al. |
| 2024/0310971 A1 | 9/2024 | Kawashima et al. |
| 2024/0361835 A1 | 10/2024 | Hylak et al. |

FOREIGN PATENT DOCUMENTS

| | | |
|---|---|---|
| CN | 105264461 A | 1/2016 |
| CN | 105264478 A | 1/2016 |
| CN | 106575149 A | 4/2017 |
| CN | 108633307 A | 10/2018 |
| CN | 110476142 A | 11/2019 |
| CN | 110673718 A | 1/2020 |
| EP | 0816983 A2 | 1/1998 |
| EP | 1530115 A2 | 5/2005 |
| EP | 2551763 A1 | 1/2013 |
| EP | 2741175 A2 | 6/2014 |
| EP | 2947545 A1 | 11/2015 |
| EP | 3088997 A1 | 11/2016 |
| EP | 3249497 A1 | 11/2017 |
| EP | 3316075 A1 | 5/2018 |
| EP | 3451135 A1 | 3/2019 |
| EP | 3503101 A1 | 6/2019 |
| EP | 3570144 A1 | 11/2019 |
| EP | 3588255 A1 | 1/2020 |
| EP | 3654147 A1 | 5/2020 |
| JP | H06-4596 A | 1/1994 |
| JP | H10-51711 A | 2/1998 |
| JP | H10-78845 A | 3/1998 |
| JP | 2005-215144 A | 8/2005 |
| JP | 2005-333524 A | 12/2005 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-196158 A | 9/2013 |
| JP | 2013-254358 A | 12/2013 |
| JP | 2013-257716 A | 12/2013 |
| JP | 2014-021565 A | 2/2014 |
| JP | 2014-059840 A | 4/2014 |
| JP | 2014-071663 A | 4/2014 |
| JP | 2014-099184 A | 5/2014 |
| JP | 2014-514652 A | 6/2014 |
| JP | 2015-056173 A | 3/2015 |
| JP | 2015-515040 A | 5/2015 |
| JP | 2015-118332 A | 6/2015 |
| JP | 2016-096513 A | 5/2016 |
| JP | 2016-194744 A | 11/2016 |
| JP | 2017-027206 A | 2/2017 |
| JP | 2017-058528 A | 3/2017 |
| JP | 2018-005516 A | 1/2018 |
| JP | 2018-005517 A | 1/2018 |
| JP | 2018-041477 A | 3/2018 |
| JP | 2018-106499 A | 7/2018 |
| JP | 2019-040333 A | 3/2019 |
| JP | 2019-169154 A | 10/2019 |
| JP | 2019-175449 A | 10/2019 |
| JP | 2019-536131 A | 12/2019 |
| JP | 2022-053334 A | 4/2022 |
| KR | 2016-0012139 A | 2/2016 |
| KR | 2019-0100957 A | 8/2019 |
| WO | 2010/026519 A1 | 3/2010 |
| WO | 2011/008638 A1 | 1/2011 |
| WO | 2012/145180 A1 | 10/2012 |
| WO | 2013/169849 A2 | 11/2013 |
| WO | 2014/105276 A1 | 7/2014 |
| WO | 2014/203301 A1 | 12/2014 |
| WO | 2015/195216 A1 | 12/2015 |
| WO | 2017/088487 A1 | 6/2017 |
| WO | 2018/046957 A2 | 3/2018 |
| WO | 2018/175735 A1 | 9/2018 |
| WO | 2019/142560 A1 | 7/2019 |
| WO | 2019/217163 A1 | 11/2019 |
| WO | 2020/066682 A1 | 4/2020 |
| WO | 2021/173839 A1 | 9/2021 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2023/141535 A1 | 7/2023 |

OTHER PUBLICATIONS

Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowability received for U.S. Appl. No. 17/935,095, mailed on Oct. 18, 2024, 3 Pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/182,300, mailed on Feb. 16, 2024, 32 pages.

(56) References Cited

OTHER PUBLICATIONS

Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html >[Search Date Aug. 22, 2023], Sep. 20, 2021, 8 pages (1 page of English Abstract and 7 pages of Official Copy).
International Search Report received for PCT Patent Application No. PCT/US2021/050948, mailed on Mar. 4, 2022, 6 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Non-Final Office Action received for U.S. Appl. No. 18/322,469, mailed on Nov. 15, 2024, 34 pages.
Non-Final Office Action received for U.S. Appl. No. 18/327,318, mailed on Sep. 16, 2024, 13 pages.
Non-Final Office Action received for U.S. Appl. No. 18/336,770, mailed on Jun. 5, 2024, 12 pages.
Non-Final Office Action received for U.S. Appl. No. 18/473,196, mailed on Aug. 16, 2024, 21 pages.
Non-Final Office Action received for U.S. Appl. No. 18/154,757, mailed on Aug. 26, 2024, 12 pages.
Non-Final Office Action received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pags.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.

(56) References Cited

OTHER PUBLICATIONS

Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowanus received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference on Recent Advances In Information Technology (RAIT), Mar. 3, 2016, pp. 489-494.
Grey Melissa, "Comcast's New X2 Platform Moves you DVR Recordings from the Box to the Cloud", Engadget, Available online at: <http://www.engadget.com/2013/06/11/comcast-x2-platform/>, Jun. 11, 2013, 15 pages.
Lin et al., "Towards Naturally Grabbing and Moving Objects in VR", IS&T International Symposium on Electronic Imaging and The Engineering Reality of Virtual Reality, 2016, 6 pages.
McGill et al., "Expanding The Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.

* cited by examiner

1000

1002a: While an environment is visible via a display generation component, detect, via one or more input devices, a first input corresponding to a request to transmit an audio message to a respective user of a second computer system, different from a user of the first computer system, wherein the first input includes speech input from the user of the first computer system

1002b: While detecting the speech input from the user of the first computer system:

1002c: Display, in the environment, a representation associated with the user of the first computer system, wherein the representation is displayed with a facial animation effect that is determined based on facial movements of the user of the first computer system detected while the user is providing the speech input

1002d: Record audio corresponding to the speech input

1002e: While displaying the representation associated with the user of the first computer system and after detecting an end of the speech input:

1002f: In accordance with a determination that a first set of one or more criteria is satisfied, wherein the first set of one or more criteria includes a criterion that is satisfied without detecting input selecting an element to transmit the audio message to the respective user of the second computer system, transmit, to the respective user of the second computer system, information that enables the second computer system to output the audio message including the representation associated with the user and the audio corresponding to the speech input (A)

FIG. 10A

METHODS FOR QUICK MESSAGE RESPONSE AND DICTATION IN A THREE-DIMENSIONAL ENVIRONMENT

CROSS-REFERENCE TO RELATED APPLICATIONS

This application claims the benefit of U.S. Provisional Application No. 63/362,455, filed Apr. 4, 2022, the content of which is incorporated herein by reference in its entirety for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system facilitates user input for sending a quick message to a respective user based on speech input provided by a user of the computer system in the three-dimensional environment. In some embodiments, a computer system facilitates user input for sending an audio message including an animated representation of the user of the computer system to a respective user based on speech input provided by the user.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10E is a flowchart illustrating a method of sending an audio message to a respective user based on speech input provided by a user of the computer system in a three-dimensional environment in accordance with some embodiments.

DESCRIPTION OF EMBODIMENTS

Figure 1:
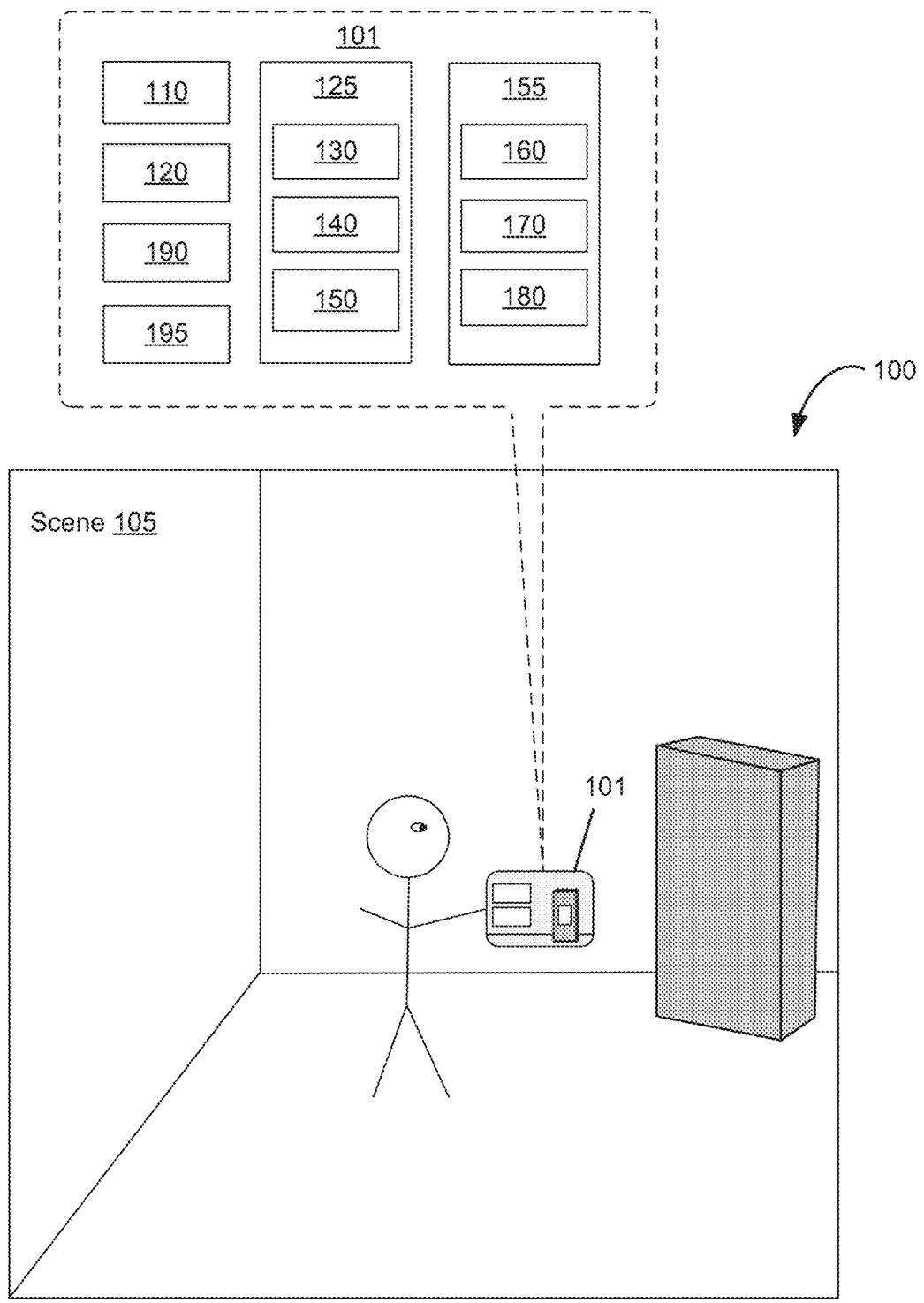
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein provide improved ways for an electronic device to facilitate interaction with and manipulate objects in a three-dimensional environment.

In some embodiments, a computer system displays a three-dimensional environment having a plurality of representations of a plurality of users other than a user of the computer system. In some embodiments, in response to detecting speech input from the user of the computer system while attention of the user is directed toward a first representation of a first user, the computer system displays text representation of the speech input in a message entry region in the three-dimensional environment. In some embodiments, after detecting an end of the speech input, in accordance with a determination that the attention of the user remains directed toward the message entry region for a threshold amount of time, the computer system transmits a message including the text representation of the speech input to the first user. In some embodiments, in accordance with a determination that the user of the computer system has an unread message from a respective user, in response to detecting the attention of the user directed toward a representation of the respective user in the three-dimensional environment, the computer system presents the unread message to the user.

In some embodiments, a computer system displays a three-dimensional environment including a plurality of representations of a plurality of users other than a user of the computer system. In some embodiments, in response to detecting speech input from the user of the computer system while attention of the user is directed toward a respective representation of a respective user of a respective computer system, the computer system displays an animated representation associated with the user of the computer system, wherein the animated representation associated with the user is displayed with a facial animation effect that is based on facial movements of the user detected while the user is providing the speech input, and records audio corresponding to the speech input. In some embodiments, in accordance with a determination that a threshold amount of time has elapsed since detecting an end of the speech input, the computer system transmits information that enables the respective computer system to present an audio message to the respective user including presenting the animated representation associated with the user of the computer system and the audio corresponding to the speech input. In some embodiments, in accordance with a determination that the user of the computer system has an unread audio message from a first user, in response to detecting the attention of the user directed toward a representation of the first user in the three-dimensional environment, the computer system presents the unread audio message to the user.

FIGS. 1-6 provide a description of example computer systems for providing XR experiences to users (such as described below with respect to methods 800 and/or 1000). FIGS. 7A-7G illustrate example techniques for sending a quick message to a respective user based on speech input provided by a user of the computer system in a three-dimensional environment, in accordance with some embodiments. FIGS. 8A-8L is a flow diagram of methods of sending a quick message to a respective user based on speech input provided by a user of the computer system in a three-dimensional environment, in accordance with various embodiments. The user interfaces in FIGS. 7A-7G are used to illustrate the processes in FIGS. 8A-8L. FIGS. 9A-9D illustrate example techniques for sending an audio message to a respective user based on speech input provided by a user of the computer system in a three-dimensional environment, in accordance with some embodiments. FIGS. 10A-10E is a flow diagram of methods of sending an audio message to a respective user based on speech input provided by a user of the computer system in a three-dimensional environment, in accordance with various embodiments. The user interfaces in FIGS. 9A-9D are used to illustrate the processes in FIGS. 10A-10E.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
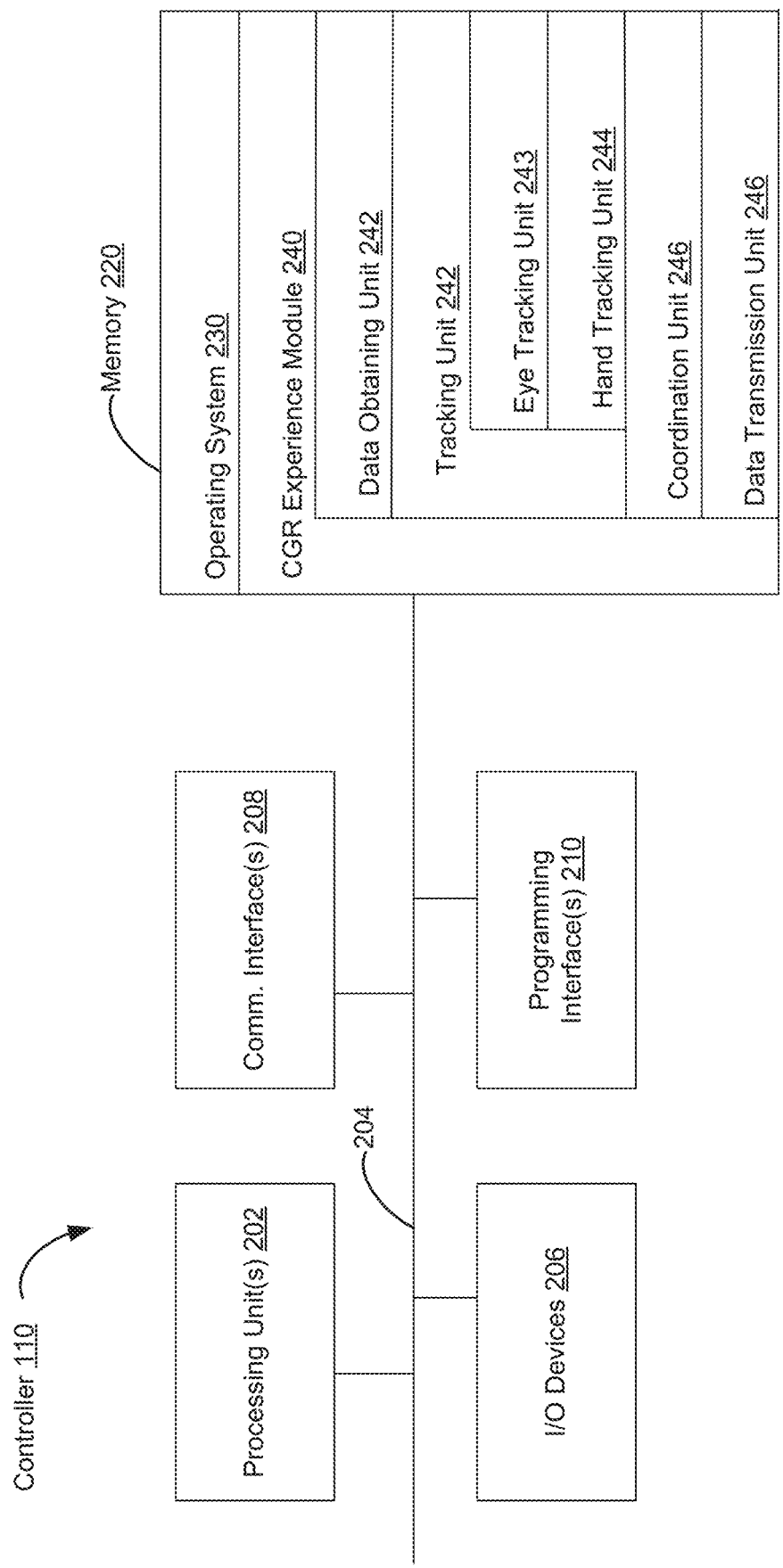
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
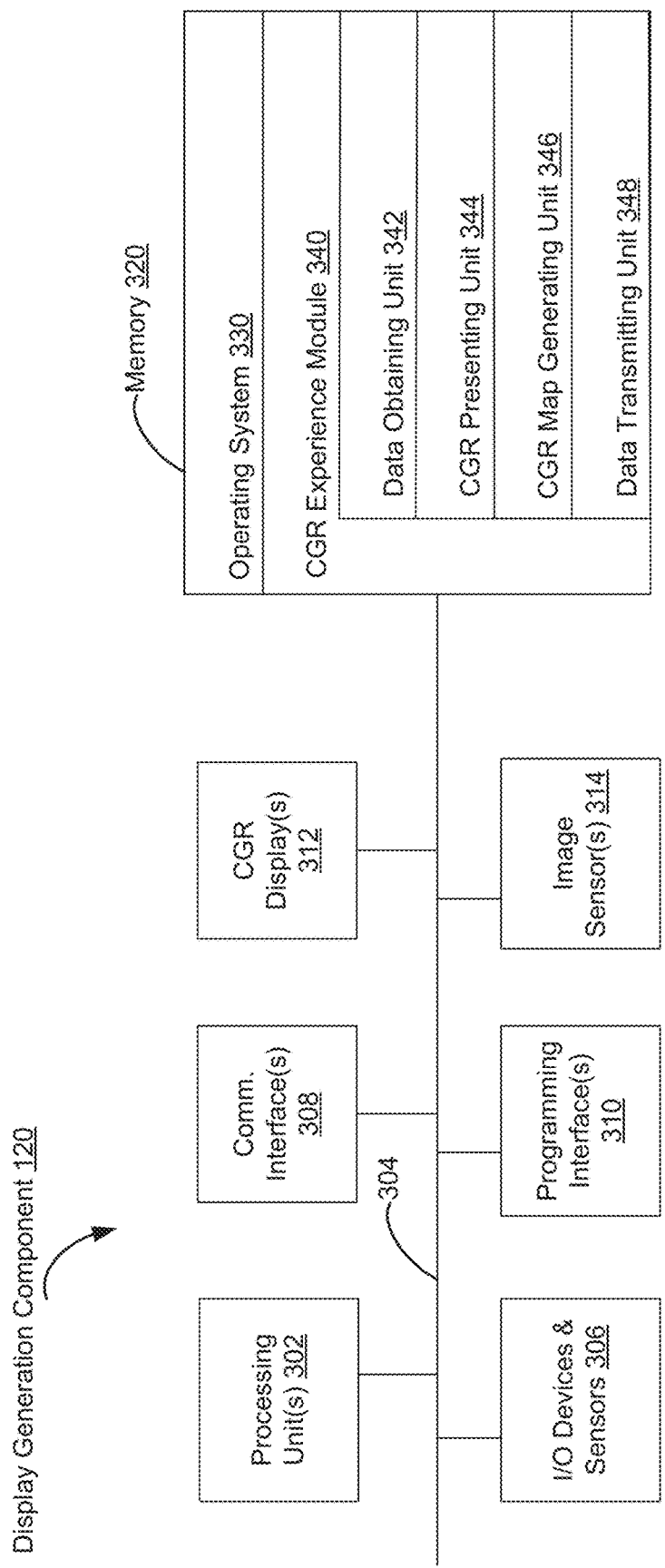
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
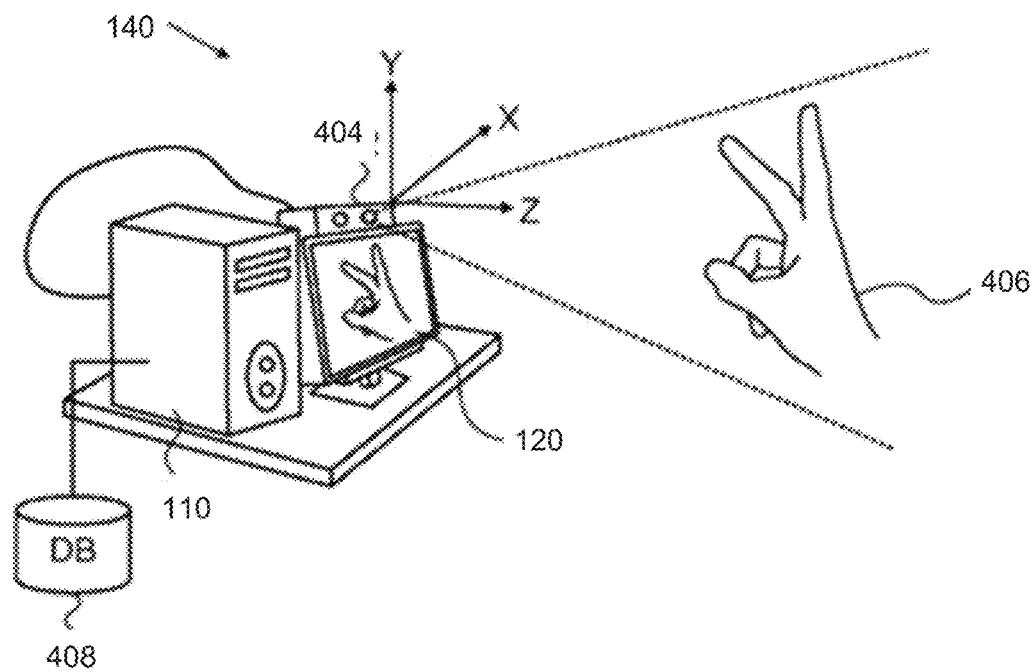
FIG. 4 is a block diagram illustrating a hand tracking unit of a computer system that is configured to capture gesture inputs of the user in accordance with some embodiments.
Figure 4:
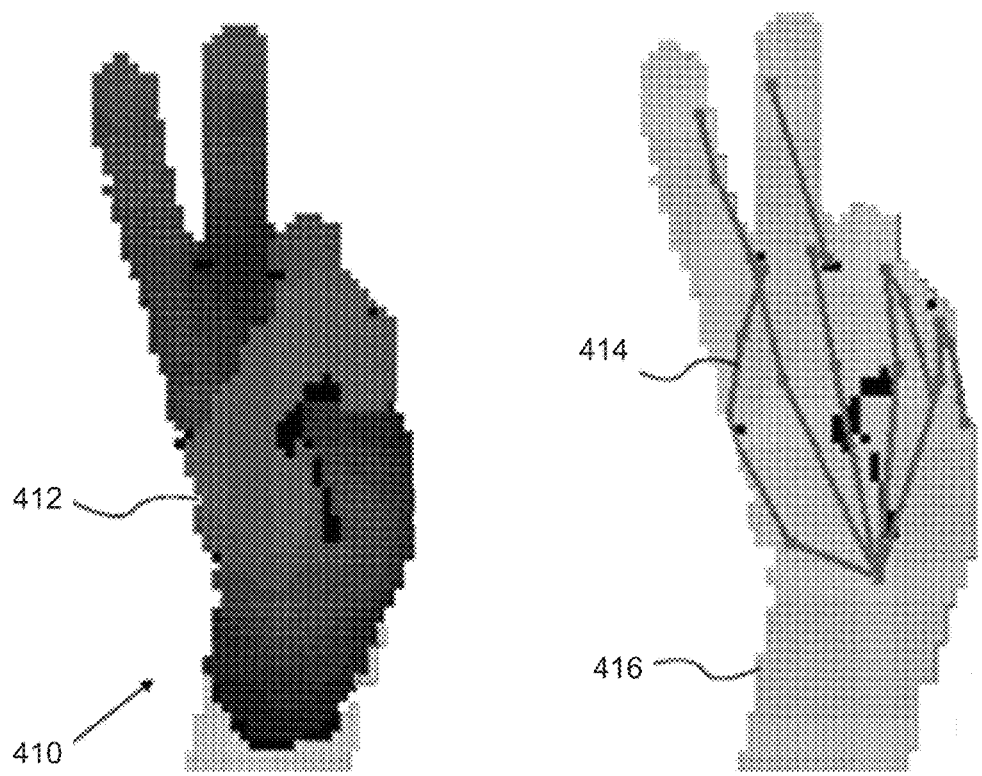

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving the hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
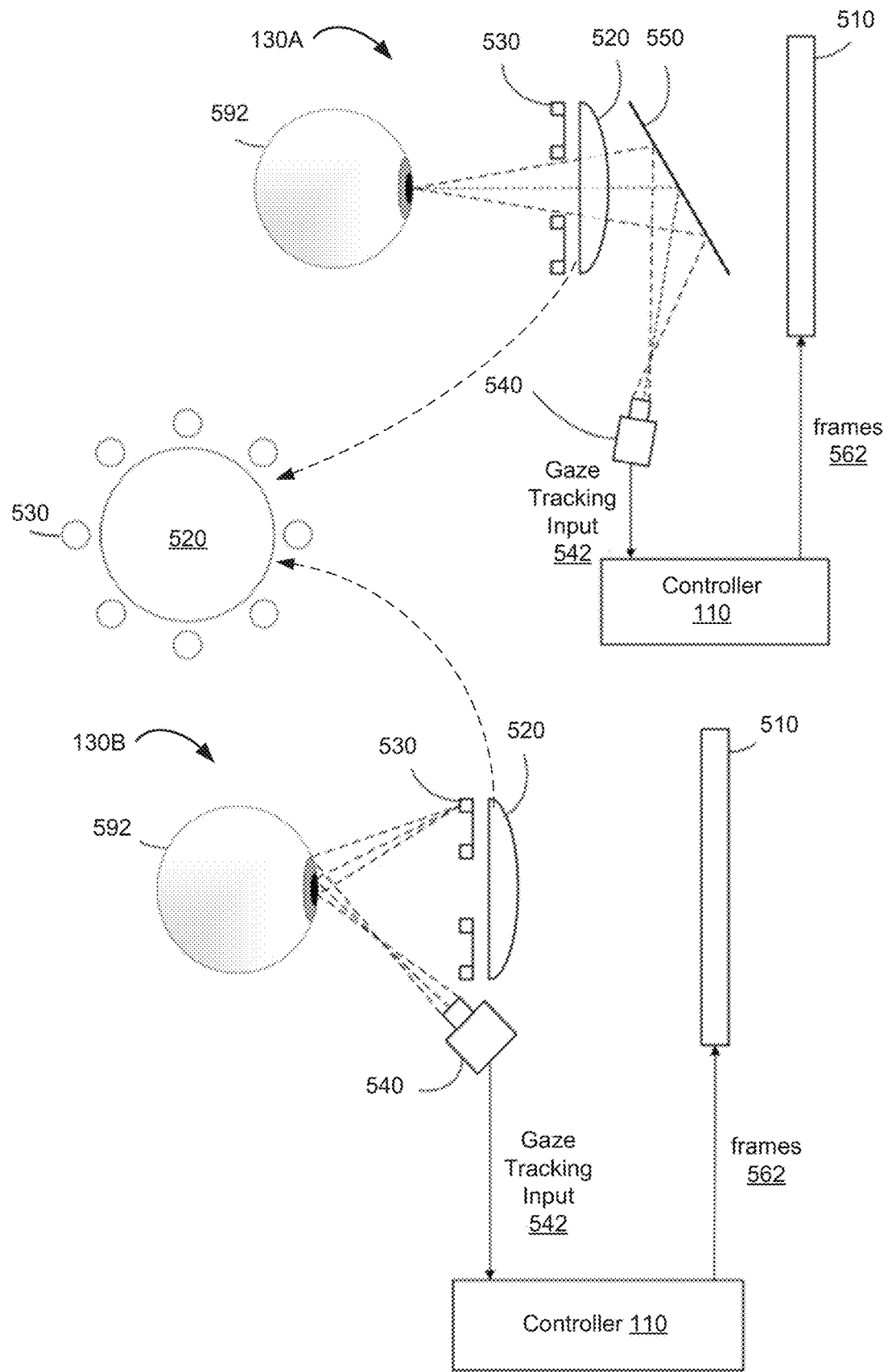
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
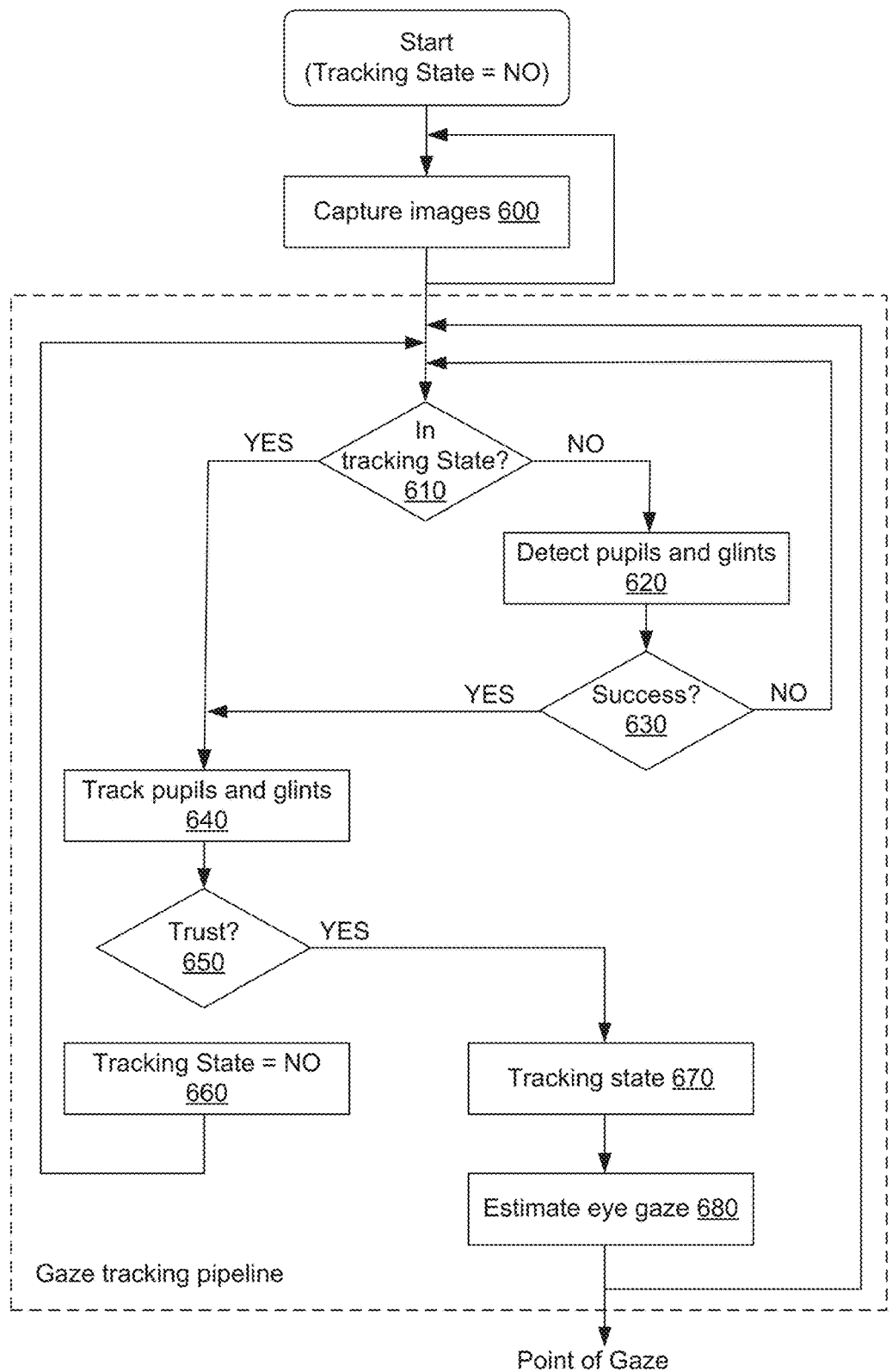
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7G illustrate examples of a computer system sending a quick message to a respective user based on speech input provided by a user of the computer system in a three-dimensional environment in accordance with some embodiments.

Figure 7A:
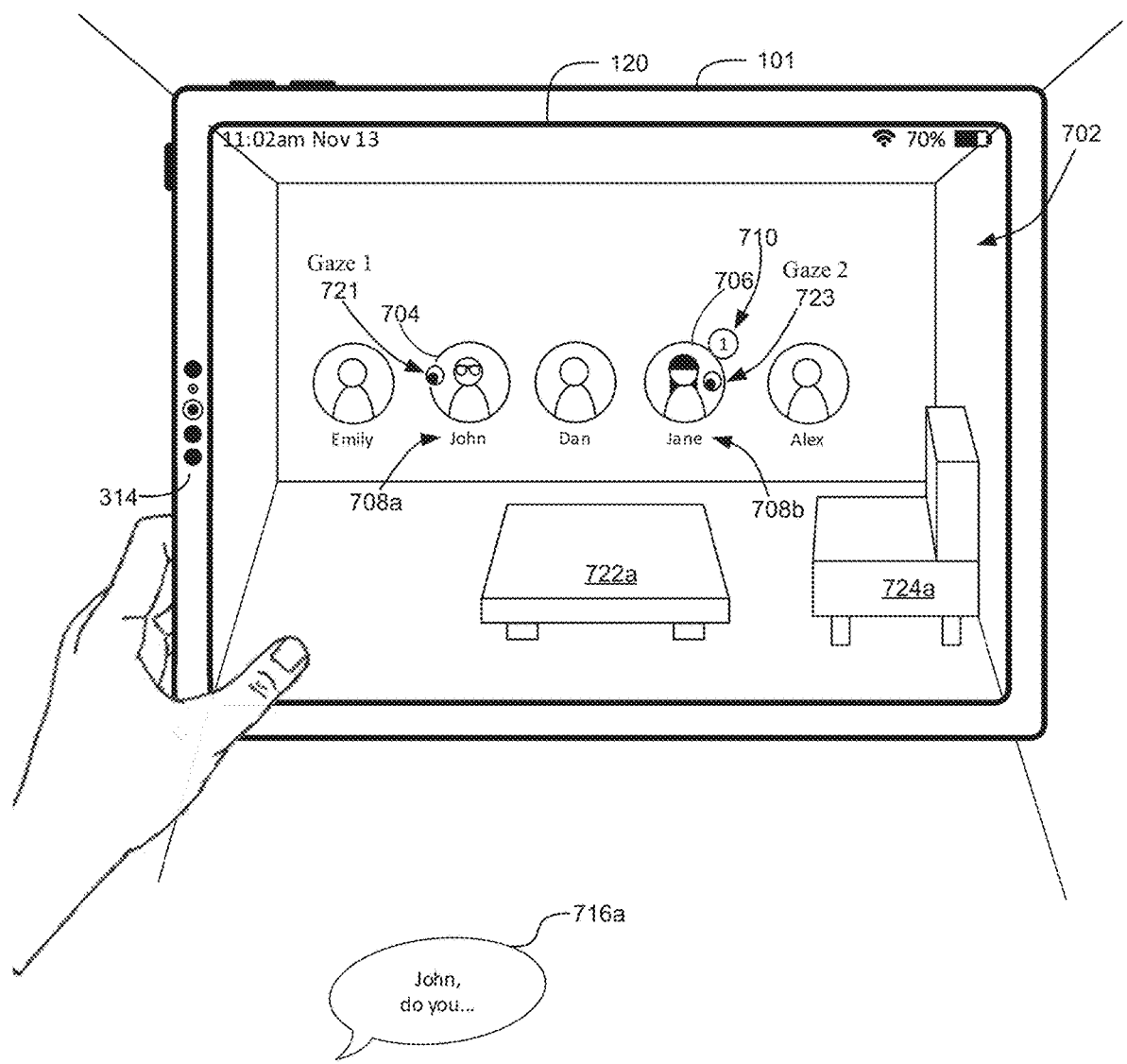
FIGS. 7A-7G illustrate examples of a computer system sending a quick message to a respective user based on speech input provided by a user of the computer system in a three-dimensional environment in accordance with some embodiments.

FIG. 7A illustrates a computer system (e.g., an electronic device) 101 displaying, via a display generation component (e.g., display generation component 120 of FIG. 1), a three-dimensional environment 702 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702. For example, three-dimensional environment 702 includes a representation 722a of a coffee table, which is optionally a representation of a physical coffee table in the physical environment, and three-dimensional environment 702 includes a representation 724a of sofa, which is optionally a representation of a physical sofa in the physical environment.

In FIG. 7A, three-dimensional environment 702 also includes a plurality of representations of a plurality of users other than the user of the computer system 101. For example, the three-dimensional environment includes (e.g., two-dimensional or three-dimensional) representations of users Emily, John, Dan, Jane, and/or Alex. The plurality of representations of the plurality of users are optionally at a same distance from the viewpoint of the user of the computer system 101. In some embodiments, the plurality of users corresponds to a plurality of contacts associated with a communication application (e.g., a messaging application, a phone application, and/or an emailing application) operating via the computer system 101. As shown in FIG. 7A, the plurality of representations of the plurality of users optionally includes a first representation 704 of a first user (John), and a second representation 706 of a second user (Jane). In some embodiments, the first representation 704 and the second representation 706 include images (e.g., photographs, screenshots, video clips, and/or graphical representations) corresponding to the first user and the second user, respectively. In some embodiments, the first representation 704 and the second representation 706 each include a representation of a name (e.g., a contact name) associated with the first user and the second user, respectively. For example, the first representation 704 of the first user includes a first representation 708a of a name associated with the first user ("John"), and the second representation 706 of the second user includes a second representation 708b of a name associated with the second user ("Jane"). The representations of the names associated with the first user and/or the second user optionally include additional identifying information in the three-dimensional environment 702, such as a phone number associated with the user, an email address associated with the user, and/or an affiliation associated with the user (e.g., company, family, sports team, friend group, and/or club). It should be understood that while multiple representations of users (e.g., 704 and 706) other than the user of the computer system 101 are illustrated in FIGS. 7A-7G, such representations of the users need not be displayed by computer system 101 concurrently; rather, in some embodiments, computer system 101 independently displays the representations of the users illustrated and described in response to detecting input corresponding to a request to scroll through a graphical user interface associated with a respective communication application in the three-dimensional environment 702. Additionally, while the plurality of representations of the plurality of users are displayed in a line in three-dimensional environment 702, it should be understood that, in some embodiments, computer system 101 displays the plurality of representations in an alternative predetermined arrangement in three-dimensional environment 702, such as in a grid arrangement.

In some embodiments, a respective representation of a respective user other than the user of the computer system 101 is displayed in three-dimensional environment 702 with a visual indication (e.g., a badge or label) indicating that the user of the computer system 101 has received a message from the respective user of the plurality of users. For example, as shown in FIG. 7A, the user of the computer system 101 has an unread message from the second user (Jane). As shown, the second representation 706 of the second user is displayed with visual indication 710 indicating that the user has an unread message from the second user (e.g., unread relative to when the user of the computer system 101 last communicated with the second user (e.g., via the computer system 101 or via a second computer system belonging to the user)). In some embodiments, the visual indication includes a number (e.g., 1) that corresponds to a number of messages received from the second user and that have not been read (e.g., viewed or listened to) by the user of the computer system 101. The user of the computer system 101 has no unread messages from the first user (John), and thus, the first representation 704 of the first user is not displayed in three-dimensional environment 702 with a visual indication 710, as shown in FIG. 7A.

In some embodiments, the computer system 101 presents unread messages from a respective user to the user of the computer system 101 in response to detecting attention of the user directed toward a respective representation of the respective user in three-dimensional environment 702. For example, as discussed in more detail below, in response to detecting a gaze of the user of the computer system 101 directed toward the second representation 706 of the second user in the three-dimensional environment 702, the computer system 101 presents the unread message to the user of the computer system 101. In some embodiments, as described below, no input other than the attention of the user directed toward the respective representation of the respective user in the three-dimensional environment is required to present the unread message from the respective user to the user of the computer system 101.

In some embodiments, the computer system 101 initiates a process to send a message to a respective user in response to detecting speech input from the user of the computer system 101 and/or the attention of the user directed to a respective representation of the respective user in the three-dimensional environment 702. For example, as discussed in more detail below, in response to detecting speech input from the user of the computer system 101 while the gaze of the user is directed toward the first representation 704 of the first user in the three-dimensional environment 702, the computer system 101 initiates a process to send a message to the first user. In some embodiments, as described below, no input other than the attention of the user directed toward the respective representation of the respective user in the three-dimensional environment and/or the speech input from the user of the computer system 101 is required to initiate the process to send the message to the respective user.

In FIG. 7A, attention (e.g., a gaze of the user of the computer system 101) is directed to the first representation 704 and/or the second representation 706, respectively. For example, in FIG. 7A, a first gaze ("Gaze 1") 721 is directed to the first representation 704 of the first user, and a second gaze ("Gaze 2") 723 is directed to the second representation 706 of the second user. It should be understood that while multiple gaze points are illustrated in FIGS. 7A-7G, such gaze points need not be detected by computer system 101 concurrently; rather, in some embodiments, computer system 101 independently responds to the gaze points illustrated and described in response to detecting such gaze points independently. Additionally, in FIG. 7A, the user of the computer system is providing first speech input 716a while the attention of the user is directed toward the first representation 704 of the first user in three-dimensional environment 702. For example, in FIG. 7A, the user of the computer system 101 is speaking the words "John, do you" while the first gaze 721 is directed toward the first representation 704 in three-dimensional environment 702.

Figure 7B:
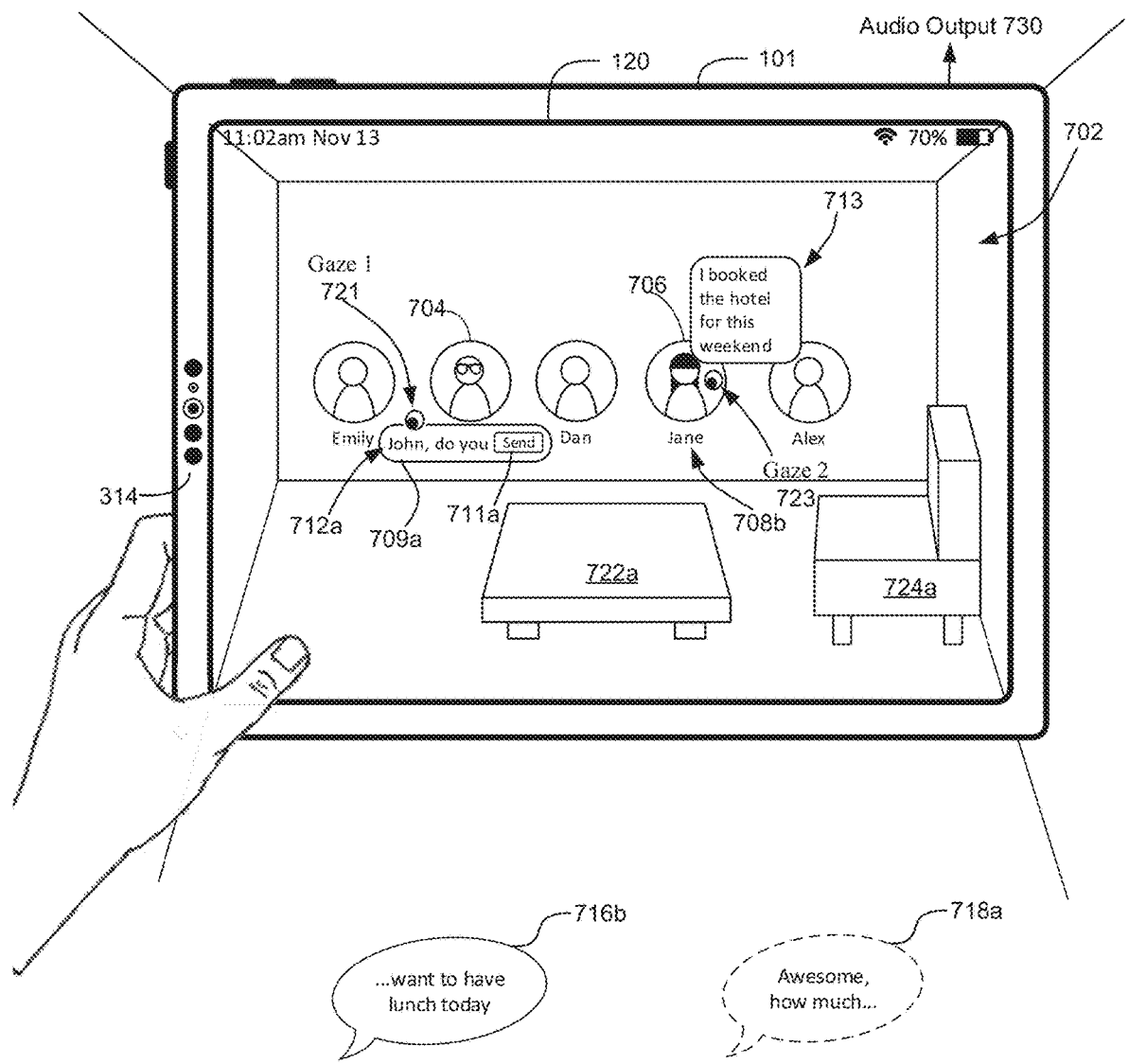

In some embodiments, in response to detecting the gaze 723 in FIG. 7A directed to the second representation 706 of the second user, computer system 101 presents the unread message from the second user. For example, as shown in FIG. 7B, the computer system 101 displays a message element 713 including text representation of the unread message from the second user (e.g., "I booked the hotel for this weekend"). In some embodiments, as shown, the computer system 101 replaces display of the visual indication 710 of FIG. 7A with the message element 713 in three-dimensional environment 702. Additionally or alternatively, in some embodiments, the computer system 101 outputs audio 730 corresponding to the unread message from the second user. For example, a virtual assistant associated with an operating system of the computer system 101 outputs the words "I booked the hotel for this weekend" (e.g., via a speaker device in communication with the computer system 101).

Further, in some embodiments, in response to detecting the first speech input 716a while the gaze 721 is directed to the first representation 704 of the first user in FIG. 7A, the computer system 101 initiates a process to send a message based on the first speech input 716a to the first user. For example, as shown in FIG. 7B, the computer system 101 displays a first message dictation platter 709a including text representation 712a corresponding to the first speech input 716a (e.g., "John, do you") in three-dimensional environment 702. In some embodiments, as shown, the computer system 101 replaces display of the first representation 708a of the name associated with the first user with the first message dictation platter 709a in the three-dimensional environment 702. In some embodiments, the computer system 101 displays the text representation 712a corresponding to the first speech input 716a in real time. For example, as the computer system 101 detects each word of the speech input 716a, the computer system 101 generates and displays text representation of the word in the message dictation platter 709a within 0.05, 0.08, 0.1, 0.2, 0.5, 0.8, 1, 2, or 3 seconds of detecting the word of the speech input 716a. In some embodiments, the first message dictation platter 709a includes a send option 711a that is selectable to cause the computer system 101 to send a message including the text representation 712a to the first user.

In some embodiments, the computer system initiates the process to send the message to the first user in accordance with a determination that one or more first criteria and/or one or more second criteria are satisfied. In some embodiments, the one or more first criteria include a criterion that is satisfied when, while the user is providing the first speech input 716a, the gaze 721 of the user of the computer system 101 is directed toward the first representation 704 of the first user, as shown in FIG. 7A. In some embodiments, the one or more first criteria include a criterion that is satisfied when, while the user is providing the first speech input 716a, the gaze 721 of the user of the computer system 101 is directed toward the first message dictation platter 709a. For example, in some instances, the three-dimensional environment 702 includes the first message dictation platter 709a before the speech input 716a from the user is detected (e.g., because the user recently sent a message to the first user and/or because the gaze 721 is directed to the first representation 704 for a threshold amount of time (e.g., 1, 2, 3, 5, 8, 10, 12, 15 or 20 seconds)). In some such embodiments, the gaze 721 of the user is required to be directed to the message dictation platter 709a while the speech input 716a is provided by the user (e.g., as similarly shown in FIG. 7B). In some embodiments, in accordance with a determination that the one or more first criteria are not satisfied, the computer system 101 forgoes initiating the process to send the message to the first user (e.g., the computer system 101 forgoes displaying the message dictation platter 709a and/or the text representation 712a in three-dimensional environment 702).

Further, in some embodiments, the one or more second criteria include a criterion that is satisfied when the speech input 716a begins with a word corresponding to the name associated with the first user. For example, as discussed above, the name associated with the first user is John. As shown in FIG. 7A, the first speech input 716a optionally begins with the word "John," which corresponds to the name associated with the first user. In some embodiments, when initiating a process to send an initial message to a respective user, the speech input from the user is required to begin with a word corresponding to the name of the respective user, while the attention of the user satisfied the one or more first criteria discussed above. For example, while in the current session of the communication application (e.g., since launching the communication application that includes displaying the plurality of representations of the plurality of users in FIG. 7A), the computer system 101 has not previously sent a message to the first user. Accordingly, when the computer system 101 detects the first speech input 716a that begins with the word "John," which optionally corresponds to the name associated with the first user, the computer system 101 initiates the process to send the message to the first user (e.g., displays the message dictation platter 709a including the text representation 712a in three-dimensional environment 702). In some embodiments, the one or more second criteria for initiating the process to send a message to a respective user include a criterion that is satisfied when the user recently (e.g., within a predetermined time period, such as 1, 2, 3, 5, 10, 15, 20, 30, 45, or 60 minutes) received an incoming communication (e.g., a message) from the respective user. For example, as described below, the one or more second criteria are satisfied if, in accordance with a determination that the attention of the user of the computer system 101 satisfies the one or more first criteria discussed above (e.g., the gaze of the user is directed toward a respective representation of the respective user), the user has received a message from the respective user, even if the speech input from the user does not begin with a word corresponding to the name associated with the respective user. In some embodiments, in accordance with a determination that the one or more second criteria are not satisfied, the computer system 101 forgoes initiating the process to send the message to the first user (e.g., the computer system 101 forgoes displaying the message dictation platter 709a and/or the text representation 712a in three-dimensional environment 702).

In FIG. 7B, the user of the computer system 101 provides a subsequent portion of the first speech input 716b while the attention of the user is directed toward the first message dictation platter 709a in three-dimensional environment 702. For example, in FIG. 7B, the user of the computer system 101 is speaking the words "want to have lunch today" while the first gaze 721 is directed toward the first message dictation platter 709a in three-dimensional environment 702. Additionally, in FIG. 7B, the user of the computer system 101 provides second speech input 718a while the attention of the user is directed toward the second representation 706 of the second user in three-dimensional environment 702. For example, in FIG. 7B, the user of the computer system 101 is speaking the words "Awesome, how much" while the second gaze 723 is directed toward the second representation 706 in the three-dimensional environment 702. It should be understood that while multiple speech inputs are illustrated in FIGS. 7A-7G, such speech inputs need not be detected by computer system 101 concurrently; rather, in some embodiments, computer system 101 independently responds to the speech inputs illustrated and described in response to detecting such speech inputs independently.

Figure 7C:
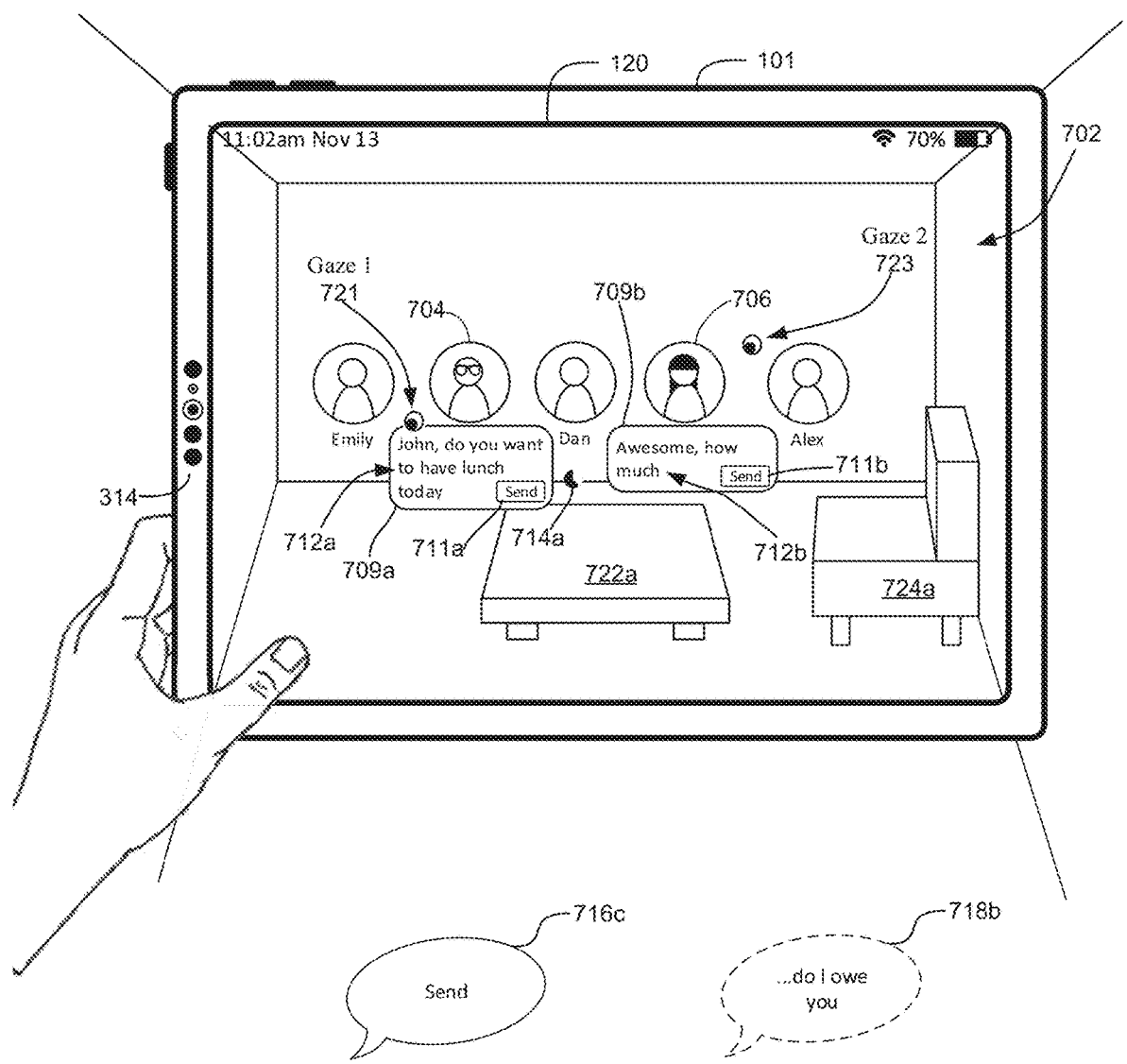

In some embodiments, in response to detecting the second portion of the first speech input 716b while the gaze 721 of the user is directed toward the first message dictation platter 709a in FIG. 7B, the computer system updates display of the text representation 712a in the first message dictation platter 709a in three-dimensional environment 702. For example, as shown in FIG. 7C, the computer system 101 updates the text representation 712a to also include the second portion of the first speech input 716b "want to have lunch today" in the first message dictation platter 709a in three-dimensional environment 702. Additionally, in response detecting an end of the first speech input 716b, the computer system 101 optionally initiates a countdown for sending the message including the text representation 712a to the first user. For example, as shown in FIG. 7C, the computer system 101 displays a timer indication (e.g., a countdown element) 714a in three-dimensional environment 702 indicating that, once a duration (e.g., 0.5, 1, 1.5, 2, 2.5, 3, 4, or 5 seconds) of the countdown elapses, the message including the text representation 712a will be sent to the first user.

Additionally, in some embodiments, in response to detecting the second speech input 718a while the gaze 723 of the user is directed toward the second representation 706 of the second user in FIG. 7B, the computer system 101 initiates a process to send a message to the second user. For example, as shown in FIG. 7C, the computer system 101 displays a second message dictation platter 709b including text representation 712b (e.g., "Awesome, how much") in three-dimensional environment 702. In some embodiments, the computer system 101 replaces display of the representation 708b (e.g., in FIG. 7B) of the name associated with the second user with the second message dictation platter 709B in the three-dimensional environment 702. In some embodiments, the second message dictation platter 709b includes a send option 711b that is selectable to cause the computer system 101 to send a message including the text representation 712b to the second user. As described above, because the gaze 723 of the user is directed to the second representation 706 of the second user when the second speech input 718a is detected, the one or more first criteria for initiating the process to send the message to the second user are optionally satisfied (e.g., and thus the second message dictation platter 709*b* including the text representation 712*b* is displayed in three-dimensional environment 702). Additionally, because the user of the computer system 101 had received a message from the second user (e.g., in FIG. 7A) before the second speech input 718*a* was detected (e.g., and within the predetermined time period discussed above), despite the second speech input 718*a* not beginning with a word corresponding to the name associated with the second user, the one or more second criteria for initiating the process to send the message to the second user are optionally satisfied, and thus, the computer system 101 displays the text representation 712*b* of the speech input 718*a* in the second message dictation platter 709*b*. In some embodiments, the computer system 101 defaults to sending subsequent messages to the second user (e.g., because a message was received from the second user) unless the user of the computer system 101 designates a different recipient (e.g., based on the location of the gaze of the user and/or by speaking the name of a different recipient when providing the speech input).

In FIG. 7C, the user of the computer system 101 provides a subsequent portion of the first speech input 716*c* including a speech command corresponding to a request to send the message to the first user while the attention of the user is directed toward the first message dictation platter 709*a* in three-dimensional environment 702. For example, in FIG. 7C, the user of the computer system 101 is speaking the word "Send" while the first gaze 721 is directed toward the first message dictation platter 709*a* in three-dimensional environment 702 and while the timer indication 714*a* is displayed. In some embodiments, the computer system 101 detects a pause (e.g., a time duration of 1, 2, or 3 seconds) before detecting the speech command and/or after detecting the speech command. In some embodiments, the pause is required for the computer system 101 to recognize the speech command as a request to send the message to the first user, and not as additional speech input (e.g., for display as text representation in the first message dictation platter 709*a* in the three-dimensional environment 702). Additionally, in FIG. 7C, the user of the computer system 101 provides a subsequent portion of the second speech input 718*b* while the attention of the user is directed away from the second message dictation platter 709*b* in three-dimensional environment 702. For example, the user of the computer system 101 is speaking the words "do I owe you" while the second gaze 723 is not directed to the second message dictation platter 709*b* in three-dimensional environment 702 (e.g., is directed to empty space in three-dimensional environment 702).

Figure 7D:
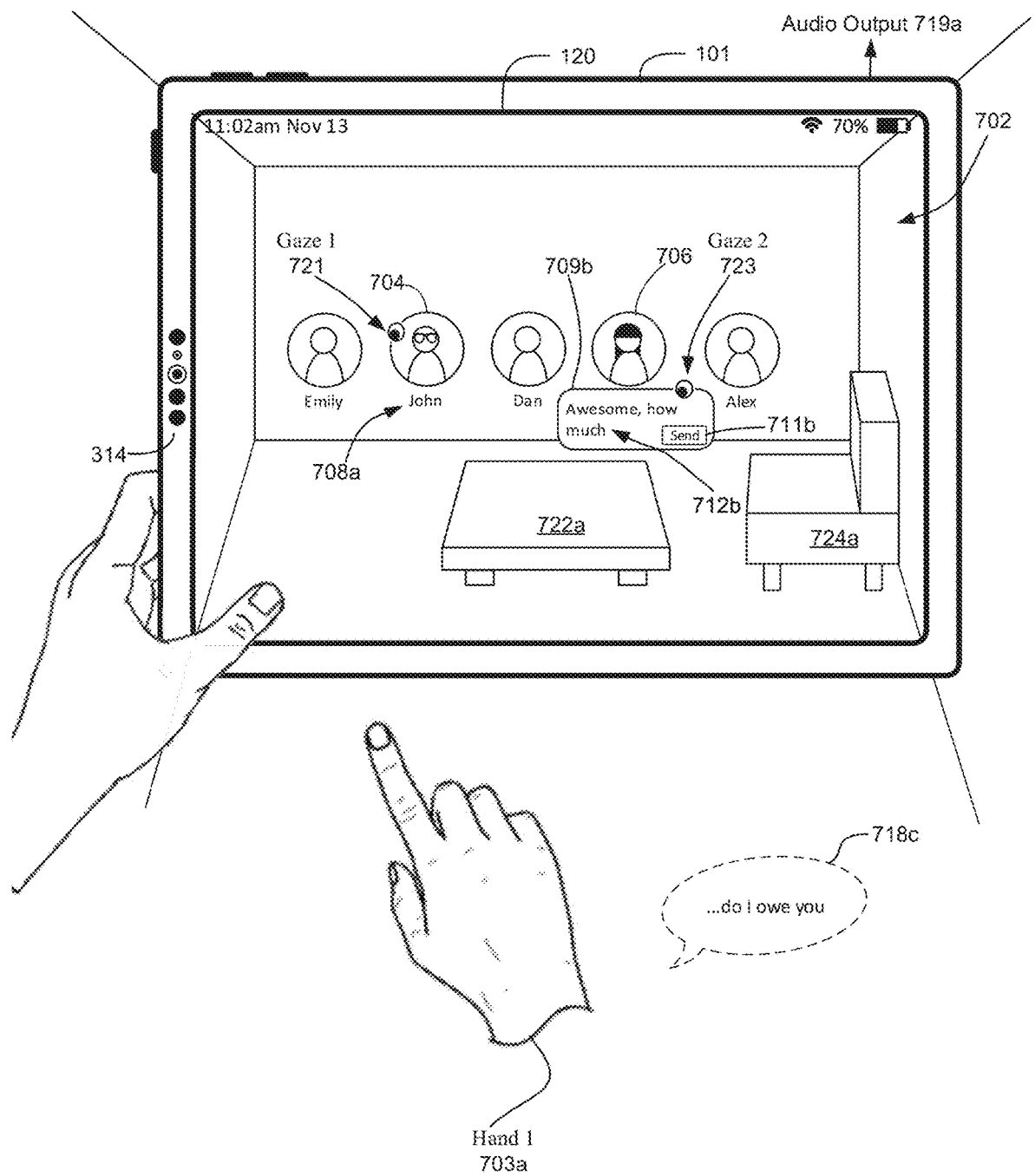

In some embodiments, in response to detecting the speech command of the first speech input 716*c* in FIG. 7C, the computer system 101 sends the message including the text representation 712*a* of the first speech input to the first user in accordance with the speech command. For example, as shown in FIG. 7D, the computer system 101 transmits information to a second computer system associated with the first user that enables the second computer system to present the message including the text representation 712*a* to the first user. In some embodiments, the computer system 101 sends the message to the first user in response to detecting the speech command, despite the duration of time associated with the timer indication 714*a* having not yet fully elapsed. In some embodiments, when the computer system 101 sends the message to the first user, the computer system 101 also outputs audio 719*a* indicating that the message has been sent. For example, the computer system 101 emits a chime, ring, or tune (e.g., via a speaker device in communication with the computer system 101). Additionally, in some embodiments, after sending the message to the first user, the computer system 101 ceases display of the first message dictation platter 709*a* and redisplays the representation 708*a* of the name associated with the first user in three-dimensional environment 702, as shown in FIG. 7D. In some embodiments, if the computer system 101 detects a speech command from the user corresponding to a request to forgo sending the message to the first user, the computer system 101 forgoes sending the message to the first user in accordance with the speech command. For example, if the computer system 101 were to detect the word "Cancel" (e.g., or any equivalents, such as "Do not send") instead of the word "Send" (e.g., or any equivalents, such as "Transmit" or "Send it"), the computer system 101 would cease elapsing the time corresponding to the timer indication 714*a* and/or would cease display of the text representation 712*a* in the first message dictation platter 709*a*, rather than sending the message to the first user.

Further, in some embodiments, in response to detecting the subsequent portion of the second speech input 718*b* while the gaze 723 of the user is directed away from the second message dictation platter 709*b*, the computer system 101 forgoes updating display of the text representation 712*b* corresponding to the second speech input 718*b* in three-dimensional environment 702. For example, as shown in FIG. 7D, because the gaze 723 of the user was not directed toward the second message dictation platter 709*b* when the subsequent portion of the second speech input 718*b* was detected, the computer system 101 forgoes updating display of the text representation 712*b* to also include the words "do I owe you" in accordance with the second speech input 718*b*. In some embodiments, as described below, when the gaze 723 of the user is directed back to the second message dictation platter 709*b* and a subsequent portion of the second speech input 718*b* is detected while the gaze 723 is directed to the second message dictation platter 709*b* (e.g., within a predefined time period, such as 0.25, 0.5, 1, 1.5, 2, 3, 5, 10, or 20 seconds), the computer system 101 updates display of the text representation 712*b*. In some embodiments, as described below, the computer system 101 initiates a process to engage in a real-time (e.g., live) communication session with a respective user in response to detecting a selection of a respective representation of the respective user in three-dimensional environment 702.

In FIG. 7D, hand 703*a* ("Hand 1") is providing a selection input directed to the first representation 704 of the first user in the three-dimensional environment 702. In some embodiments, the selection inputs from hands 703*a* is an air gesture input. For example, from FIGS. 7D-7E, computer system 101 detects hand 703*a* move away from the body of the user of the computer system 101 and provide a pinch or tap directed to the first representation 704 in three-dimensional environment 702. Additionally, in FIG. 7D, the user of the computer system 101 provides a subsequent portion of the second speech input 718*c* while the attention of the user is directed toward the second message dictation platter 709*b* in three-dimensional environment 702. For example, the user of the computer system 101 is speaking (e.g., repeating) the words "do I owe you" while the second gaze 723 is directed toward the second message dictation platter 709*b*.

Figure 7E:
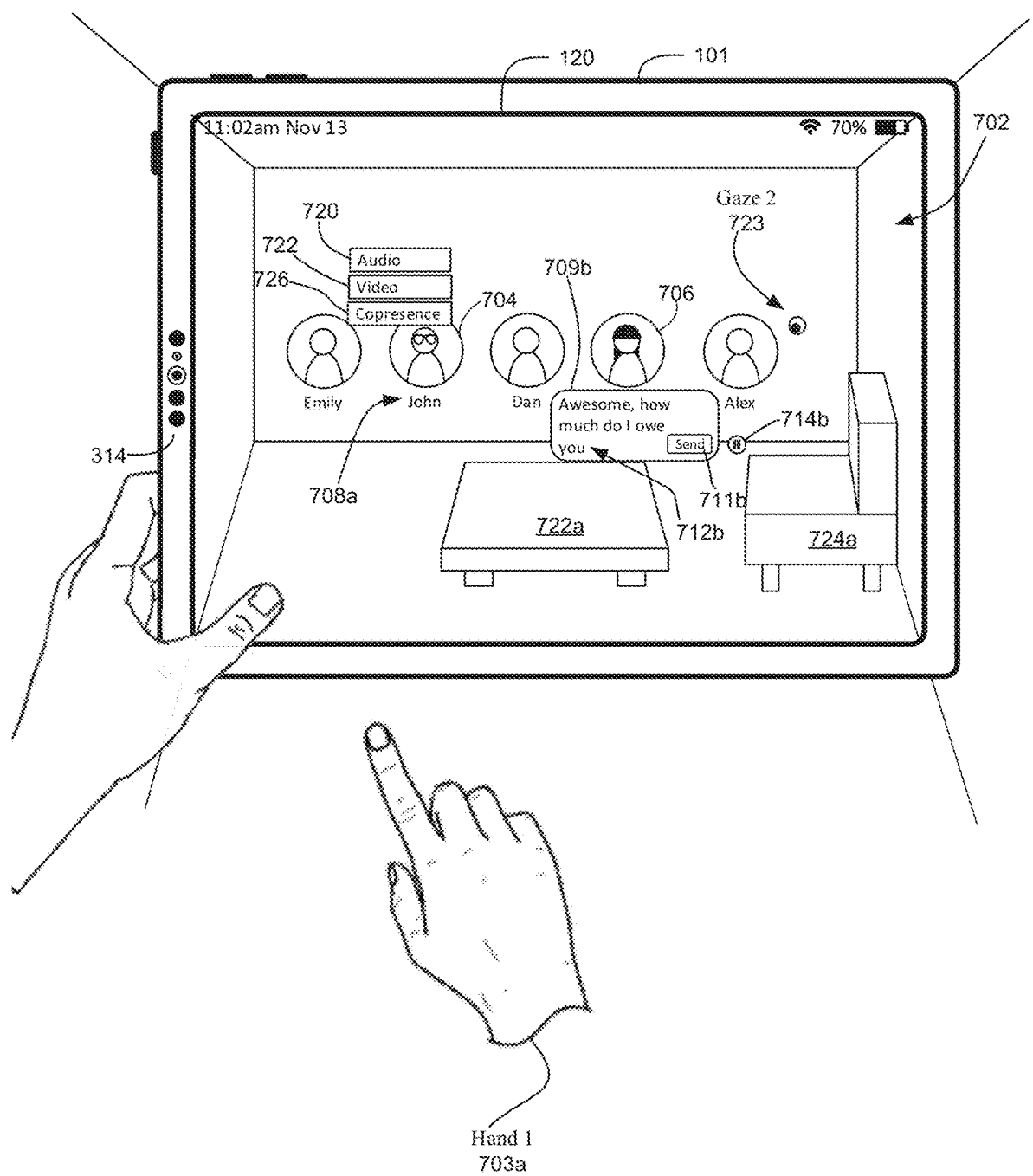

In response to the selection of the first representation 704 of the first user detected in FIG. 7D, the computer system 101 optionally displays one or more options for initiating live communication with the first user, as shown in FIG. 7E.

For example, as shown, the computer system 101 displays a first option 720, a second option 722, and/or a third option 726 in three-dimensional environment 702. In some embodiments, the first option 720 is selectable to initiate audio communication (e.g., a phone call) with the first user, the second option 722 is selectable to initiate video communication (e.g., a video call) with the first user, and the third option 726 is selectable to initiate a copresence communication session with the first user (e.g., for sharing content, such as application windows, with the first user in three-dimensional environment 702). In some embodiments, in response to detecting the subsequent portion of the second speech input 718*c* when the gaze of the user is redirected back toward the second message dictation platter 709*b* (e.g., within the predefined time period, such as 0.25, 0.5, 1, 1.5, 2, 3, 5, 10, or 20 seconds), the computer system 101 updates display of the text representation 712*b* in the second message dictation platter 709*b* to include a text representation of the subsequent portion of the second speech input 718*c*. For example, as shown in FIG. 7E, the computer system 101 updates display of the text representation 712*b* to include the words "do I owe you" based on the detected speech input 718*c* in FIG. 7D.

In some embodiments, if the gaze 723 of the user were not redirected back toward the second message dictation platter 709*b* in the three-dimensional environment 702 within the predefined time period in FIG. 7D since detecting the gaze 723 directed away from the second message dictation platter 709*b* in FIG. 7C, the computer system 101 would forgo updating display of the second message dictation platter 709*b* to include the text representation 712*b* of the subsequent portion of the second speech input 718*c*. For example, the computer system 101 would not display the words "do I owe you" in the second message dictation platter 709*b*. Additionally, in some embodiments, after detecting the predefined time period has elapsed since detecting the gaze 723 of the user directed away from the second message dictation platter 709*b*, the computer system 101 ceases displaying the text representation 712*b* of the second speech input from the user. For example, the computer system 101 would cease display of the text representation 712*b* displayed before detecting the gaze 723 of the user directed away from the second message dictation platter 709*b*, and/or would cease display of the second message dictation platter 709*b* in three-dimensional environment 702 (e.g., as similarly shown in FIG. 7G).

In some embodiments, in response to detecting an end of the second speech input 718*c*, the computer system 101 optionally initiates a countdown for sending the message including the text representation 712*b* to the second user, as similarly discussed above. For example, as shown in FIG. 7E, the computer system 101 displays a timer indication (e.g., a countdown element) 714*b* in three-dimensional environment 702 indicating that, once a duration (e.g., 0.5, 1, 1.5, 2, 2.5, 3, 4, or 5 seconds) of the countdown elapses, the message including the text representation 712*b* will be sent to the second user. In some embodiments, in response to detecting the attention of the user directed away from the message dictation platter 709*b* in three-dimensional environment 702, the computer system 101 ceases elapsing the countdown of the timer to send the message to the second user. For example, in FIG. 7E, the gaze 723 of the user of the computer system 101 is directed away from the second message dictation platter 709*b* (e.g., is directed to empty space in three-dimensional environment 702), which causes the computer system 101 to pause the countdown associated with the timer indication 714*b* in three-dimensional environment 702. In some embodiments, the computer system 101 updates display of the timer indication 714*b* (e.g., to include a pause indication) in three-dimensional environment 702 to indicate that the countdown for sending the message to the second user has been paused, as shown in FIG. 7E.

Figure 7F:
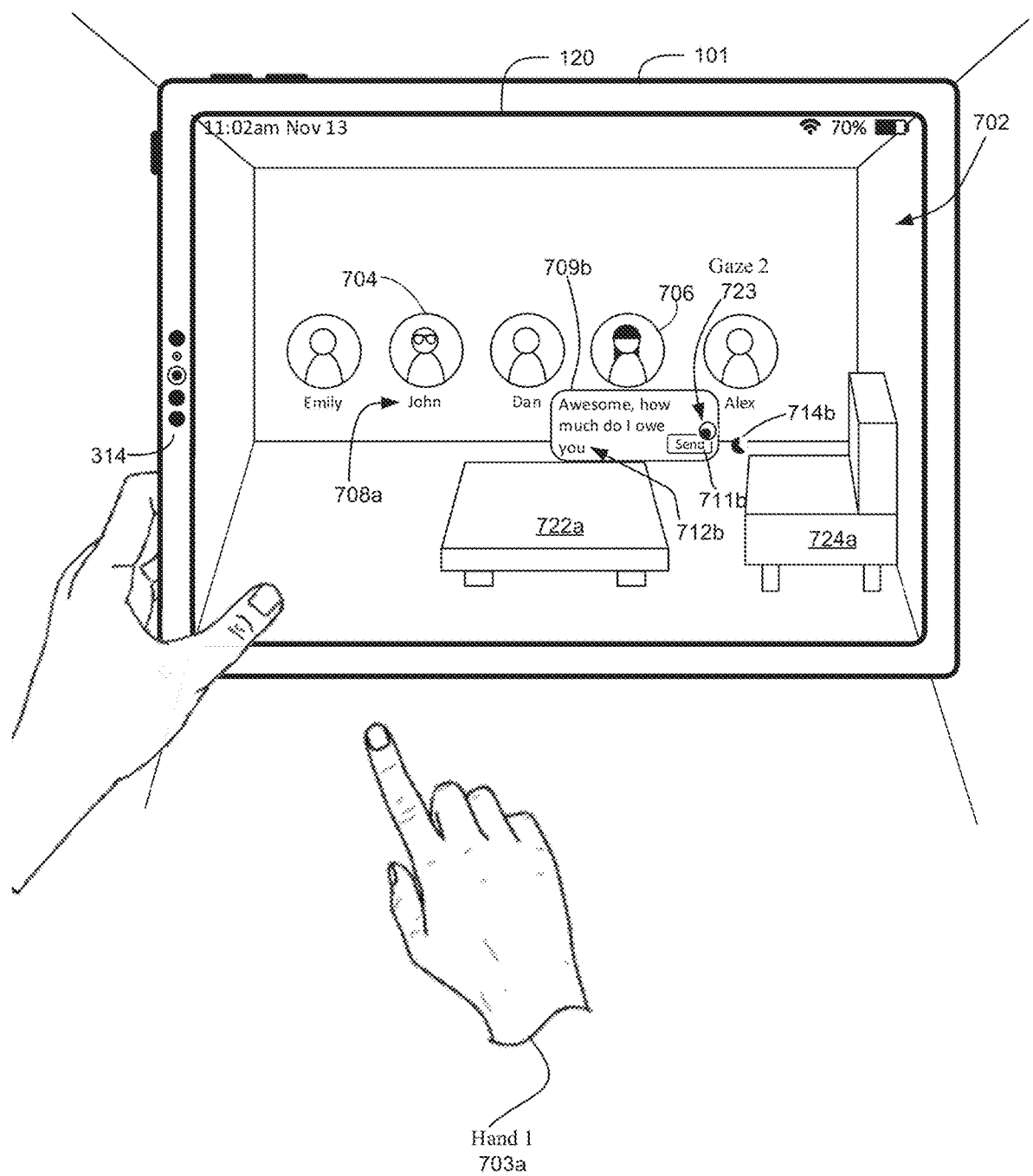

In some embodiments, in response to detecting the attention of the user redirected back toward the message dictation platter 709*b*, the computer system 101 resumes the countdown associated with the timer indication 714*b* in three-dimensional environment 702. For example, as shown in FIG. 7F, when the countdown for sending the message to the second user is paused, in response to detecting the gaze 723 redirected back toward the second message dictation platter 709*b*, the computer system 101 resumes the countdown for sending the message to the second user (e.g., from the point in time the timer was last paused). In some embodiments, as shown in FIG. 7F, the computer system 101 updates display of the timer indication 714*b* (e.g., to no longer include the pause indication) when the computer system 101 resumes the countdown. In some embodiments, the gaze 723 is required to be directed toward a predefined portion of the message dictation platter 709*b* to cause the timer to count down. For example, as shown in FIG. 7F, the gaze 723 is directed toward the send option 711*b* in the second message dictation platter 709*b*. In some embodiments, the gaze 723 is required to be directed toward an end portion of the text representation 712*b* displayed in the message dictation platter 709*b* (e.g., toward a portion of the word "you" in the message dictation platter 709*b*).

Figure 7G:
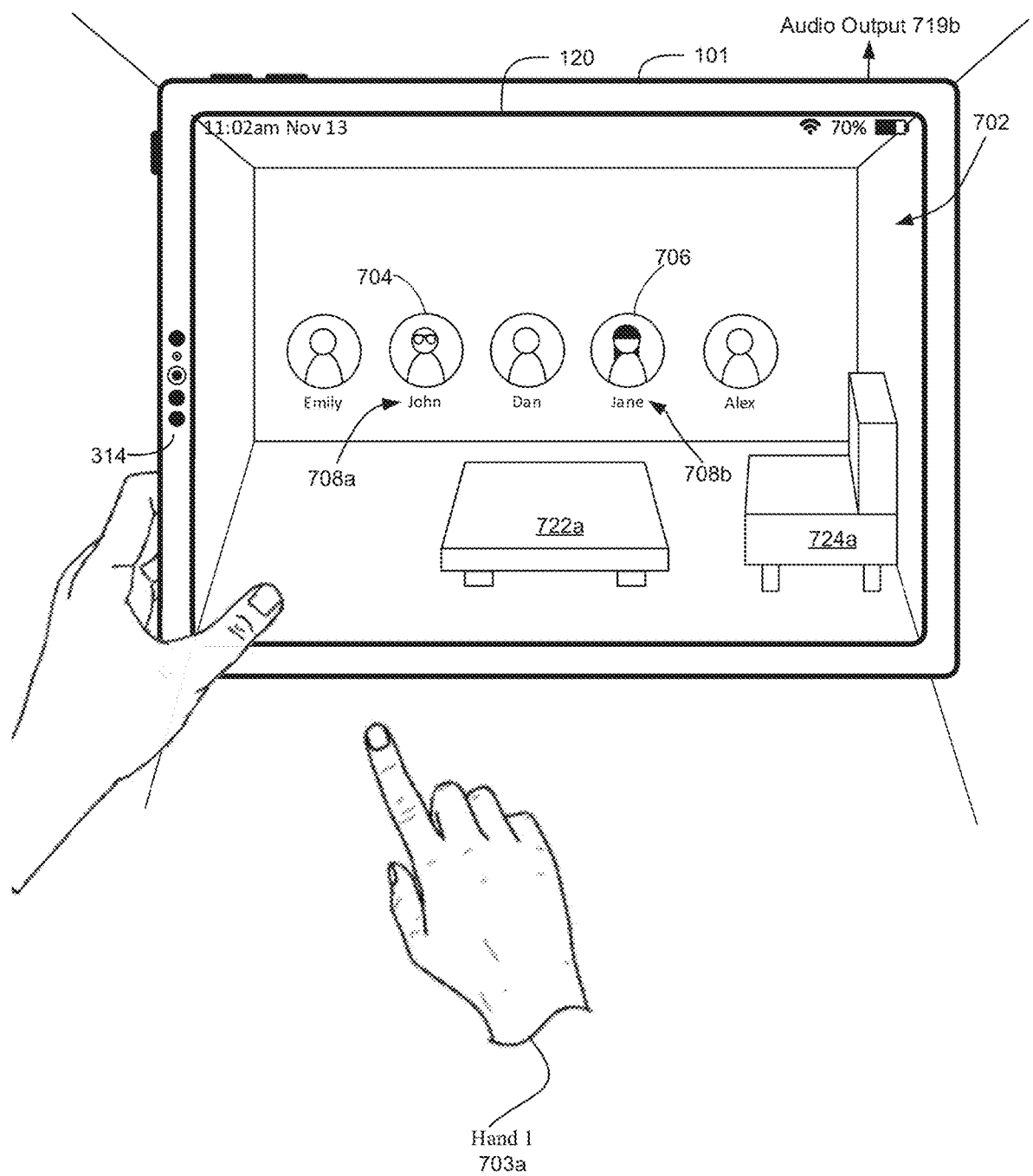
Figure 8A:
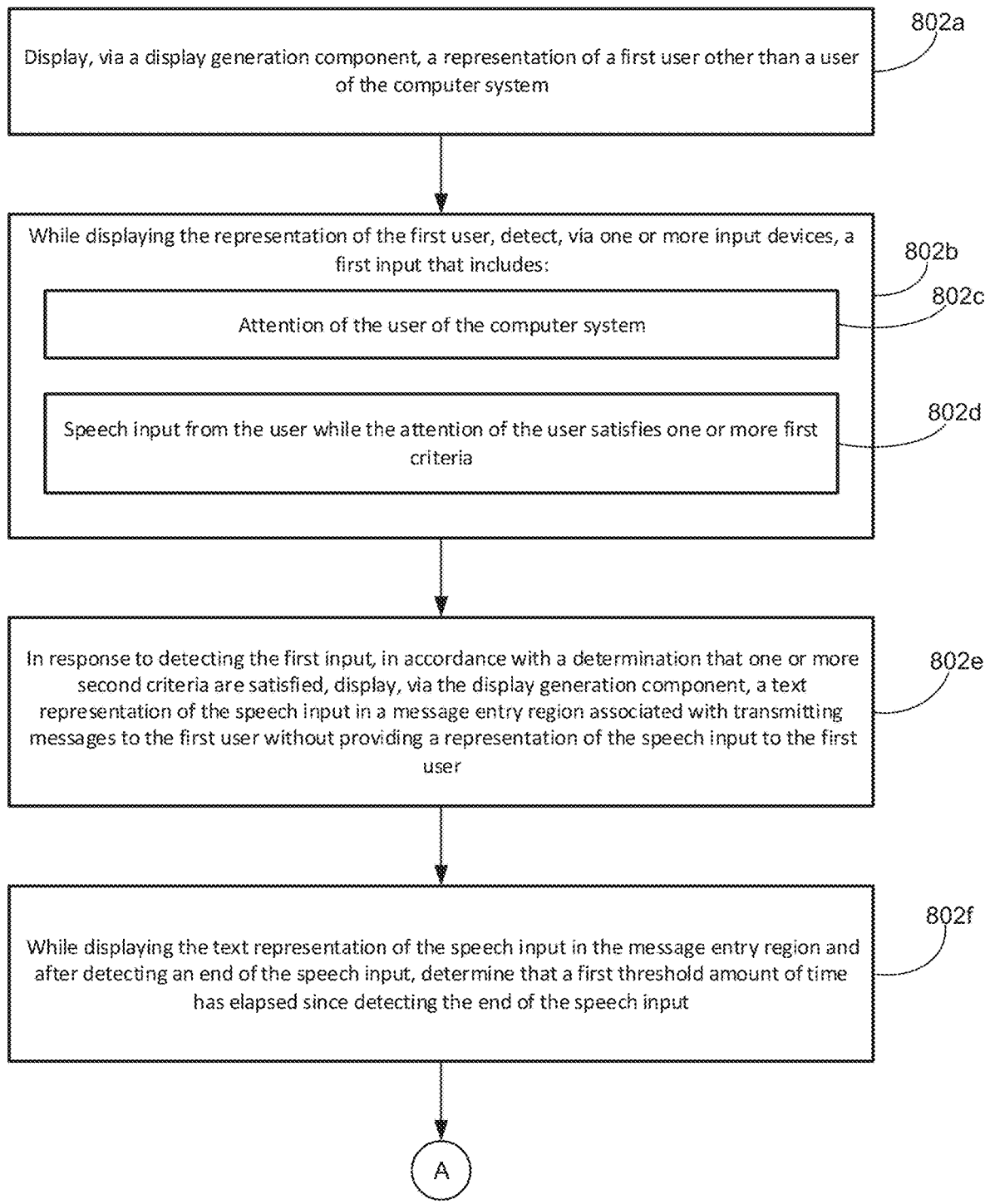
FIGS. 8A-8L is a flowchart illustrating an exemplary method of sending a quick message to a respective user based on speech input provided by a user of the computer system in a three-dimensional environment in accordance with some embodiments.
Figure 8B:
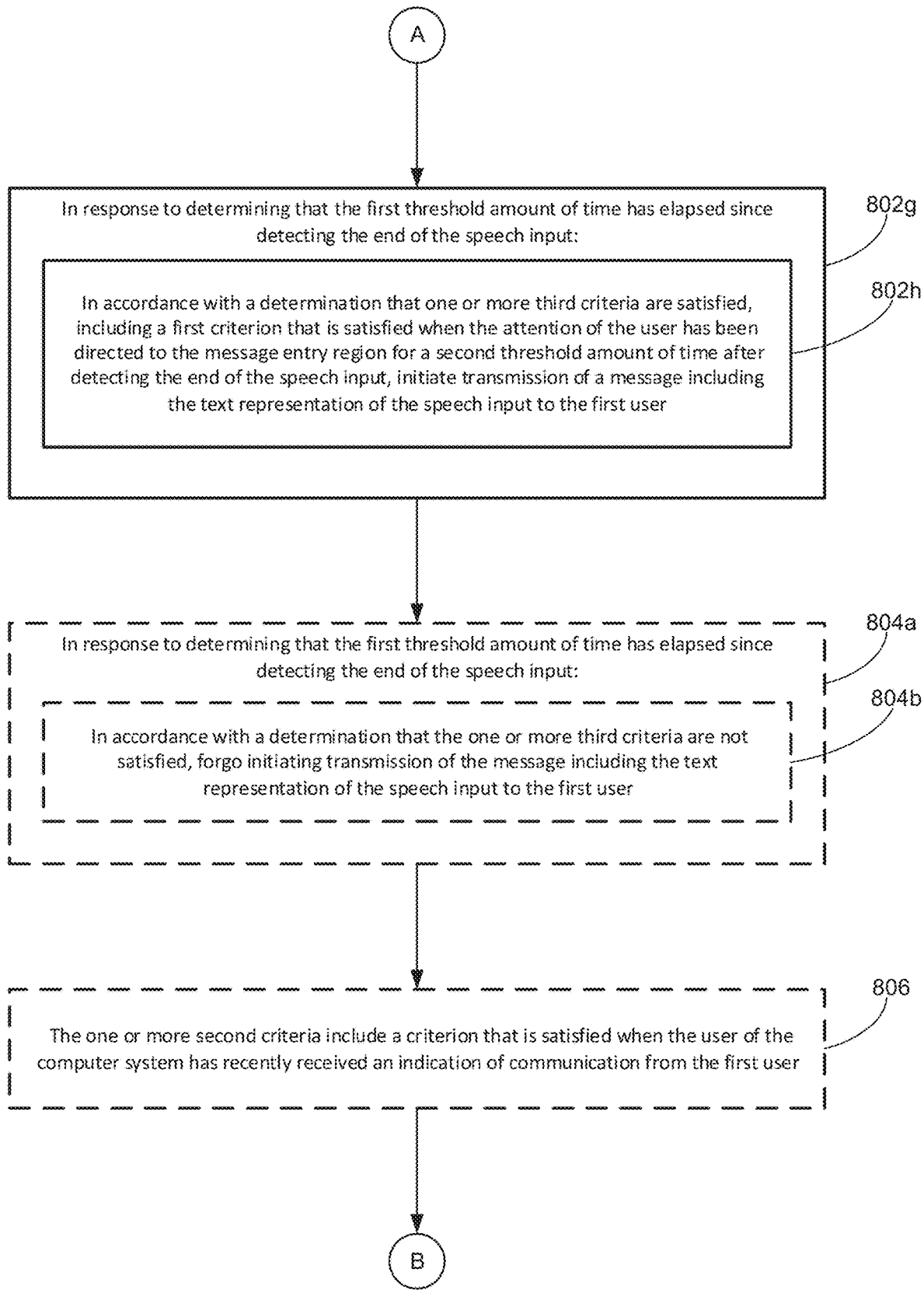
Figure 8C:
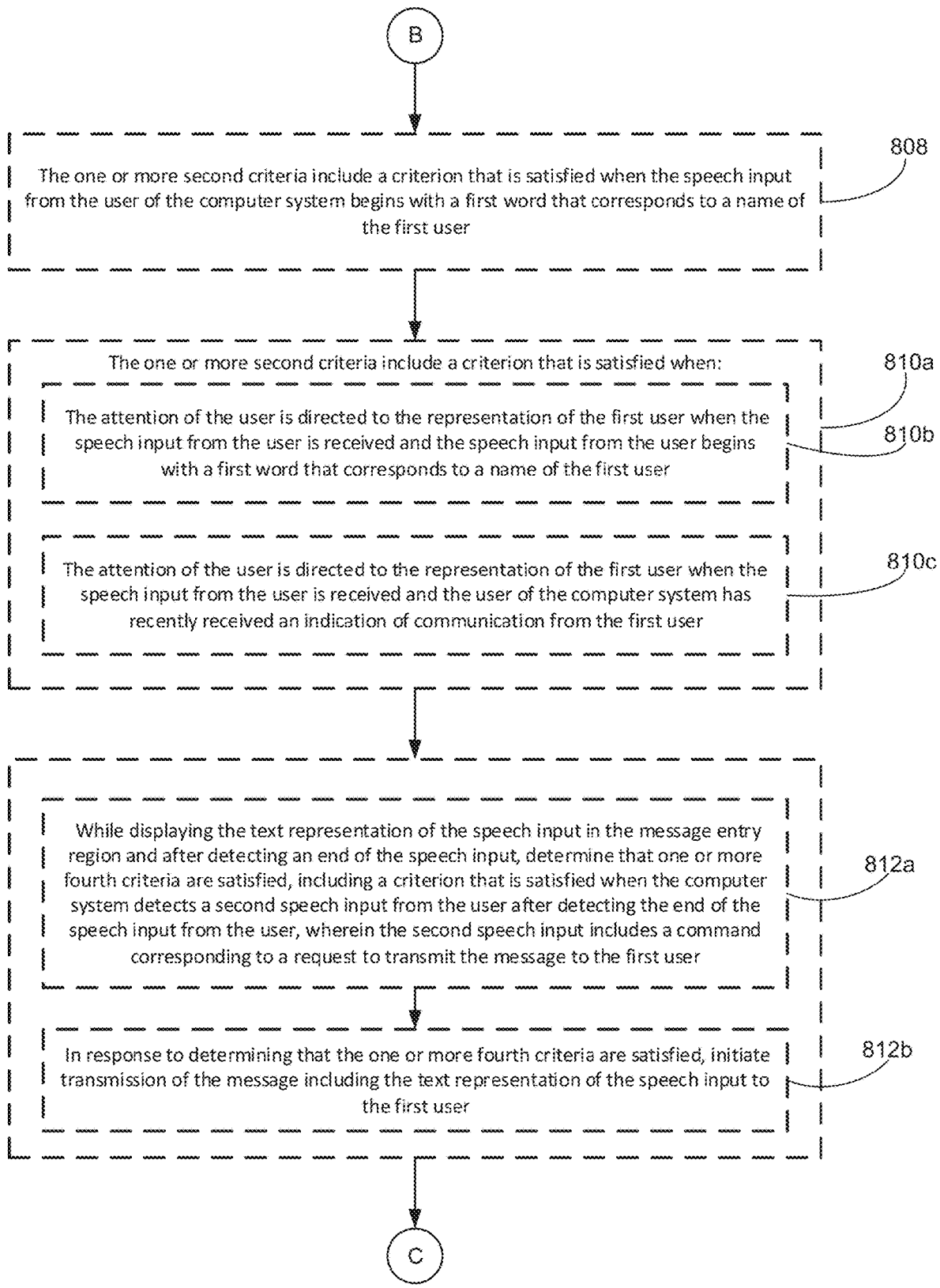
Figure 8D:
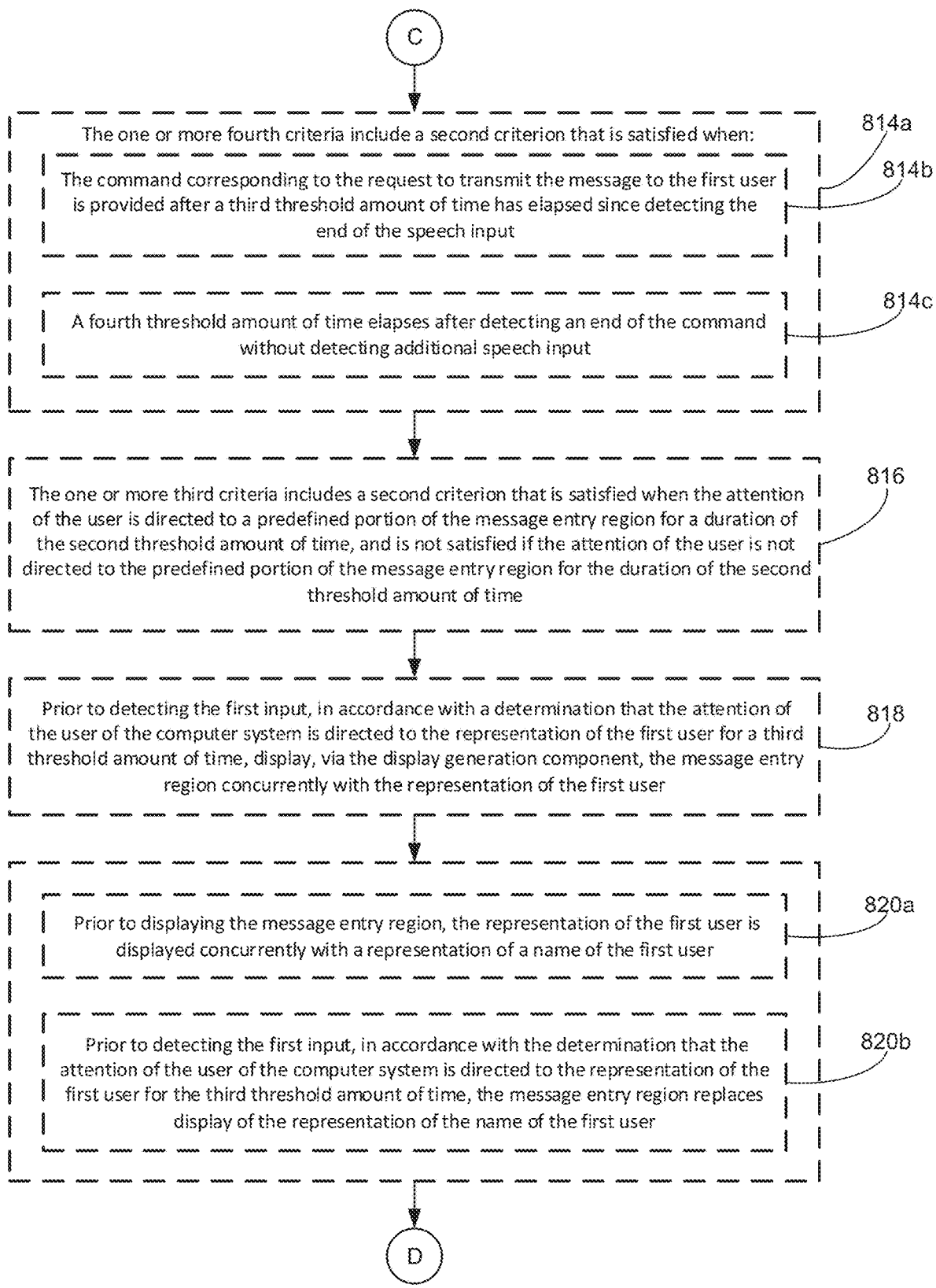
Figure 8E:
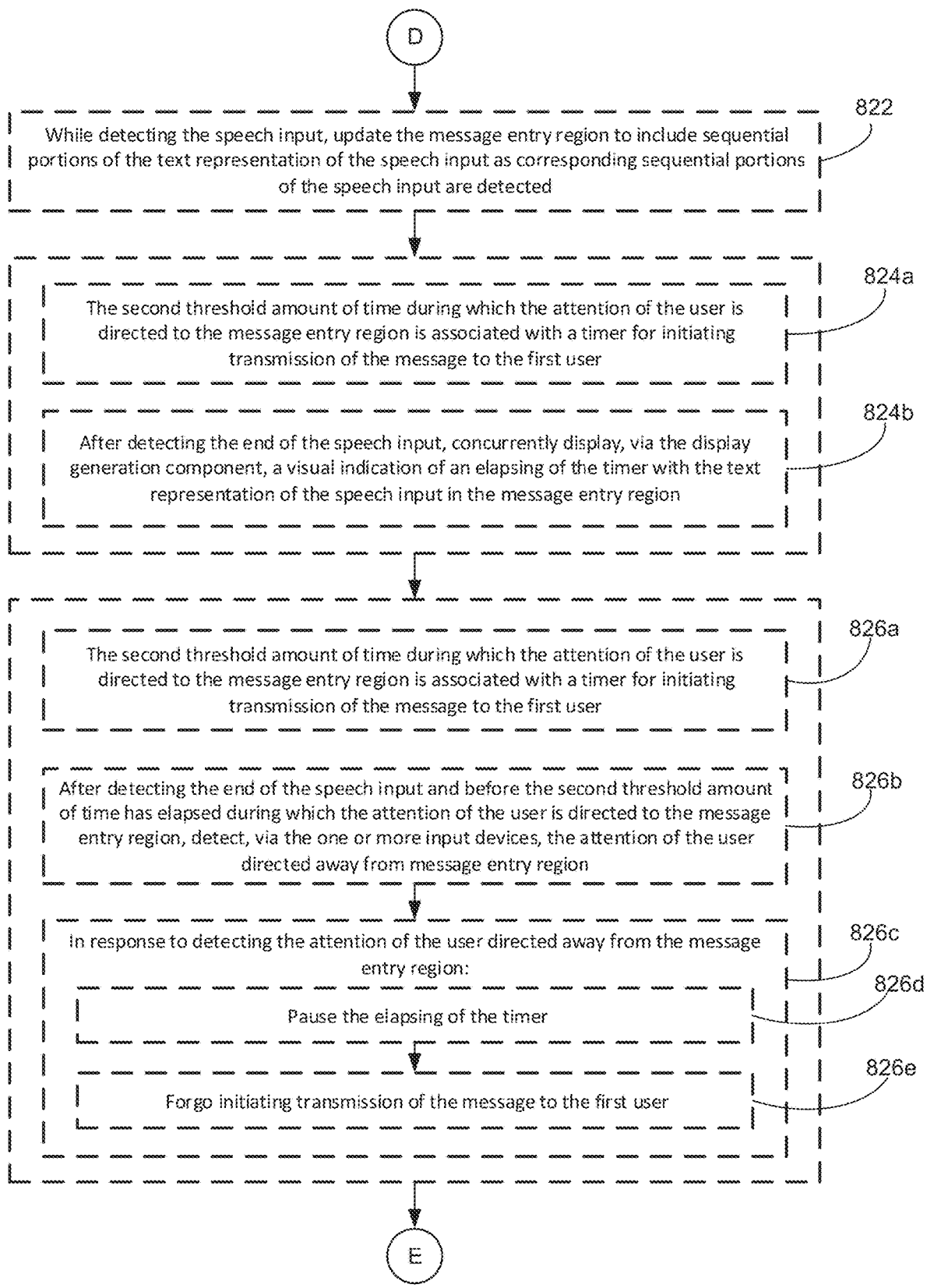
Figure 8F:
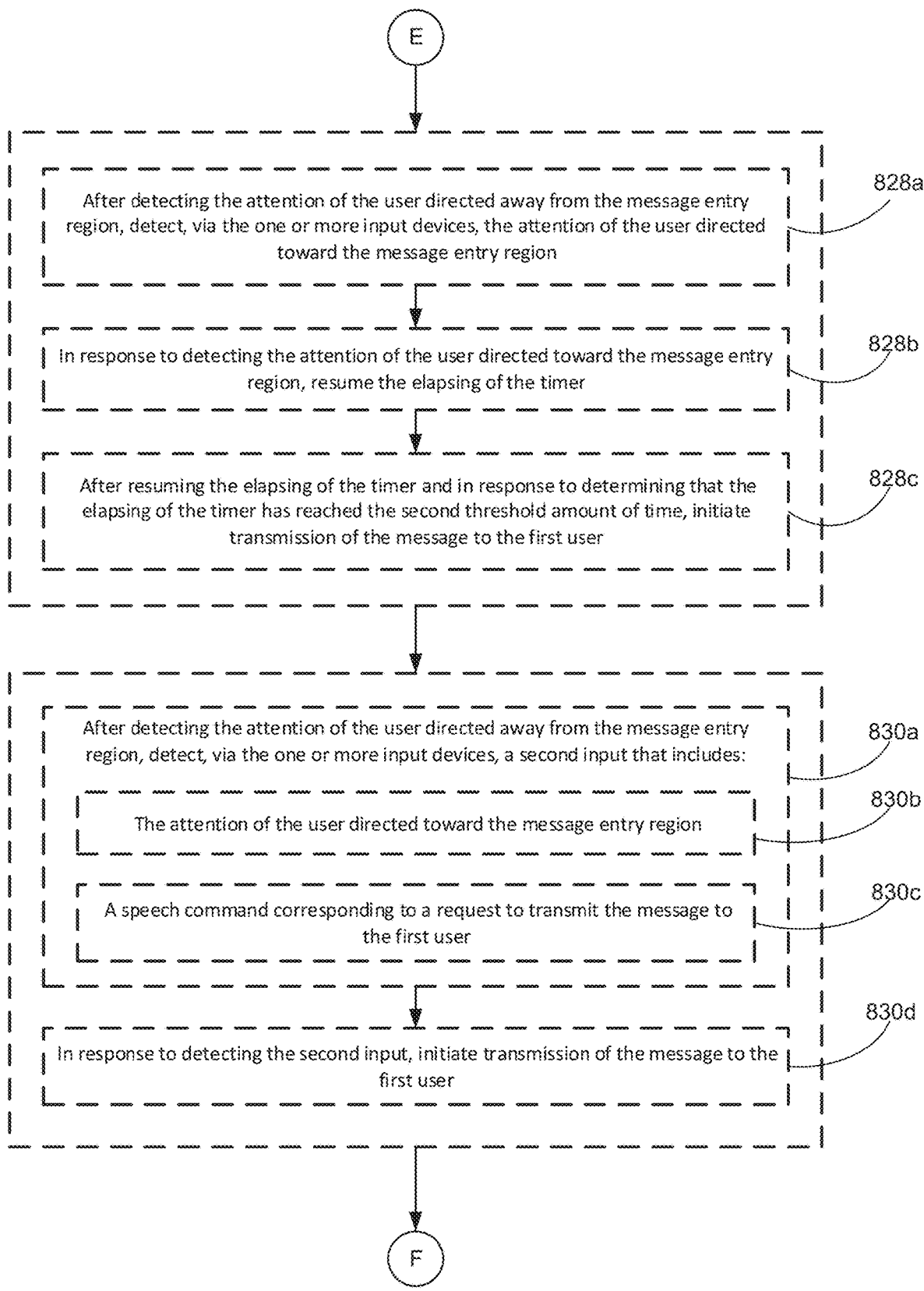
Figure 8G:
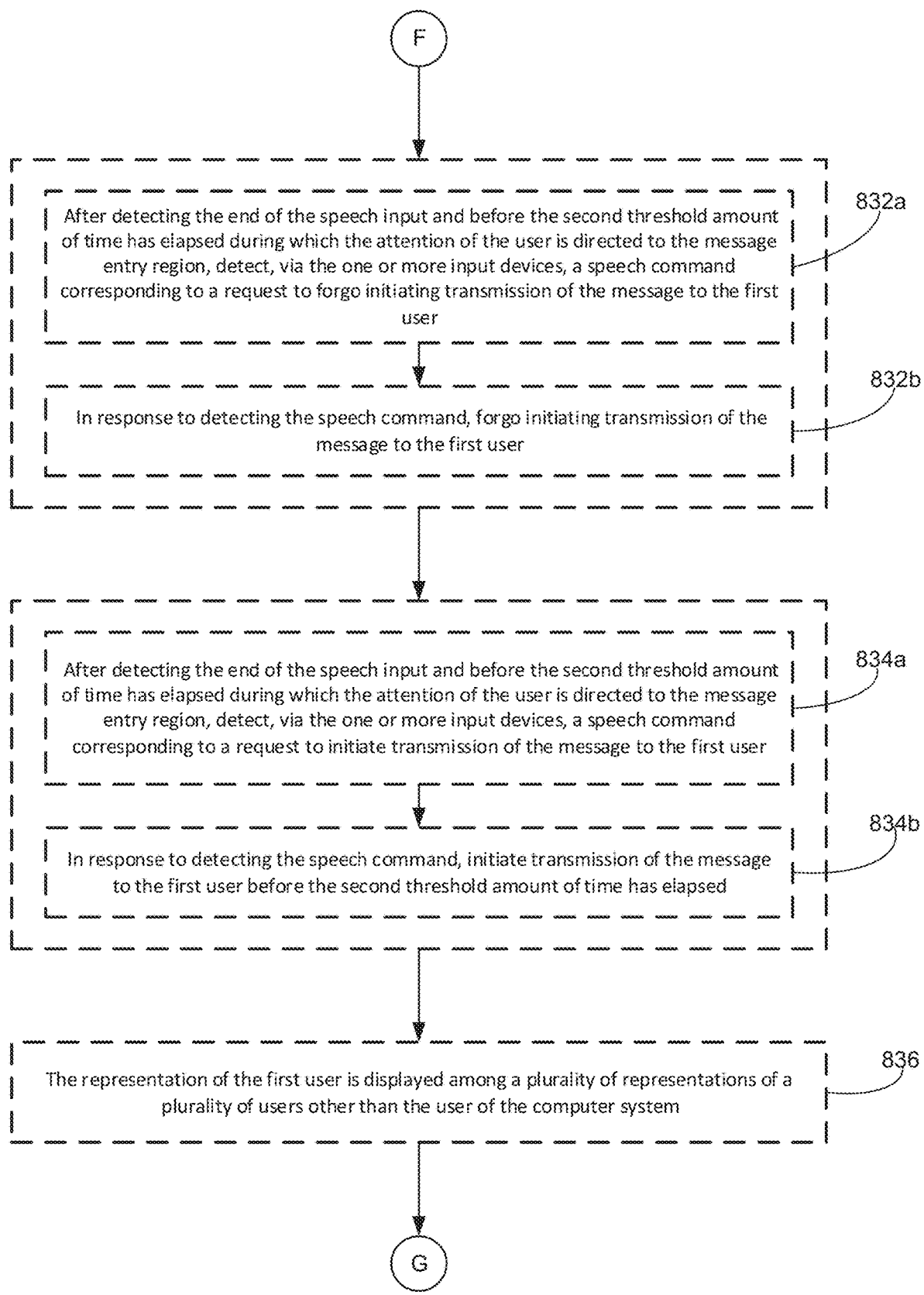
Figure 8H:
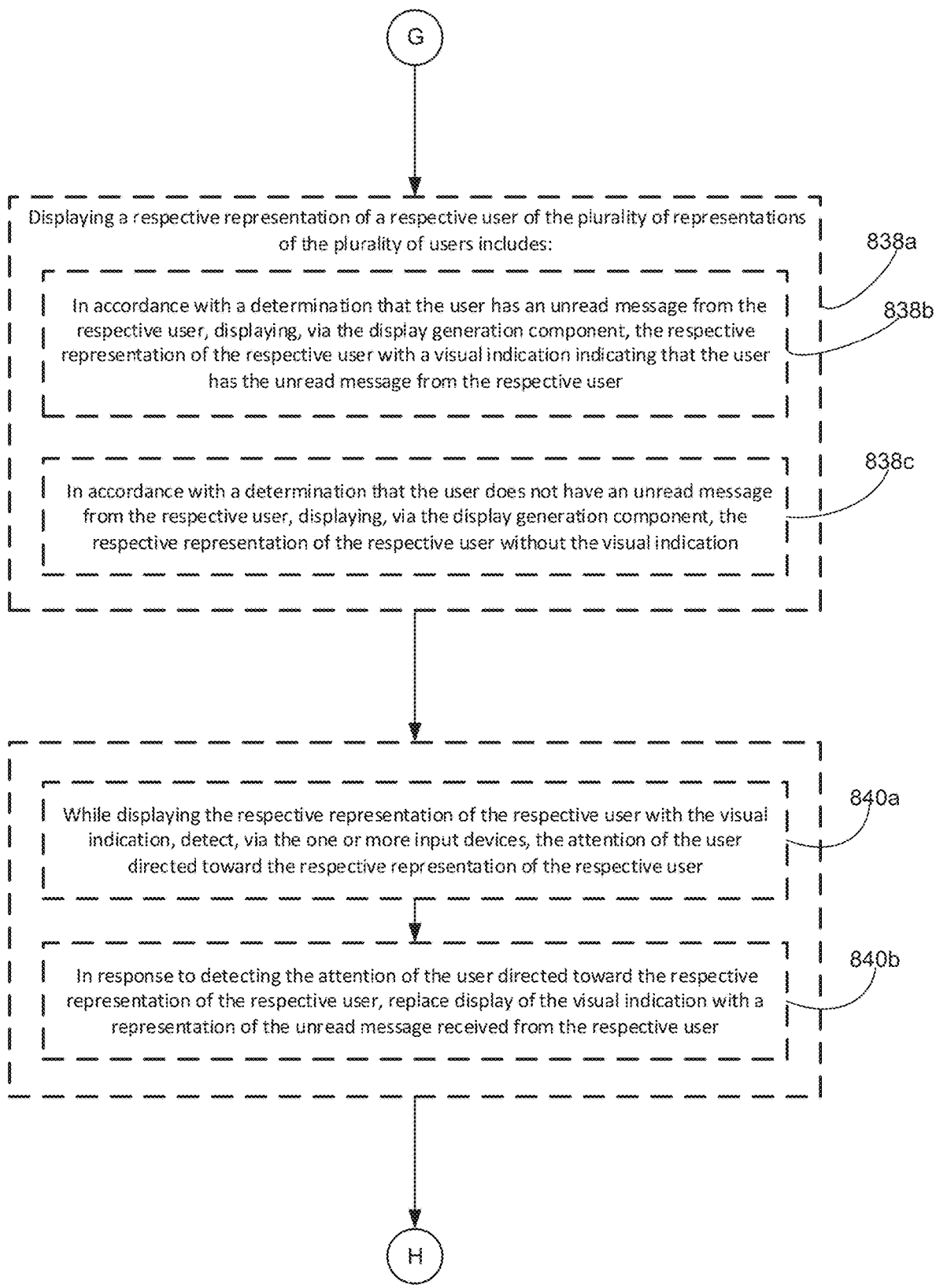
Figure 8I:
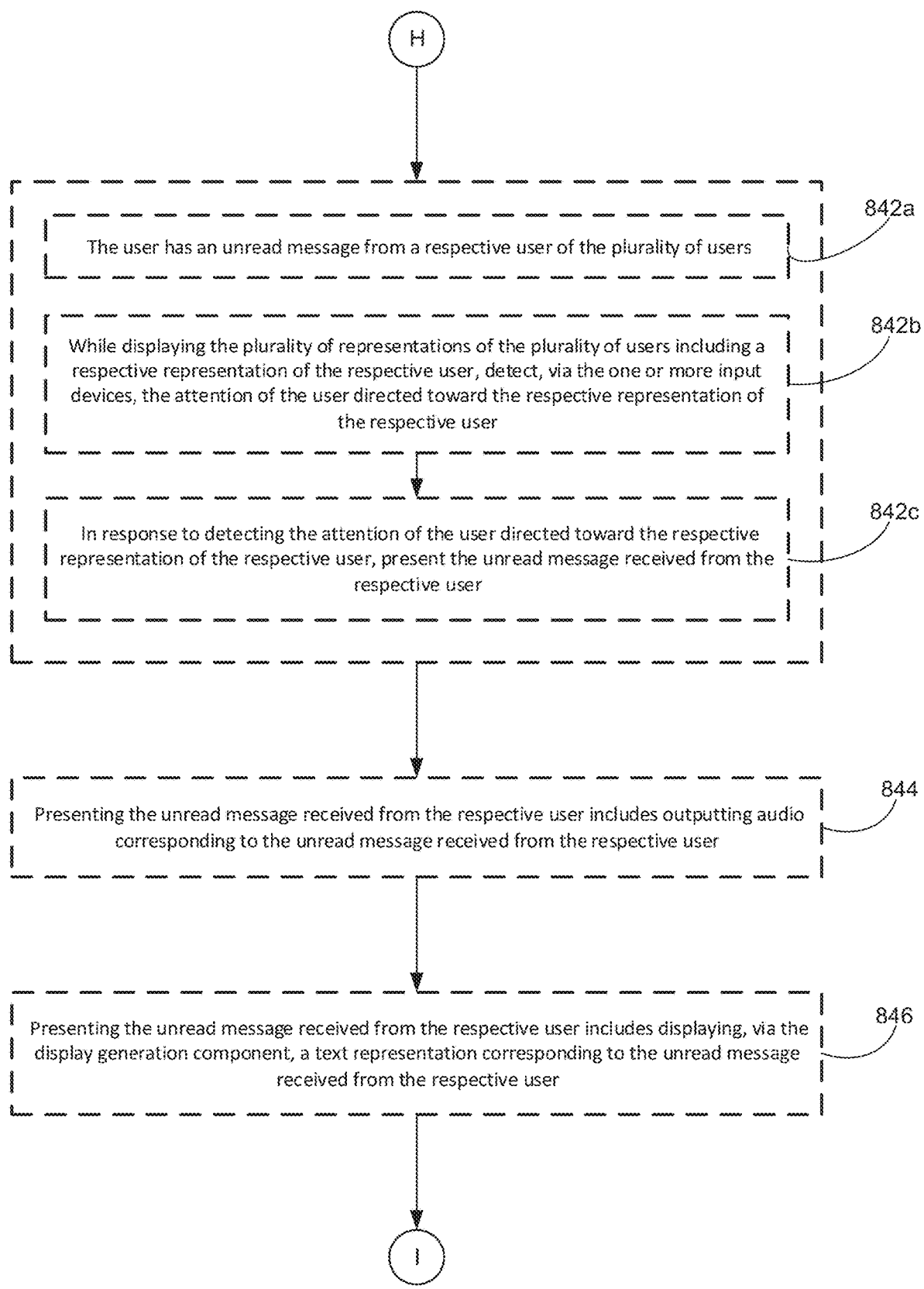
Figure 8J:
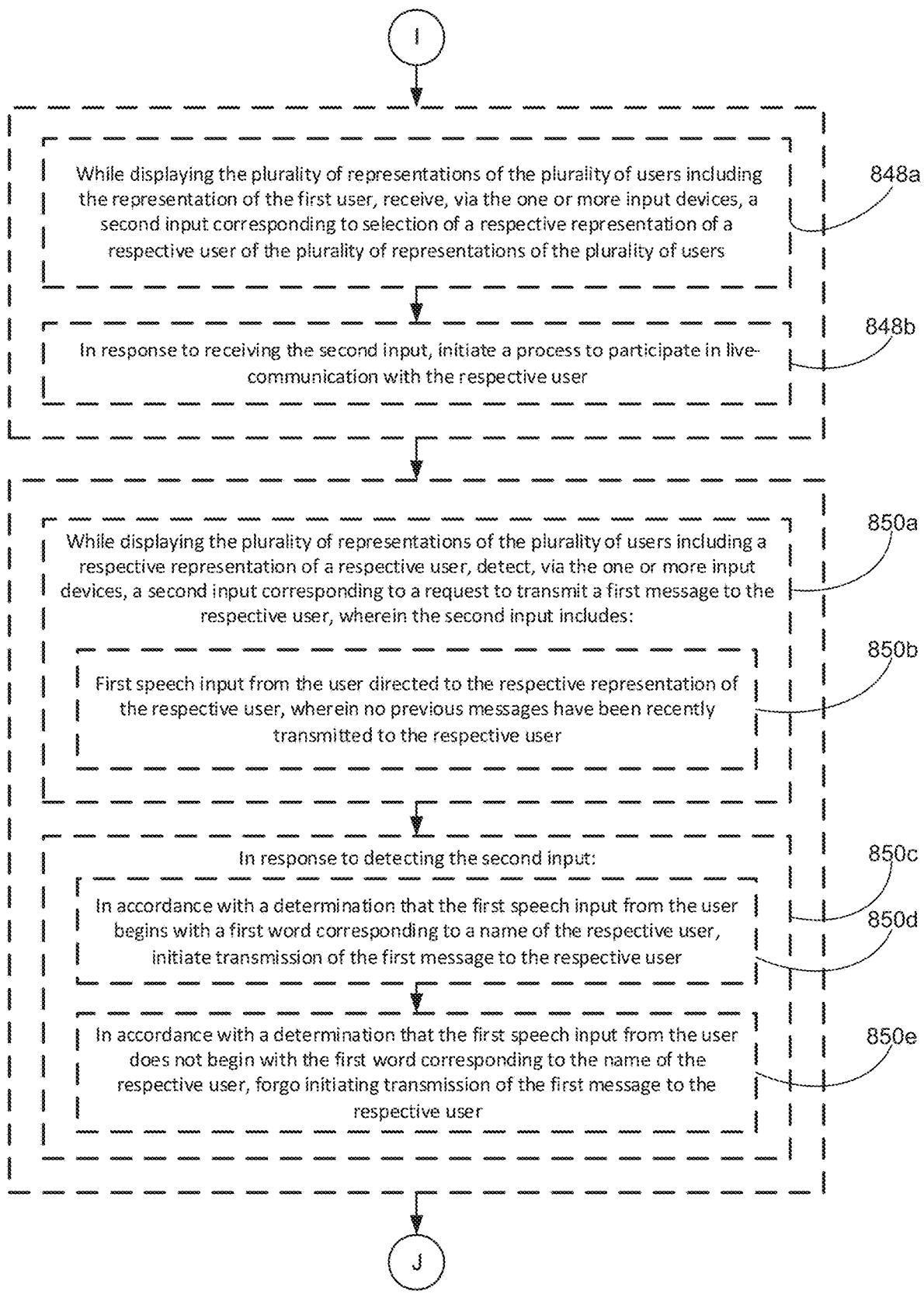
Figure 8K:
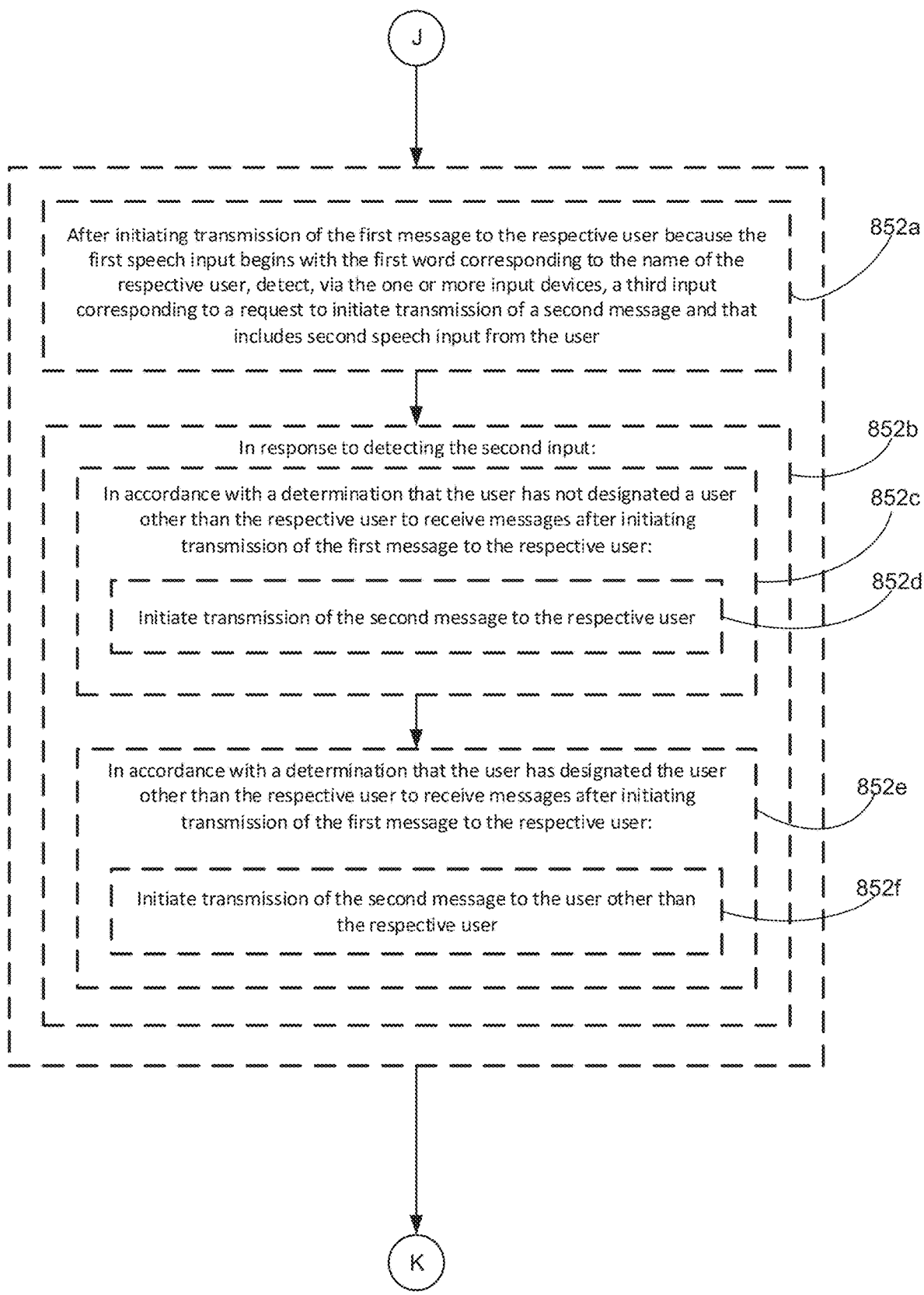
Figure 8L:
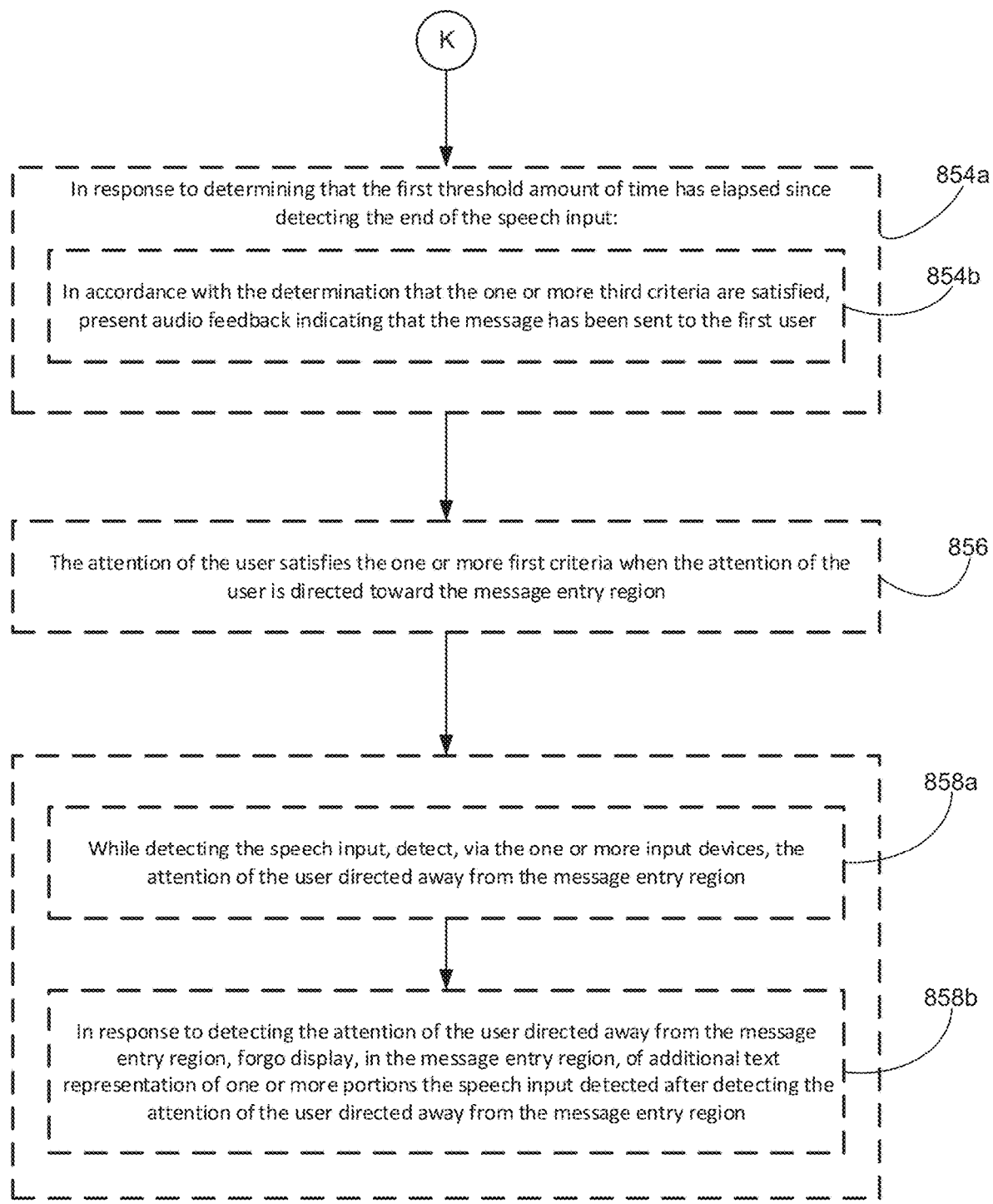

In some embodiments, when the countdown for sending the message including the text representation 712*b* to the second user elapses, the computer system 101 transmits the message to the second user. For example, the computer system 101 transmits information to a second computer system associated with the second user that enables the second computer system to present the message including the text representation 712*b* to the second user. In some embodiments, as shown in FIG. 7G, when the message including the text representation 712*b* is sent to the second user, the computer system 101 outputs audio 719*b* indicating that the message has been sent to the second user. For example, the computer system 101 emits a chime, ring, or tune (e.g., via a speaker device in communication with the computer system 101). Additionally, in some embodiments, after sending the message to the second user, the computer system 101 ceases display of the second message dictation platter 709*b* and redisplays the representation 708*b* of the name associated with the second user in three-dimensional environment 702, as shown in FIG. 7G.

FIGS. 8A-8L is a flowchart illustrating an exemplary method 800 of sending a quick message to a respective user based on speech input provided by a user of the computer system in a three-dimensional environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., 314). For example, the computer system is or includes a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the computer system displays (802*a*), via the display generation component, a representation of a first user other than a user of the computer system, such as the first representation 704 of the first user in FIG. 7A. For example, the representation of the first user is displayed in an environment that corresponds to a physical environment surrounding the display generation component and/or the computer system or a virtual environment. In some embodiments, the representation of the user is displayed in a three-dimensional environment. In some embodiments, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment, etc.). In some embodiments, the physical environment is visible through a transparent portion of the display generation component (e.g., true or real passthrough). In some embodiments, a representation of the physical environment is displayed in the three-dimensional environment via the display generation component (e.g., virtual or video passthrough). In some embodiments, the representation of the first user is displayed among a plurality of representations of users other than the user of the computer system in the three-dimensional environment. In some embodiments, the representations of the users other than the user of the computer system (including the representation of the first user) are contacts in a contacts user interface of a messaging application running on the computer system. In some embodiments, as described below, the representation of the first user is interactable (e.g., via selection, speech, or attention-based input) to initiate communication with (e.g., via a text or voice message, a phone call, or a co-presence session) the first user. In some embodiments, the representation of the first user includes an image (e.g., two-dimensional or three-dimensional image) of or corresponding to the first user, a name associated with the first user, and/or a phone number associated with the first user.

In some embodiments, while displaying the representation of the first user, the computer system detects (802*b*), via the one or more input devices, a first input that includes attention of the user (e.g., a gaze of the user) of the computer system (802*c*), such as first gaze 721 in FIG. 7A, (e.g., the computer system detects that the user is looking at a portion of the representation of the first user in the three-dimensional environment. In some embodiments, the representation of the first user is not presented as part of a real-time communication session between the computer system and a second computer system. For example, the computer system detects the attention of the user outside of (e.g., while not in) a real-time communication session. For example, the representation of the first user is displayed as part of an asynchronous communication (e.g., messaging) session that includes the first user and the user of the computer system.), and speech input from the user (e.g., speech input 716*a* in FIG. 7A) while the attention of the user satisfies one or more first criteria (802*d*). For example, the computer system detects, via a microphone in communication with the computer system, the user speaking words, numbers, letters and/or special characters (e.g., non-letter symbols included in written text) for compiling a message to be sent to the first user. In some embodiments, while detecting the attention of the user directed to the representation of the first user and the first input, the computer system does not detect an additional input (e.g., via one or more input devices other than the eye tracking device and/or microphone, such as not detecting input from one or more hands of the user) corresponding to a request to send a message to the first user. In some embodiments, as described below, the one or more first criteria is satisfied when the attention of the user is directed toward the representation of the first user while the speech input is being provided. In some embodiments, the one or more first criteria is satisfied when the attention of the user is directed to a predefined portion of a message entry region, as described below. In some embodiments, if the one or more first criteria is not satisfied (e.g., because the attention of the user is not directed toward the representation of the first user while the speech input is being provided), the computer system forgoes initiation of transmitting a message to the first user, as described below.

In some embodiments, in response to detecting the first input, in accordance with a determination that one or more second criteria are satisfied, the computer system displays (802*e*), via the display generation component, a text representation of the speech input in a message entry region associated with transmitting messages to the first user without providing a representation of the speech input to the first user, such as the display of text representation 712*a* in message dictation platter 709*a* as shown in FIG. 7B. For example, the message entry region is or includes a text entry field. In some embodiments, the message entry region is an interactive user interface element that accepts text input. In some embodiments, in accordance with a determination that the one or more second criteria are not satisfied, the computer system forgoes displaying the text representation of the speech input in the message entry region. In some embodiments, the message entry region is not displayed in the three-dimensional environment prior to detecting the first input (e.g., prior to detecting the attention of the user directed to the representation of the first user and/or the speech input). In some embodiments, if the one or more second criteria are satisfied, which are described below, the message entry region is displayed with (e.g., above, below, to a side of, or within a portion of) the representation of the first user in the three-dimensional environment in response to detecting an initiation of the first input (e.g., in response to detecting attention directed to the representation of the first user and before detecting the speech input, or in response to detecting attention directed to the representation of the first user and detecting the start of the speech input from the user). In some embodiments, the text representation of the speech input is a font-based representation of the words and/or characters spoken by the user. In some embodiments, the text representation of the speech input populates a portion of (e.g., the text entry field in) the message entry region as the computer system detects the words and/or characters spoken by the user. For example, the text representation of the speech input is displayed in the message entry region in real time (e.g., within 0.05, 0.1, 0.4, 0.5, 0.8, 1, 1.2, or 1.5 seconds of detecting the words and/or characters spoken by the user). In some embodiments, the text representation of the speech input is not presented to (e.g., displayed to or read to) the first user while detecting the first input.

In some embodiments, while displaying the text representation of the speech input in the message entry region and after detecting an end of the speech input, such as detecting the end of the speech input 716*b* as shown in FIG. 7B, the computer system determines (8020 that a first threshold amount of time (e.g., 0.5, 1, 1.2, 1.5, 2, 2.5, 3, 4, 5, or 6 seconds) has elapsed since detecting the end of the speech input. For example, the computer system detects the first amount of time has elapsed since detecting a pause or end in the words and/or characters spoken by the user. In some embodiments, determining that the first threshold amount of time has elapsed since detecting the end of the speech input corresponds to a determination that the user has finished composing the message to be sent to the first user. In some embodiments, in response to detecting additional speech input after the first threshold amount of time has elapsed since detecting the end of the speech input, the computer system forgoes displaying additional text representation of the additional speech input in the message entry region. For example, the computer system forgoes transcribing the additional words and/or character spoken by the user after the first threshold amount of time has elapsed. In some embodiments, in response to detecting additional speech input before the first threshold amount of time has elapsed since detecting the end of the speech input, the computer system adds additional text representation of the additional speech input at the end of the message in the message entry region.

In some embodiments, in response to determining that the first threshold amount of time has elapsed since detecting the end of the speech input (802*g*), in accordance with a determination that one or more third criteria are satisfied, including a first criterion that is satisfied when the attention of the user has been directed to the message entry region for a second threshold amount of time after detecting the end of the speech input, such as second gaze 723 directed to the message dictation platter 709*b* in FIG. 7F, the computer system initiates (802*h*) transmission of a message including the text representation of the speech input to the first user, such as transmission of the message to the second user ("Jane") as shown in FIG. 7G. For example, the computer system detects that the gaze of the user is directed toward a portion of the message entry region for the second threshold amount of time, such as 0.25, 0.5, 1, 1.5, 2, 2.5, 3, 3.5, or 4 seconds, after detecting the end of the speech input. In some embodiments, as described below, the attention of the user is directed to an option within the message entry region and/or an end of the text representation for the second threshold amount of time. In some embodiments, satisfaction of the first criterion satisfies the one or more third criteria. In some embodiments, an amount of the second threshold amount of time overlaps with an amount of the first threshold amount of time. For example, the second threshold amount of time is equal to the first threshold amount of time, such that the computer system detects the attention of the user directed to the message entry region for the same amount of time as the time elapsed after detecting the end of the speech input. In some embodiments, the second threshold amount of time is less than the first threshold amount of time. In some embodiments, the second threshold amount of time is greater than the first threshold amount of time. In some embodiments, the text representation remains displayed in the message entry region while the computer system detects passage of the second threshold amount of time. For example, while the second threshold amount of time passes, the user of the computer system can actively review (e.g., proofread, edit, add additional text to, and/or check the accuracy of) the text representation of the speech input, in one or more of the manners described below. In some embodiments, after the attention of the user is directed to the message entry region for the second threshold amount of time, the computer system automatically sends the message including the text representation of the words and/or characters spoken by the user to the first user. For example, the computer system sends the message to a computer system (e.g., an electronic device) of the first user so that the first user may consume (e.g., read or listen to) the message at the computer system. In some embodiments, if the attention of the user is not directed to the message entry region for the second threshold amount of time (e.g., because the user looks away from the message entry region before the second threshold amount of time elapses), the computer system forgoes initiating transmission of the message including the text representation of the speech input to the first user. In some embodiments, the elapsing of the second threshold amount of time is paused when the user looks away from the message entry region. In some embodiments, the text representation of the speech input remains displayed in the message entry region when the user looks away from the message entry region. Thus, as discussed above, if the attention of the user is directed to the message entry region for the second threshold amount of time after ceasing to provide the speech input, the computer system will automatically send the message including the text representation to the first user. Transcribing a message and automatically transmitting the message to a recipient based on a duration of attention of the user in the three-dimensional environment reduces the number of inputs needed to transmit a transcribed message to a recipient, thereby improving user-device interaction.

In some embodiments, in response to determining that the first threshold amount of time has elapsed since detecting the end of the speech input (804*a*), in accordance with a determination that the one or more third criteria are not satisfied, the computer system forgoes (804*b*) initiating transmission of the message including the text representation of the speech input to the first user, such as forgoing transmission of the message to the second user (represented by representation 706) as shown in FIG. 7E. For example, the computer system does not send the message to the computer system of the first user so that the first user may selectively consume the message at the computer system of the first user. In some embodiments, the computer system maintains display of the message entry region including the text representation of the speech input in the three-dimensional environment (e.g., until the one or more third criteria are satisfied). Transcribing a message and not automatically transmitting the message to a recipient based on a duration of attention of the user in the three-dimensional environment avoids unintentional sending of a transcribed message to a recipient, thereby improving user-device interaction, and improves user privacy and device security.

In some embodiments, the one or more second criteria include a criterion that is satisfied when the user of the computer system has recently received an indication of communication from the first user (806), such as communication from the second user ("Jane") as shown in FIG. 7A. For example, the one or more second criteria are satisfied when the computer system has received a communication (e.g., message) from the first user within the last 0.25, 0.5, 1, 2, 3, 5, 10, 15, 20, 30, 45, or 60 minutes, or 3, 4, 6, or 8 hours. In some embodiments, the criterion requires that the last communication between the user of the computer system and the first user is a communication from the first user to the user of the computer system. In some embodiments, the computer system generates a notification and/or displays a visual indication that the computer system has recently received an indication of communication from the first user. In some embodiments, the incoming communication includes a text message, an audio message, and/or an email from the first user. In some embodiments, if the user has not recently received an indication of the communication from the first user, the computer system forgoes displaying the text representation of the speech input from the user in the message entry region in the three-dimensional environment. For example, the computer system forgoes displaying the message entry region in the three-dimensional environment. Transcribing a message for automatically transmitting the message to a recipient based on a recency of communication between the user and a recipient of the message avoids unintentional sending of a transcribed message to the recipient, thereby improving user-device interaction, and improves user privacy and device security.

In some embodiments, the one or more second criteria include a criterion that is satisfied when the speech input from the user of the computer system begins with a first word that corresponds to a name of the first user (808), such as speaking the word "John" at the beginning of speech input 716a as shown in FIG. 7A. For example, the one or more second criteria are satisfied when the user of the computer system initially speaks the name of the first user when first providing the speech input. In some embodiments, the name of the first user corresponds to a contact name associated with the first user. In some embodiments, stating the name of the first user at the beginning of the speech input includes speaking a command corresponding to a request to transcribe a message to be sent to the first user. For example, the user of the computer system speaks the phrase "Transmit a message to John" when initially providing the speech input. In some embodiments, if the user does not initially speak the name of the first user when first providing the speech input, the computer system optionally forgoes displaying the text representation of the speech input from the user in the message entry region in the three-dimensional environment. For example, the computer system forgoes displaying the message entry region in the three-dimensional environment. Transcribing a message for automatically transmitting the message to a recipient based on whether the user speaks a name of the recipient when starting to dictate avoids unintentional sending of a transcribed message to the recipient, thereby improving user-device interaction, and improves user privacy and device security.

In some embodiments, the one or more second criteria include a criterion that is satisfied when (810a) the attention (e.g., gaze) of the user is directed to the representation of the first user when the speech input from the user is received (e.g., which also satisfies the one or more first criteria), such as the gaze 721 directed to the first representation 704 of the first user in FIG. 7A, and the speech input from the user begins with a first word that corresponds to a name of the first user (810b), such as speaking the word "John" at the beginning of speech input 716a as shown in FIG. 7A. For example, as described above, the one or more second criteria are satisfied when the user of the computer system initially speaks the name of the first user when first providing the speech input. In some embodiments, if the attention of the user is not directed to the representation of the first user when the speech input is received or if the user does not initially speak the name of the first user when first providing the speech input, the computer system forgoes displaying the text representation of the speech input from the user in the message entry region in the three-dimensional environment. For example, the computer system forgoes displaying the message entry region in the three-dimensional environment.

In some embodiments, the criterion is satisfied when the attention of the user is directed to the representation of the first user when the speech input from the user is received (e.g., which also satisfies the one or more first criteria), such as the gaze 723 directed to the second representation 706 of the second user in FIG. 7A, and the user of the computer system has recently received an indication of communication from the first user (810c), such as communication from the second user ("Jane") as shown in FIG. 7A. For example, as described above, the one or more second criteria are satisfied when the computer system has received a communication from the first user within the last 0.25, 0.5, 1, 2, 3, 5, 10, 15, 20, 30, 45, or 60 minutes, or 3, 4, 6, or 8 hours. In some embodiments, the recent receipt of the communication from the first user substitutes for the above requirement that the speech input from the user begins with a first word corresponding to the name of the first user. In some embodiments, if the attention of the user is not directed to the representation of the first user when the speech input is received or if the user has not recently received an indication of the communication from the first user, the computer system forgoes displaying the text representation of the speech input from the user in the message entry region in the three-dimensional environment. For example, the computer system forgoes displaying the message entry region in the three-dimensional environment. Transcribing a message for automatically transmitting the message to a recipient based on whether the attention of the user is directed toward a representation of the recipient, and whether user speaks a name of the recipient when starting to dictate or based on a recency of communication between the user and a recipient avoids unintentional sending of a transcribed message to the recipient, thereby improving user-device interaction, and improves user privacy and device security.

In some embodiments, while displaying the text representation of the speech input in the message entry region and after detecting an end of the speech input (e.g., an end of speech input 716b as shown in FIG. 7B), the computer system determines (812*a*) that one or more fourth criteria are satisfied, including a criterion that is satisfied when the computer system detects a second speech input from the user after detecting the end of the speech input from the user, wherein the second speech input includes a command corresponding to a request to transmit the message to the first user, such as speech input 716*c* including the command "Send" in FIG. 7C. For example, before the computer system has transmitted the message including the text representation of the speech input to the first user, the computer system detects second speech input after the speech input that includes an explicit command for initiating transmission of the message to the first user. In some embodiments, the command for transmitting the message to the first user includes the phrase "send it" or any equivalents (e.g., "send," "transmit," "send message," and/or "transmit message"). In some embodiments, the one or more fourth criteria are determined to be satisfied prior to determining whether the one or more third criteria are satisfied.

In some embodiments, in response to determining that the one or more fourth criteria are satisfied (optionally prior to determining that the first threshold amount of time has elapsed since detecting the end of the speech input), the computer system initiates (812*b*) transmission of the message including the text representation of the speech input to the first user, such as transmission of the message to the first user ("John") as shown in FIG. 7D. For example, if the computer system detects a command to transmit the message to the first user after detecting the end of the speech input, the computer system transmits the message to the first user. In some embodiments, if the one or more fourth criteria are not satisfied because the computer system does not detect the command, the computer system determines whether the first threshold amount of time has elapsed, and subsequently determines whether the one or more third criteria are satisfied, described above. In some embodiments, if the one or more third criteria are satisfied, and the one or more fourth criteria are not satisfied, the computer system transmits the message to the first user. Transcribing a message and automatically transmitting the message to a recipient in response to detecting a command to transmit the message avoids unintentional sending of a transcribed message to the recipient and/or enables a transcribed message to be transmitted to a recipient without waiting for a threshold amount of time to elapse, thereby improving user-device interaction.

In some embodiments, the one or more fourth criteria include a second criterion that is satisfied when (814*a*) the command corresponding to the request to transmit the message to the first user is provided after a third threshold amount of time has elapsed since detecting the end of the speech input (814*b*), as described with reference to FIG. 7C. For example, the one or more fourth criteria are satisfied when the computer system detects a pause (e.g., having a duration of 0.25, 0.5, 0.75, 1, 1.5, 2, 3, 4, or 5 seconds) between detecting the end of the speech input and detecting the second speech input including the command. In some embodiments, the second criterion is satisfied when the fourth threshold amount of time elapses after detecting an end of the command without detecting additional speech input (814*c*), as described with reference to FIG. 7C. For example, the one or more fourth criteria are satisfied when the computer system detects a pause (e.g., having a duration of 0.25, 0.5, 0.75, 1, 1.5, 2, 3, 4, or 5 seconds) after detecting the end of the second speech input (and not detecting additional speech input from the user). In some embodiments, if the computer system does not detect a pause between the end of the speech input and the command, and if the computer system does not detect a pause after the command, the computer system forgoes initiating transmission of the message including the text representation of the speech input to the first user. In some embodiments, if the computer system does not detect a pause between the end of the speech input and the command, or if the computer system does not detect a pause after the command, the computer system forgoes initiating transmission of the message including the text representation of the speech input to the first user. Transcribing a message and automatically transmitting the message to a recipient in response to detecting a command to transmit the message with a pause avoids unintentional sending of a transcribed message to the recipient, thereby improving user-device interaction, and improves user privacy and device security.

In some embodiments, the one or more third criteria includes a second criterion that is satisfied when the attention (e.g., gaze) of the user is directed to a predefined portion of the message entry region (e.g., gaze 723 directed to send option 711*b* as shown in FIG. 7F) for a duration of the second threshold amount of time (e.g., 0.25, 0.5, 1, 1.5, 2, 2.5, 3, 3.5, or 4 seconds), and is not satisfied if the attention of the user is not directed to the predefined portion of the message entry region for the duration of the second threshold amount of time (816), such as gaze 723 directed away from the send option 711*b* as shown in FIG. 7E. For example, the one or more third criteria are satisfied when the attention of the user is directed to the predefined portion of the message entry region for the second threshold amount of time. In some embodiments, the predefined portion of the message entry region includes a send option displayed within the message entry region (e.g., adjacent to the text representation of the speech input). In some embodiments, the predefined portion of the message entry region includes an end or other portion of the text representation of the speech input (e.g., a last word displayed in the message entry region). In some embodiments, if the attention of the user is not directed to the predefined portion of the message entry region for the second threshold amount of time, the computer system forgoes initiating transmission of the message to the first user. Transcribing a message and automatically transmitting the message to a recipient based on a duration of attention of the user and a location of the attention of the user in the three-dimensional environment reduces the number of inputs needed to transmit a transcribed message to a recipient, thereby improving user-device interaction.

In some embodiments, prior to detecting the first input, in accordance with a determination that the attention (e.g., gaze) of the user of the computer system is directed to the representation of the first user for a third threshold amount of time (e.g., 0.5, 1, 1.5, 2, 2.5, 3, 3.5, 4, or 5 seconds), the computer system displays (818), via the display generation component, the message entry region concurrently with the representation of the first user, as described with reference to FIG. 7B. For example, if the computer system detects the attention of the user directed to the representation of the first user for the third threshold amount of time before detecting the first input from the user, the computer system displays the message entry region in the three-dimensional environment. In some embodiments, the message entry region is displayed with (e.g., below, above, or to a side of) the representation of the first user in the three-dimensional environment. In some embodiments, the message entry region does not include text representation of respective speech input from the user because the user has not yet provided the respective speech input. Displaying a message entry region for transcribing a message to a recipient based on a duration of attention of the user and a location of the attention of the user in the three-dimensional environment provides feedback that message dictation is activated for transcribing a message for a recipient, thereby improving user-device interaction.

In some embodiments, prior to displaying the message entry region, the representation of the first user is displayed concurrently with a representation of a name of the first user (820*a*), such as representation 708*a* in FIG. 7A. For example, the representation of the first user is concurrently displayed with a representation of a contact name associated with the first user. In some embodiments, the representation of the name of the first user is displayed below the representation of the first user in the three-dimensional environment.

In some embodiments, prior to detecting the first input, in accordance with the determination that the attention (e.g., gaze) of the user of the computer system is directed to the representation of the first user for the third threshold amount of time (e.g., 0.5, 1, 1.5, 2, 2.5, 3, 3.5, 4, or 5 seconds), the message entry region replaces display of the representation of the name of the first user (820*b*), such as replacing the representation 708*a* with the message dictation platter 709*a* as shown in FIG. 7B. For example, if the attention of the user is directed to the representation of the first user for the third threshold amount of time described above, the computer system replaces display of the representation of the name of the first user with the message entry region. In some embodiments, the computer system displays the message entry region at a location of the representation of the name of the first user in the three-dimensional environment, and ceases display of the representation of the name of the first user in the three-dimensional environment. In some embodiments, after detecting the first input, when the computer system transmits the message including the text representation of the speech input to the first user because the one or more third criteria are satisfied, the computer system redisplays the representation of the name of the first user in the three-dimensional environment (e.g., and ceases display of the message entry region in the three-dimensional environment). Replacing display of a representation of a name of a recipient with a message entry region for transcribing a message to the recipient based on a duration of attention of the user and a location of the attention of the user in the three-dimensional environment reduces occupancy of a portion of the three-dimensional environment when transcribing a message for a recipient, thereby improving user-device interaction.

In some embodiments, while detecting the speech input, the computer system updates (822) the message entry region to include sequential portions of the text representation of the speech input as corresponding sequential portions of the speech input are detected, such as update of the message dictation platter 709*a* with sequential portions of the text representation 712*a* as shown from FIGS. 7B-7C. For example, the computer system updates display of the text representation of the speech input from the user in the message entry region in real time (e.g., within 0.1, 0.25, 0.5, 0.75, 0.9, 1, 1.25, 1.5, or 2 seconds of detecting each portion (e.g., word, number, or character) of the speech input. In some embodiments, the computer system updates display of the text representation of the speech input per letter and/or digit of the words and/or numbers, respectively, spoken by the user, and/or per word of the phrases and/or sentences spoken by the user. Displaying a transcribed message in a message entry region in the three-dimensional environment for transmitting the transcribed message to a recipient enables the user to selectively modify the transcribed message before transmitting the transcribed message to the recipient, thereby improving user-device interaction.

In some embodiments, the second threshold amount of time (e.g., 0.25, 0.5, 1, 1.5, 2, 2.5, 3, 3.5, or 4 seconds) during which the attention of the user is directed to the message entry region is associated with a timer for initiating transmission of the message to the first user (824*a*) (e.g., the computer system transmits the message including the text representation of the speech input to the first user after the timer elapses), as described with reference to FIG. 7C. In some embodiments, after (e.g., in response to) detecting the end of the speech input, the computer system concurrently displays (824*b*), via the display generation component, a visual indication of an elapsing of the timer with the text representation of the speech input in the message entry region, such as timer indication 714*a* in FIG. 7C. For example, the computer system displays a visual indication of a countdown of the timer in the three-dimensional environment indicating a time until the message will be transmitted to the first user (e.g., which is equal to the second threshold amount of time described above) after detecting the end of the speech input. In some embodiments, the visual indication is displayed with (e.g., adjacent to, above, or below) the message entry region in the three-dimensional environment. In some embodiments, the visual indication is displayed within a portion of or overlaid on the message entry region in the three-dimensional environment (e.g., adjacent to the text representation of the speech input in the message entry region). In some embodiments, the timer continues to count down while the attention of the user remains directed toward the message entry region in the three-dimensional environment. In some embodiments, as described below, the countdown of the timer can be paused in the three-dimensional environment to (e.g., temporarily) forgo initiating transmission of the message to the first user while the timer is paused. Displaying a visual indication of a timer in the three-dimensional environment for transmitting a transcribed message to a recipient facilitates discovery that the transcribed message will be sent to the recipient once the timer elapses and/or enables the user to selectively modify the transcribed message before transmitting the transcribed message to the recipient, thereby improving user-device interaction.

In some embodiments, the second threshold amount of time (e.g., 0.25, 0.5, 1, 1.5, 2, 2.5, 3, 3.5, or 4 seconds) during which the attention of the user is directed to the message entry region is associated with a timer for initiating transmission of the message to the first user (826*a*) (e.g., the computer system transmits the message including the text representation of the speech input to the first user after the timer elapses, as described above). In some embodiments, after (e.g., in response to) detecting the end of the speech input and before the second threshold amount of time has elapsed during which the attention of the user is directed to the message entry region, the computer system detects (826*b*), via the one or more input devices, the attention of the user directed away from message entry region, such as gaze 723 directed away from the message dictation platter 709*b* as shown in FIG. 7E. For example, the computer system detects the attention of the user move from the message entry region in the three-dimensional environment to a different location in the three-dimensional environment (e.g., empty space within the three-dimensional environment, an application window displayed in the three-dimensional environment, or a representation of a second user in the three-dimensional environment). In some embodiments, before the computer system detects the attention of the user move away from the message entry region in the three-dimensional environment, the three-dimensional environment includes a visual indication of a countdown of the timer in the three-dimensional environment indicating a time until the message will be transmitted to the first user, as discussed above.

In some embodiments, in response to detecting the attention of the user directed away from the message entry region (826c), the computer system pauses (826d) the elapsing of the timer, such as pausing the elapsing of the timer indication 714b as shown in FIG. 7E. For example, the computer system stops the countdown of the timer in response to detecting the attention move away from the message entry region in the three-dimensional environment. In some embodiments, the computer system updates display of the visual indication of the countdown of the timer to indicate that the elapsing of the timer has been paused (e.g., the visual indication is displayed with a "paused" indicator or label).

In some embodiments, the computer system forgoes (826e) initiating transmission of the message to the first user, as described with reference to FIG. 7E (e.g., until the attention of the user is redirected back to the message entry region and the countdown of the timer resumes and becomes exhausted, as described below). For example, the computer system does not send the message including the text representation of the speech input from the user to the first user after the second threshold amount of time has elapsed. In some embodiments, because the timer is paused in response to detecting the attention of the user move away from the message entry region, the computer system forgoes initiating transmission of the message to the first user even after the second threshold amount of time elapses after detecting the end of the speech input. Pausing a timer for transmitting a transcribed message to a recipient based on a location of attention of the user in the three-dimensional environment enables the user to selectively modify the transcribed message before transmitting the transcribed message to the recipient, thereby improving user-device interaction.

In some embodiments, after detecting the attention (e.g., the gaze) of the user directed away from the message entry region, the computer system detects (828a), via the one or more input devices, the attention of the user directed toward the message entry region, such as gaze 723 directed back toward the message dictation platter 709b as shown in FIG. 7F. For example, the computer system detects the attention of the user move back to the message entry region in the three-dimensional environment. In some embodiments, in response to detecting the attention of the user directed toward the message entry region, the computer system resumes (828b) the elapsing of the timer, such as resuming the elapsing of the timer indication 714b as shown in FIG. 7F. For example, the computer system resumes the countdown of the timer in response to detecting the attention move back to the message entry region in the three-dimensional environment. In some embodiments, the computer system updates display of the visual indication of the countdown of the timer to indicate that the elapsing of the timer has been resumed (e.g., the visual indication is no longer displayed with the "paused" indicator or label).

In some embodiments, after resuming the elapsing of the timer and in response to determining that the elapsing of the timer has reached the second threshold amount of time, the computer system initiates (828c) transmission of the message to the first user, such as transmission of the message to the second user ("Jane") as shown in FIG. 7G. For example, the computer system transmits the message including the text representation of the speech input from the user to the first user after the second threshold amount of time of the timer has elapsed. In some embodiments, because the timer is resumed in response to detecting the attention of the user move back to the message entry region, the computer system resumes the timer from the point in time at which the timer was last paused, and transmits the message to the first user when the timer reaches the second threshold amount of time after detecting the end of the speech input. For example, the message is transmitted to the first user at a point in time that is later than the second threshold amount of time since detecting the end of the speech input. Resuming a timer for transmitting a transcribed message to a recipient in based on a location of attention of the user in the three-dimensional environment enables the user to resume the timer for transmitting the transcribed message to the recipient without displaying additional controls, thereby improving user-device interaction.

In some embodiments, after detecting the attention of the user directed away from the message entry region, the computer system detects (830a), via the one or more input devices, a second input that includes the attention of the user directed toward the message entry region (830b), such as gaze 721 directed toward the message dictation platter 709a as shown in FIG. 7C. For example, the computer system detects the attention of the user move back to the message entry region in the three-dimensional environment. In some embodiments, the second input includes a speech command corresponding to a request to transmit the message to the first user (830c), such as speech input 716c including the command "Send" in FIG. 7C. For example, the computer system detects second speech input after the speech input that includes an explicit command for initiating transmission of the message to the first user, as described above. In some embodiments, the command for initiating transmission of the message to the first user includes the phrase "send it" or any equivalents (e.g., "send," "transmit," "send message," and/or "transmit message").

In some embodiments, in response to detecting the second input, the computer system initiates (830d) transmission of the message to the first user, such as transmission of the message to the first user ("John") as shown in FIG. 7D. For example, if the computer system detects a command to transmit the message to the first user after detecting the attention of the user move back to the message entry region, the computer system transmits the message to the first user. In some embodiments, as described below, the command to transmit the message to the first user causes the computer system to transmit the message to the first user irrespective of whether the timer has elapsed. For example, in response to detecting the speech command before the timer elapses, the computer system transmits the message to the first user before the timer has elapsed (e.g., and/or before the first threshold amount of time (e.g., 0.5, 1, 1.2, 1.5, 2, 2.5, 3, 4, 5, or 6 seconds) has elapsed since detecting the end of the speech input). Transmitting a transcribed message to a recipient in response to detecting a command to transmit the message when the attention of the user is directed toward the transcribed message enables a transcribed message to be transmitted to a recipient without waiting for a threshold amount of time to elapse, thereby improving user-device interaction.

In some embodiments, after detecting the end of the speech input and before the second threshold amount of time (e.g., 0.25, 0.5, 1, 1.5, 2, 2.5, 3, 3.5, or 4 seconds) has elapsed during which the attention of the user is directed to the message entry region (e.g., while the gaze of the user is directed toward the message entry region including the text representation of the speech input), the computer system detects (832*a*), via the one or more input devices, a speech command corresponding to a request to forgo initiating transmission of the message to the first user, as described with reference to FIG. 7D. For example, the computer system detects second speech input after the speech input that includes an explicit command for forgoing initiating transmission of the message to the first user. In some embodiments, the command for forgoing initiating transmission of the message to the first user includes the phrase "cancel" or any equivalents (e.g., "cancel it," "do not send," "do not send message," and/or "cancel message").

In some embodiments, in response to detecting the speech command, the computer system forgoes (832*b*) initiating transmission of the message to the first user, as described with reference to FIG. 7D. For example, if the computer system detects a speech command to forgo initiating transmission of the message to the first user before the second threshold amount of time has elapsed, the computer system forgoes initiating transmission of the message to the first user. In some embodiments, in response to detecting the speech command to forgo initiating transmission of the message to the first user, the computer system removes the text representation of the speech input from the message entry region. In some embodiments, in response to detecting the speech command, the computer system ceases display of the message entry region in the three-dimensional environment. In some embodiments, the computer system ceases elapsing the timer associated with the second threshold amount of time and/or ceases displaying the visual indication (e.g., described above) corresponding to the timer in the three-dimensional environment. Forgoing transmitting a transcribed message to a recipient in response to detecting a command to forgo transmitting the message avoids unintentional sending of a transcribed message to the recipient, thereby improving user-device interaction, and improves user privacy and device security.

In some embodiments, after detecting the end of the speech input and before the second threshold amount of time (e.g., 0.25, 0.5, 1, 1.5, 2, 2.5, 3, 3.5, or 4 seconds) has elapsed during which the attention of the user is directed to the message entry region (e.g., while the gaze of the user is directed toward the message entry region including the text representation of the speech input), the computer system detects (834*a*), via the one or more input devices, a speech command corresponding to a request to initiate transmission of the message to the first user, such as speech input 716*c* including the command "Send" in FIG. 7C. For example, the computer system detects second speech input after the speech input that includes an explicit command for initiating transmission of the message to the first user, as described above. In some embodiments, the command for initiating transmission of the message to the first user includes the phrase "send it" or any equivalents (e.g., "send," "transmit," "send message," and/or "transmit message").

In some embodiments, in response to detecting the speech command, the computer system initiates (834*b*) transmission of the message to the first user before the second threshold amount of time has elapsed, such as transmission of the message to the first user ("John") as shown in FIG. 7D. For example, if the computer system detects a command to transmit the message to the first user before the second threshold amount of time has elapsed, the computer system transmits the message to the first user. In some embodiments, the command to transmit the message to the first user causes the computer system to transmit the message to the first user irrespective of whether the timer has elapsed. For example, by providing the speech command to transmit the message to the first user, the computer system sends the message to the first user without waiting the duration of the second threshold amount of time. Transmitting a transcribed message to a recipient in response to detecting a command to transmit the message before a threshold amount of time for automatically transmitting the message to the recipient has elapsed enables the user to transmit the transcribed message to the recipient before the threshold amount of elapses without displaying additional controls, thereby improving user-device interaction.

In some embodiments, the representation of the first user is displayed among a plurality of representations of a plurality of users other than the user of the computer system (836), such as the plurality of representations shown in FIG. 7A. For example, the three-dimensional environment includes a plurality of representations of a plurality of users that are associated with a communication application (e.g., a messaging application, a phone application, and/or an email application) operating via the computer system, as described above. In some embodiments, the first user is a contact of the communication application. In some embodiments, the user of the computer system is able to communicate with users other than the first user using any of the methods described herein with reference to communicating with the first user (e.g., based on attention of the user and speech input directed to the user(s) other than the first user). Transcribing a message and automatically transmitting the message to a recipient of a plurality of recipients based on a duration of attention of the user in the three-dimensional environment reduces the number of inputs needed to transmit a transcribed message to a particular recipient, thereby improving user-device interaction.

In some embodiments, displaying a respective representation of a respective user (e.g., the first user or a different user) of the plurality of representations of the plurality of users includes (838*a*), in accordance with a determination that the user has an unread message from the respective user, displaying, via the display generation component, the respective representation of the respective user with a visual indication indicating that the user has the unread message from the respective user (838*b*), such as the visual indication 710 in FIG. 7A. For example, the plurality of representations of the plurality of users in the three-dimensional environment includes a respective representation of a respective user, and the user of the computer system has received (e.g., within the last 1, 2, 3, 5, 10, 15, 25, 30, 45, 60, or 90 minutes) a message from the respective user. In some embodiments, when the user receives a message from another user, the computer system displays a visual indication in the three-dimensional environment. For example, if the user has an unread message from the respective user, the computer system displays a visual indication in the three-dimensional environment indicating that the user has an unread message from the respective user. In some embodiments, the visual indication includes a badge that optionally includes a number or other label indicating that the user has an unread message. In some embodiments, the visual indication is displayed overlaid on a portion of the respective representation of the respective user in the three-dimensional environment.

In some embodiments, displaying a respective representation of a respective user of the plurality of representations of the plurality of users includes, in accordance with a determination that the user does not have an unread message from the respective user, displaying, via the display generation component, the respective representation of the respective user without the visual indication (838c), such as the display of the first representation 708a of the first user without the visual indication 710 as shown in FIG. 7A. For example, if the user has not received a message from another user, the computer system forgoes displaying the visual indication in the three-dimensional environment. In some embodiments, if the user does not have an unread message from the respective user, the computer system displays the respective representation of the respective user without the visual indication. Displaying a visual indication in the three-dimensional environment when a user of the computer system has an unread message from another user provides feedback that the user has an unread message from another user, thereby improving user-device interaction.

In some embodiments, while displaying the respective representation of the respective user with the visual indication (e.g., visual indication 710 in FIG. 7A) (e.g., because the user has an unread message from the respective user), the computer system detects (840a), via the one or more input devices, the attention of the user directed toward the respective representation of the respective user, such as gaze 723 directed toward the second representation 706 of the second user in FIG. 7A. For example, the computer system detects the gaze of the user directed toward the respective representation of the respective user in the three-dimensional environment. In some embodiments, the computer system detects the attention of the user directed toward the visual indication in the three-dimensional environment.

In some embodiments, in response to detecting the attention of the user directed toward the respective representation of the respective user, the computer system replaces (840b) display of the visual indication with a representation of the unread message received from the respective user, such as replacing display of the visual indication 710 with the message element 713 as shown in FIG. 7B. For example, the computer system presents the unread message from the respective user to the user in response to detecting the attention directed toward the respective representation of the respective user. In some embodiments, the computer system displays a message element including text representation (e.g., and/or content, such as images, video, or web links) of the message received from the respective user. In some embodiments, the computer system replaces display of the visual indication with the text representation of the unread message from the respective user in the three-dimensional environment. Additionally or alternatively, in some embodiments, as described below, the computer system outputs audio corresponding to the unread message from the respective user. Displaying a representation of an unread message from another user in the three-dimensional environment in response to detecting the attention of a user of the computer system directed toward a representation of the other user reduces the number of inputs needed to view the unread message, thereby improving user-device interaction.

In some embodiments, the user has an unread message from a respective user (e.g., the first user or other user) of the plurality of users (842a), such as an unread message from the second user ("Jane") as shown in FIG. 7A, (e.g., the plurality of representations of the plurality of users in the three-dimensional environment includes a respective representation of a respective user, and the user of the computer system has received (e.g., within the last 1, 2, 3, 5, 10, 15, 25, 30, 45, 60, or 90 minutes) a message from the respective user). In some embodiments, while displaying the plurality of representations of the plurality of users including a respective representation of the respective user, the computer system detects (842b), via the one or more input devices, the attention of the user directed toward the respective representation of the respective user, such as gaze 723 directed toward the second representation 706 of the second user as shown in FIG. 7A. For example, the computer system detects the gaze of the user directed toward the respective representation of the respective user in the three-dimensional environment.

In some embodiments, in response to detecting the attention of the user directed toward the respective representation of the respective user, the computer system presents (842c) the unread message received from the respective user, such as display of message element 713 as shown in FIG. 7B. For example, the computer system presents the unread message from the respective user to the user in response to detecting the attention directed toward the respective representation of the respective user. In some embodiments, the computer system displays a message element including a text representation (e.g., and/or content, such as images, video, or web links) of the message received from the respective user in the three-dimensional environment, as described below. In some embodiments, as described below, the computer system additionally or alternatively outputs audio corresponding to the unread message from the respective user. In some embodiments, if the attention of the user is directed away from the representation of the respective user in the three-dimensional environment, the computer system ceases presenting the unread message (e.g., ceases displaying the text representation of the unread message and/or ceases outputting the audio corresponding to the unread message). Presenting an unread message from another user in the three-dimensional environment in response to detecting the attention of a user of the computer system directed toward a representation of the other user reduces the number of inputs needed to open the unread message, thereby improving user-device interaction.

In some embodiments, presenting the unread message received from the respective user includes outputting audio corresponding to the unread message received from the respective user (844), such as outputting audio 730 as shown in FIG. 7B. For example, the computer system outputs (e.g., via a speaker of or associated with the computer system) audio recorded by the respective user (e.g., an audio message) via a speaker device in communication with the computer system. In some embodiments, the computer system outputs text of the unread message as audio in a voice of a virtual assistant associated with an operating system of the computer system. For example, outputting the audio includes outputting words, characters, numbers, sentences and/or icons of the unread message in the voice of the virtual assistant. Presenting audio corresponding to an unread message from another user in the three-dimensional environment in response to detecting the attention of a user of the computer system directed toward a representation of the other user reduces the number of inputs needed to consume audio corresponding to the unread message, thereby improving user-device interaction.

In some embodiments, presenting the unread message received from the respective user includes displaying, via the display generation component, a text representation corresponding to the unread message received from the respective user (846), such as display of the message element 713 including the text representation of the unread message as shown in FIG. 7B. For example, the computer system displays a message element (e.g., a message bubble or region) including text representation of the unread message from the respective user. In some embodiments, the message element is displayed overlaid on a portion of the representation of the respective user in the three-dimensional environment. In some embodiments, the text representation of the unread message includes words, characters, numbers, sentences and/or icons of the unread message. In some embodiments, the text representation includes web links that are selectable to initiate a process to consume content associated with the web links. In some embodiments, the message element includes content (e.g., images, video, avatars, music, and/or document files) that are displayed with the text representation of the unread message in the three-dimensional environment. In some embodiments, the text representation of the unread message is displayed with a scrolling effect in the message element that scrolls in a respective direction (e.g., upward direction) relative to the viewpoint of the user to reveal additional portions of the text representation, if applicable (e.g., based on a length of the unread message). In some embodiments, the computer system scrolls through the text representation of the unread message while the attention of the user remains directed to the representation of the respective user and/or the message element in the three-dimensional environment. Presenting text representation corresponding to an unread message from another user in the three-dimensional environment in response to detecting the attention of a user of the computer system directed toward a representation of the other user reduces the number of inputs needed to read the unread message, thereby improving user-device interaction.

In some embodiments, while displaying the plurality of representations of the plurality of users including the representation of the first user, the computer system receives (848a), via the one or more input devices, a second input corresponding to selection of a respective representation of a respective user (e.g., the first user or a different user) of the plurality of representations of the plurality of users, such as selection of the first representation 704 by hand 703a as shown in FIG. 7D. For example, the plurality of representations of the plurality of users in the three-dimensional environment includes a respective representation of a respective user. In some embodiments, the computer system detects an air gesture, such as a tap or touch gesture, or a pinch gesture (e.g., one in which an index finger and a thumb of a hand of the user are disposed a threshold distance apart (e.g., 0.25, 0.5, 0.75, 1, 1.5, 2, 2.5, 3, 4, or 5 cm) and come together to touch), while the attention (e.g., gaze) of the user is directed toward the representation of the respective user in the three-dimensional environment. In some embodiments, the computer system detects the second input via a hardware input device in communication with the computer system. For example, the computer system detects a selection input (e.g., selection/engagement of a button) on a controller device (e.g., a handheld controller device that provides the user with six degrees of freedom of movement), a trackpad, a touchpad, a mouse, or other physical input device, while the attention of the user is directed toward the respective representation of the respective user.

In some embodiments, in response to receiving the second input, the computer system initiates (848b) a process to participate in live-communication with the respective user, such as display of the live-communication options 720/722/726 as shown in FIG. 7E. For example, in response to detecting the air gesture directed toward the respective representation of the respective user in the three-dimensional environment, the computer system displays one or more communication options (e.g., displayed within a menu) in the three-dimensional environment. In some embodiments, the one or more communication options include a first option that is selectable to participate in audio-based communication with the respective user (e.g., participate in a phone call, video chat, or avatar-based XR communication session with the respective user). In some embodiments, the one or more communication options include a second option that is selectable to participate in video-based communication with the respective user (e.g., participate in a video call with the respective user). In some embodiments, the one or more communication options include a third option that is selectable to participate in a copresence communication session with the respective user. For example, during the copresence communication session, objects within the three-dimensional environment and/or the three-dimensional environment are displayed by both the computer system and a respective computer system of the respective user, concurrently, but from different viewpoints associated with their respective users. In some embodiments, in the copresence communication session, the user of the computer system has a first viewpoint of the three-dimensional environment, and the respective user of the respective computer system has a second viewpoint of a second three-dimensional environment corresponding to the physical environment of the second user. In some embodiments, in the copresence communication session, the three-dimensional environment includes a virtual representation of (e.g., an avatar corresponding to) the respective user. For example, the virtual representation of the respective user is displayed at a respective location in the three-dimensional environment that corresponds to a location of the second viewpoint of the respective user. In some embodiments, a virtual representation of the user of the computer system is displayed at a location in the portion of the three-dimensional environment that is visible from the second viewpoint of the respective user, the location corresponding to a location of the viewpoint of the user of the computer system. Initiating participation in live-communication with another user in response to detecting user input directed toward a representation of the other user in the three-dimensional environment reduces the number of inputs needed to participate in live-communication with the other user, thereby improving user-device interaction.

In some embodiments, while displaying the plurality of representations of the plurality of users including a respective representation of a respective user, such as the first representation 704 of the first user in FIG. 7A, (e.g., the plurality of representations of the plurality of users in the three-dimensional environment includes a respective representation of a respective user), the computer system detects (850a), via the one or more input devices, a second input corresponding to a request to transmit a first message to the respective user, wherein the second input includes first speech input from the user directed to the respective representation of the respective user, such as speech input 716a in FIG. 7A, wherein no previous messages have been recently transmitted to the respective user (850b). For example, the computer system detects, via a microphone in communication with the computer system, the user speaking words, numbers, letters and/or special characters (e.g., non-letter symbols included in written text) for compiling a message to be sent to the respective user, as similarly described above. In some embodiments, the computer system detects the second input while the attention (e.g., gaze) of the user is directed to a portion of the respective representation of the respective user in the three-dimensional environment. In some embodiments, no previous messages have been sent by the user to the respective user within a predetermined period of time, such as 1, 2, 5, 10, 15, 20, 25, 30, 45, 60, or 90 minutes. In some embodiments, no previous messages have been sent by the user to the respective user since last displaying the plurality of representations of the plurality of users in the three-dimensional environment (e.g., launching a communication application associated with the plurality of representations).

In some embodiments, in response to detecting the second input (850c), in accordance with a determination that the first speech input from the user begins with a first word corresponding to a name of the respective user (e.g., the word "John" at the beginning of speech input 716a in FIG. 7A), the computer system initiates (850d) transmission of the first message to the respective user, such as transmission of the message to the first user ("John") as shown in FIG. 7D. For example, the user of the computer system initiates the second input by speaking the name associated with the respective user (e.g., a contact name of the respective user). In some embodiments, if the first speech input from the user begins with the name associated with the respective user, the computer system transmits the resulting message corresponding to the first speech input to the respective user. For example, in accordance with a determination that the one or more third criteria discussed above are satisfied, the computer system transmits the first message including text representation of the first speech input to the respective user, as similarly described above. Other details of generating a message to the respective user based on the first speech input are optionally as described herein with respect to the first user.

In some embodiments, in accordance with a determination that the first speech input from the user does not begin with the first word corresponding to the name of the respective user, the computer system forgoes (850e) initiating transmission of the first message to the respective user, such as forgoing transmitting the message to the second user (represented by representation 706) as shown in FIG. 7E. For example, if the user of the computer system does not begin the first speech input by speaking the name associated with the respective user, the computer system forgoes initiating transmission of the first message to the respective user. In some embodiments, the computer system forgoes displaying the message entry region including text representation of the first speech input in the three-dimensional environment in response to detecting the second input, as similarly described above. Transmitting a first transcribed message to a recipient based on whether the user speaks a name of the recipient when starting to dictate reduces the number of inputs needed to transmit an initial message to a recipient, thereby improving user-device interaction.

In some embodiments, after initiating transmission of the first message to the respective user because the first speech input begins with the first word corresponding to the name of the respective user, the computer system detects (852a), via the one or more input devices, a third input corresponding to a request to initiate transmission of a second message and that includes second speech input from the user, such as speech input 718a in FIG. 7B. For example, the computer system detects, via a microphone in communication with the computer system, the user speaking words, numbers, letters and/or special characters (e.g., non-letter symbols included in written text) for compiling a second message to be sent to the respective user, as similarly described above. In some embodiments, the computer system detects the third input while the attention of the user is directed to a portion of the respective representation of the respective user in the three-dimensional environment. In some embodiments, the second speech input from the user does not begin with a first word corresponding to a name of the respective user.

In some embodiments, in response to detecting the second input (852b), in accordance with a determination that the user has not designated a user other than the respective user to receive messages after initiating transmission of the first message to the respective user (852c), the computer system initiates (852d) transmission of the second message to the respective user, such as transmission of the message to the second user ("Jane") as shown in FIG. 7G. For example, the user of the computer system has not transmitted a message to a user other than the respective user after initiating transmission of the first message to the respective user. In some embodiments, the second speech input from the user did not begin with a first word corresponding to a name of a user different from the respective user. In some embodiments, the attention of the user was not directed toward a representation different from the respective representation of the respective user in the three-dimensional environment when the third input is detected. For example, if the second input continues (e.g., does not change) the designation of the respective user as the recipient of the second message, as discussed above, the computer system transmits the second message to the respective user. For example, in accordance with a determination that the one or more third criteria discussed above are satisfied, the computer system transmits the second message including text representation of the second speech input to the respective user, as similarly described above.

In some embodiments, in accordance with a determination that the user has designated the user other than the respective user to receive messages after initiating transmission of the first message to the respective user (852e), the computer system initiates (8520 transmission of the second message to the user other than the respective user, such as transmission of the message to the first user ("John") as shown in FIG. 7D. For example, the user of the computer system has transmitted a message to the user other than the respective user after initiating transmission of the first message to the respective user. In some embodiments, the second speech input from the user began with a first word corresponding to a name of the user different from the respective user. In some embodiments, the attention (e.g., gaze) of the user was directed toward the representation different from the respective representation of the respective user in the three-dimensional environment when the third input was detected. For example, if the user of the computer system does not maintain the designation of the respective user as the recipient of the second message, as discussed above, the computer system forgoes initiating transmission of the second message to the respective user. In some embodiments, because the user has designated the other user as the recipient of the second message, the computer system transmits the second message to the other user. For example, in accordance with a determination that the one or more third criteria discussed above are satisfied, the computer system transmits the second message including the text representation of the second speech input to the other user. Transmitting a subsequent transcribed message to a recipient based on whether the user has designated a different recipient of the transcribed message before starting to dictate reduces the number of inputs needed to transmit a subsequent message to a same recipient, thereby improving user-device interaction.

In some embodiments, in response to determining that the first threshold amount of time (e.g., 0.5, 1, 1.2, 1.5, 2, 2.5, 3, 4, 5, or 6 seconds) has elapsed since detecting the end of the speech input (854a), in accordance with the determination that the one or more third criteria are satisfied, the computer system presents (854b) audio feedback indicating that the message has been sent to the first user, such as audio output 719a in FIG. 7D. For example, when the computer system transmits the message including the text representation of the speech input from the user to the first user because the one or more third criteria are satisfied, the computer system also outputs audio indicating that the message has been sent to the first user. In some embodiments, the computer system outputs a ring tone, a chime, a tune, or other audio feedback when the message is sent to the first user. In some embodiments, the audio feedback is presented via one or more speakers in communication with the computer system. Presenting audio feedback when a transcribed message is transmitted to a recipient provides feedback that the message has been sent to the recipient, thereby improving user-device interaction In some embodiments, the attention of the user satisfies the one or more first criteria when the attention of the user is directed toward the message entry region (856), such as gaze 721 directed toward the message dictation platter 709a as shown in FIG. 7B. For example, the one or more first criteria are satisfied when the gaze of the user is directed toward at least a portion of the message entry region in the three-dimensional environment. In some embodiments, the message entry region is displayed in the three-dimensional environment before the computer system detects the speech input. In some such embodiments, when the user provides the first input including the speech input, the attention of the user is directed toward the message entry region in the three-dimensional environment. Transcribing a message for automatically transmitting the message to a recipient based on whether the attention of the user is directed toward a message entry region in the three-dimensional environment avoids unintentional transcription and/or sending of a message to a recipient, thereby improving user-device interaction, and improves user privacy and device security.

In some embodiments, while detecting the speech input, the computer system detects (858a), via the one or more input devices, the attention of the user directed away from the message entry region, such as gaze 723 directed away from the message dictation platter 709b as shown in FIG. 7C. For example, the computer system detects the gaze of the user move away from the message entry region in the three-dimensional environment while the user is providing the speech input (e.g., empty space within the three-dimensional environment, an application window displayed in the three-dimensional environment, or a representation of a second user in the three-dimensional environment).

In some embodiments, in response to detecting the attention of the user directed away from the message entry region, the computer system forgoes (858b) display, in the message entry region, of additional text representation of one or more portions the speech input detected after detecting the attention of the user directed away from the message entry region, such as forgoing display of text representation of speech input 718b in the message dictation platter 709b as shown in FIG. 7D. For example, the computer system does not update display of the message entry region to include additional text representation of the speech input detected after the attention of the user moved away from the message entry region in the three-dimensional environment. In some embodiments, the computer system maintains display of the text representation of the speech input in the message entry region that was detected before the attention of the user moved away from the message entry region in the three-dimensional environment. In some embodiments, the text representation of the speech input entered into the message entry region before detecting the attention of the user directed away from the message entry region is deleted from (e.g., is no longer displayed in) the message entry region. In some embodiments, if the attention of the user is subsequently directed back toward the message entry region, and provides additional speech input, additional text representation of the additional speech input is displayed in the message entry region. In some embodiments, the attention of the user is required to be directed back toward the message entry region within a respective threshold amount of time (e.g., 0.25, 0.5, 1, 1.5, 2, 2.5, 3, 3.5, or 4 seconds) of detecting the attention of the user directed away from the message entry region. For example, if the gaze of the user is not directed back toward the message entry region before the respective threshold amount of time elapses, the computer system ceases displaying the message entry region and/or the previous text representation of the speech input in the three-dimensional environment. Forgoing display of additional portions of a transcribed message based on a location of attention of the user in the three-dimensional environment prevents speech input not intended for transcription from being added to the transcribed message, thereby improving user-device interaction.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9D illustrate examples of a computer system sending an audio message to a respective user based on speech input provided by a user of the computer system in a three-dimensional environment in accordance with some embodiments.

Figure 9A:
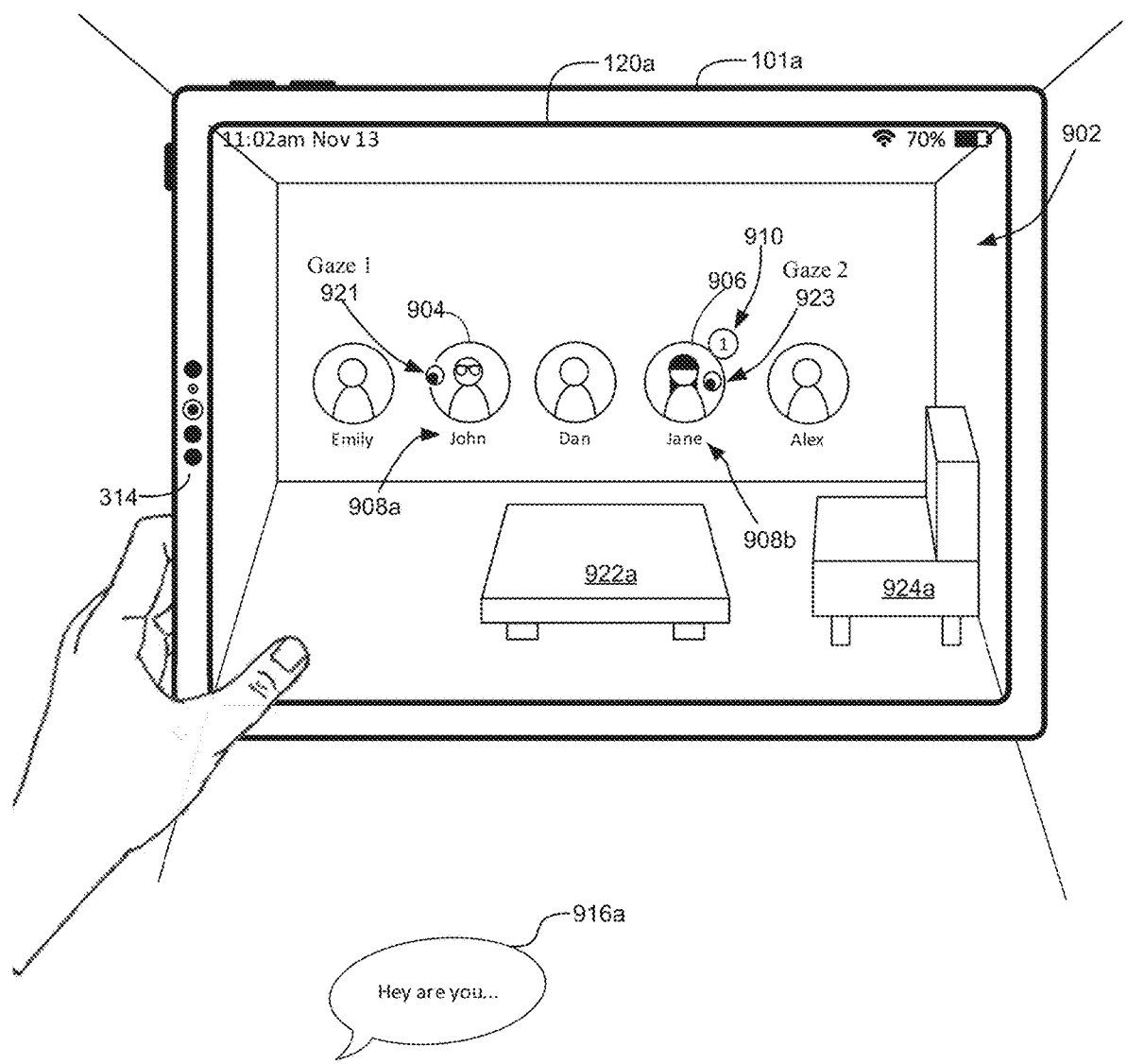
FIGS. 9A-9D illustrate examples of a computer system sending an audio message to a respective user based on speech input provided by a user of the computer system in a three-dimensional environment in accordance with some embodiments.

FIG. 9A illustrates a computer system (e.g., an electronic device) 101a displaying, via a display generation component 120a (e.g., display generation component 120 of FIG. 1), a three-dimensional environment 902 from a viewpoint of the user of the computer system 101a (e.g., facing the back wall of the physical environment in which computer system 101a is located). In some embodiments, computer system 101a includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101a would be able to use to capture one or more images of a user or a part of the user (e.g., one or more hands of the user) while the user interacts with the computer system 101a. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 9A, computer system 101a captures one or more images of the physical environment around computer system 101a (e.g., operating environment 100), including one or more objects in the physical environment around computer system 101a. In some embodiments, computer system 101a displays representations of the physical environment in three-dimensional environment 902. For example, three-dimensional environment 902 includes a representation 922a of a coffee table, which is optionally a representation of a physical coffee table in the physical environment, and three-dimensional environment 902 includes a representation 924a of sofa, which is optionally a representation of a physical sofa in the physical environment.

In FIG. 9A, three-dimensional environment 902 also includes a plurality of representations of a plurality of users other than the user of the computer system 101a. For example, the three-dimensional environment includes (e.g., two-dimensional or three-dimensional) representations of users Emily, John, Dan, Jane, and/or Alex. The plurality of representations of the plurality of users are optionally at a same distance from the viewpoint of the user of the computer system 101a. In some embodiments, the plurality of users corresponds to a plurality of contacts associated with a communication application (e.g., a messaging application, a phone application, and/or an emailing application) operating via the computer system 101a. As shown in FIG. 9A, the plurality of representations of the plurality of users optionally includes a first representation 904 of a first user (John), and a second representation 906 of a second user (Jane). In some embodiments, the first representation 904 and the second representation 906 include images (e.g., photographs, screenshots, video clips, and/or graphical representations) corresponding to the first user and the second user, respectively. In some embodiments, the first representation 904 and the second representation 906 each include a representation of a name (e.g., a contact name) associated with the first user and the second user, respectively. For example, the first representation 904 of the first user includes a first representation 908a of a name associated with the first user ("John"), and the second representation 906 of the second user includes a second representation 908b of a name associated with the second user ("Jane"). The representations of the names associated with the first user and/or the second user optionally include additional identifying information in the three-dimensional environment 902, such as a phone number associated with the user, an email address associated with the user, and/or an affiliation associated with the user (e.g., company, family, sports team, friend group, and/or club). It should be understood that while multiple representations of users (e.g., 904 and 906) other than the user of the computer system 101a are illustrated in FIGS. 9A-9D, such representations of the users need not be displayed by computer system 101a concurrently; rather, in some embodiments, computer system 101a independently displays the representations of the users illustrated and described in response to detecting input corresponding to a request to scroll through a graphical user interface associated with a respective communication application in the three-dimensional environment 902. Additionally, while the plurality of representations of the plurality of users are displayed in a line in three-dimensional environment 902, it should be understood that, in some embodiments, computer system 101a displays the plurality of representations in an alternative predetermined arrangement in three-dimensional environment 902, such as in a grid arrangement.

In some embodiments, a respective representation of a respective user other than the user of the computer system 101a is displayed in three-dimensional environment 902 with a visual indication (e.g., a badge or label) indicating that the user of the computer system 101a has received an audio message from the respective user of the plurality of users. For example, as shown in FIG. 9A, the user of the computer system 101a has an unread audio message from the second user (Jane). As shown, the second representation 906 of the second user is displayed with visual indication 910 indicating that the user has an unread audio message from the second user (e.g., unread relative to when the user of the computer system 101a last communicated with the second user (e.g., via the computer system 101a or via a second computer system belonging to the user)). In some embodiments, the visual indication 910 includes a number (e.g., 1) that corresponds to a number of messages received from the second user and that have not been opened (e.g., viewed or listened to) by the user of the computer system 101a. The user of the computer system 101a has no unread audio messages from the first user (John), and thus, the first representation 904 of the first user is optionally not displayed in three-dimensional environment 902 with a visual indication 910, as shown in FIG. 9A.

In some embodiments, the computer system 101a presents unread messages from a respective user to the user of the computer system 101a in response to detecting attention of the user directed toward a respective representation of the respective user in three-dimensional environment 902. For example, as discussed in more detail below, in response to detecting a gaze of the user of the computer system 101a directed toward the second representation 906 of the second user in the three-dimensional environment 902, the computer system 101a presents the unread audio message to the user of the computer system 101a. In some embodiments, as described below, no input other than the attention of the user directed toward the respective representation of the respective user in the three-dimensional environment is required to present the unread message from the respective user to the user of the computer system 101a.

In some embodiments, the computer system 101a initiates a process to send an audio message to a respective user in response to detecting speech input from the user of the computer system 101a and/or the attention of the user directed to a respective representation of the respective user in the three-dimensional environment 902. For example, as discussed in more detail below, in response to detecting speech input from the user of the computer system while the gaze of the user is directed toward the first representation 904 of the first user in the three-dimensional environment 902, the computer system 101a initiates a process to record and/or send an audio message to the first user. In some embodiments, as described below, no input other than the attention of the user directed toward the respective representation of the respective user in the three-dimensional environment and/or the speech input from the user of the computer system 101a is required to initiate the process to record and/or send the audio message to the first user.

In FIG. 9A, attention (e.g., a gaze of the user of the computer system 101a) is directed to the first representation 904 and/or the second representation 906, respectively. For example, in FIG. 9A, a first gaze ("Gaze 1") 921 is directed to the first representation 904 of the first user, and a second gaze ("Gaze 2") 923 is directed to the second representation 906 of the second user. It should be understood that while multiple gaze points are illustrated in FIGS. 9A-9D, such gaze points need not be detected by computer system 101a concurrently; rather, in some embodiments, computer system 101a independently responds to the gaze points illustrated and described in response to detecting such gaze points independently. Additionally, in FIG. 9A, the user of the computer system is providing first speech input 916a while the attention of the user is directed toward the first representation 904 of the first user in three-dimensional environment 902. For example, in FIG. 9A, the user of the computer system 101a is speaking the words "Hey are you" while the first gaze 921 is directed toward the first representation 904 in three-dimensional environment 902.

Figure 9B:
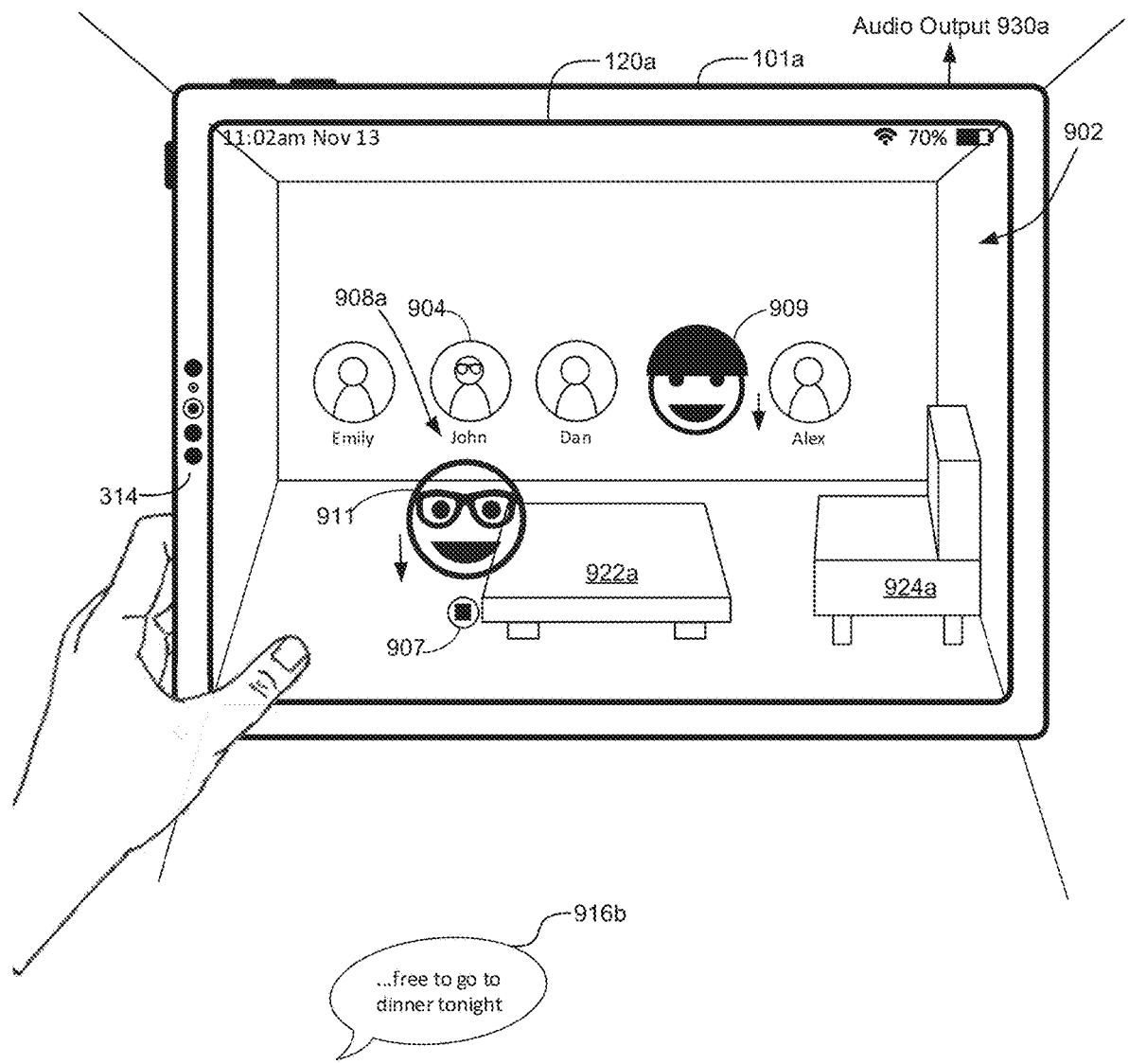

In some embodiments, in response to detecting the attention (e.g., gaze 923) in FIG. 9A directed to the second representation 906 of the second user, computer system 101a presents the unread audio message from the second user. For example, as shown in FIG. 9B, the computer system 101a displays an avatar 909 corresponding to the second user in three-dimensional environment 902. In some embodiments, as shown, the computer system 101a replaces display of the second representation 906 of the second user of FIG. 9A with the avatar 909 corresponding to the second user in three-dimensional environment 902. Additionally, in some embodiments, the computer system 101a outputs audio 930a corresponding to the unread audio message from the second user. For example, the computer system 101a outputs audio (e.g., comprising words, numbers, and/or characters of speech input provided by the second user) corresponding to the audio message (e.g., via a speaker device in communication with the computer system 101a) in a voice of the second user (e.g., recorded by a device of the second user) while the avatar 909 is displayed in three-dimensional environment 902. In some embodiments, the computer system 101a outputs the audio corresponding to the audio message from the second user in a voice of a virtual assistant associated with an operating system of the computer system 101a. In some embodiments, the avatar 909 corresponding to the second user is displayed in three-dimensional environment 902 with a facial animation effect that is based on facial movements of the second user detected while the second user was providing the speech input (e.g., via the device of the second user). For example, as shown in FIG. 9B, the computer system 101a displays the facial animation effect of the avatar 909 corresponding to the second user in three-dimensional environment 902 while outputting the audio 930a corresponding to the audio message from the second user. In some embodiments, the facial animation effect of the avatar 909 causes the avatar 909 to simulate mouthing the words, numbers, and/or characters of the audio message from the second user while the words, numbers, and/or characters are outputted via audio 930a by the computer system 101a.

Further, in some embodiments, in response to detecting the first speech input 916a while the attention (e.g., gaze 921) is directed to the first representation 904 of the first user in FIG. 9A, the computer system 101a initiates a process to record and/or send an audio message based on the first speech input 916a to the first user. For example, as shown in FIG. 9B, the computer system 101a displays an avatar 911 corresponding to the user of the computer system 101a in three-dimensional environment 902. In some embodiments, as shown, the computer system 101a displays the avatar 911 corresponding to the user concurrently with the first representation 904 of the first user to whom the audio message will be sent. Additionally, as shown in FIG. 9B, the avatar 911 is optionally at least partially translucent, such that content (e.g., a portion of the physical environment surrounding the display generation component 120a) is at least partially visible through the avatar 911 from the viewpoint of the user of the computer system 101a. In some embodiments, the avatar 911 corresponding to the user is displayed with a facial animation effect that is based on facial movements of the user of the computer system 101a while the computer system is detecting the speech input 916a (e.g., based on image capture of the face of the user (e.g., captured via the image sensors 314)). For example, the facial animation effect of the avatar 911 causes the avatar 909 to simulate mouthing the words "Hey are you" of the speech input 916a detected in FIG. 9A while the speech input is being detected (e.g., in real-time, such as within 0.25, 0.5, 0.75, 1, 1.25, 1.5, or 2 seconds of detecting the speech input). Additionally, in some embodiments, the computer system 101a records audio corresponding to the speech input 916a. For example, in response to detecting the speech input 916a in FIG. 9A, the computer system 101a records audio of the user speaking the words "Hey are you" (e.g., in a voice of the user). Further, as shown in FIG. 9B, the computer system 101a optionally displays a recording indication 907 in three-dimensional environment 902 concurrently with the avatar 911 corresponding to the user. In some embodiments, the recording indication 907 indicates that the audio corresponding to the speech input 916a is being recorded and/or the facial animation effect of the avatar 911 is being generated based on the facial movements (e.g., movement of mouth, eyes, cheeks, nose, and/or eyebrows) of the user by the computer system 101a, which will be compiled into the audio message to be sent to the first user.

In some embodiments, the avatar 911 corresponding to the user of the computer system 101a is automatically selected for use in generating the audio message to be sent to the first user. For example, the avatar 911 includes a user-enrolled representation of the user of the computer system 101a (e.g., selected by the user for use in generating audio messages (e.g., via a settings interface of a respective communication application via which the audio message will be sent to the first user)). In some embodiments, the avatar 911 corresponding to the user is able to be replaced by the user before and/or while the user is recording the audio message to be sent to the first user. For example, when the avatar 911 is first displayed in the three-dimensional environment in response to detecting the speech input 916a, a plurality of avatars are optionally displayed in three-dimensional environment 902 from which the user designates (e.g., selects, via a selection input) the avatar 911 for use in generating the audio message to be sent to the first user. It should be understood that while multiple avatars are illustrated in FIGS. 9A-9D, such avatars need not be displayed by computer system 101a concurrently; rather, in some embodiments, computer system 101a independently displays the avatars illustrated and described in response to detecting user inputs independently.

Figure 9C:
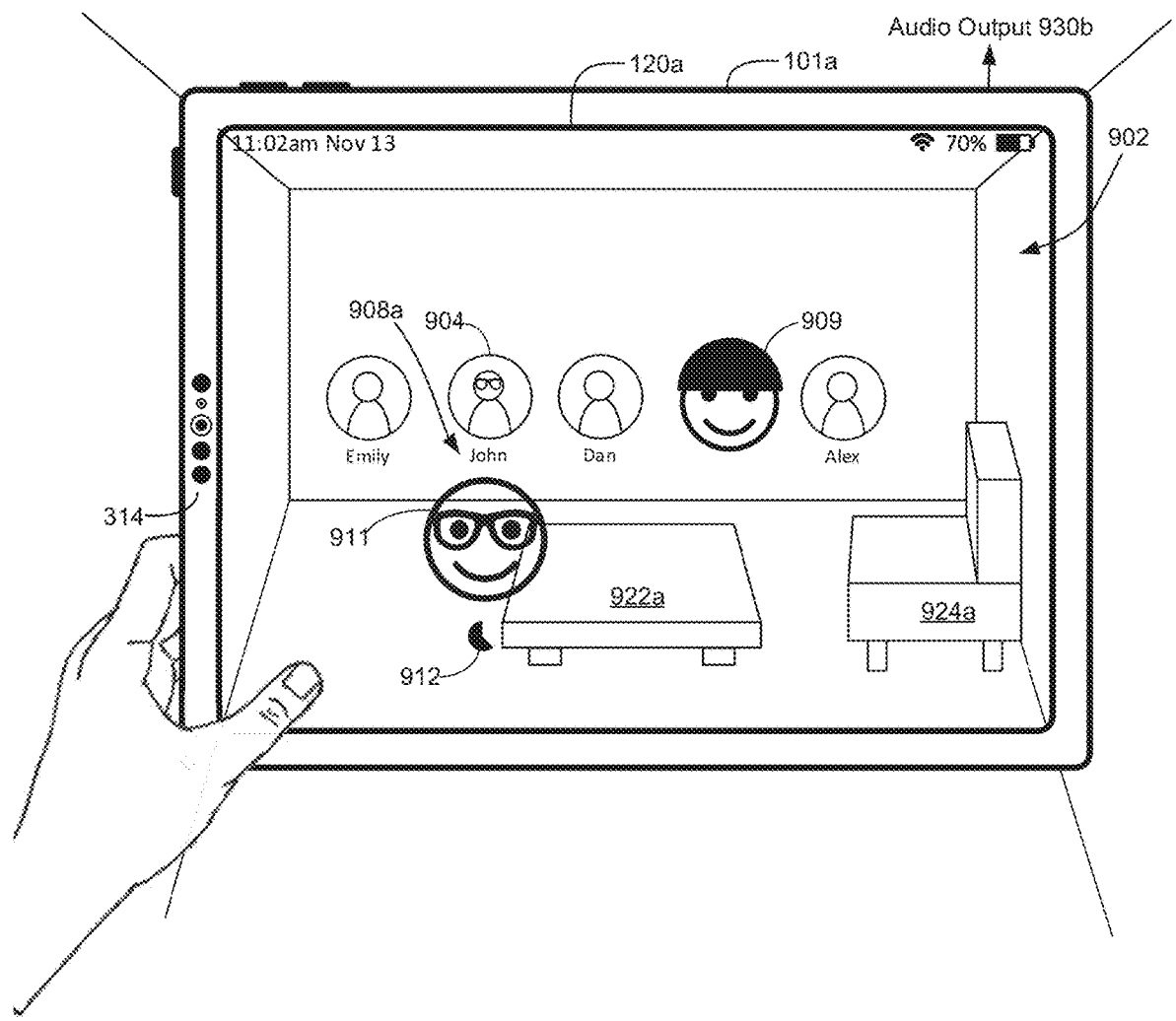

In FIG. 9B, the user of the computer system 101a provides a subsequent portion of the speech input 916b (e.g., optionally irrespective of a direction of the attention of the user in three-dimensional environment 902). For example, in FIG. 9B, the user of the computer system 101a is speaking the words "free to go to dinner tonight." In some embodiments, in response to detecting the second portion of the speech input 916b in FIG. 9B, the computer system 101a updates display of the avatar 911 corresponding to the user of the computer system 101a and records the audio corresponding to the subsequent portion of the speech input 916b, as shown in FIG. 9C. For example, the computer system 101a updates the facial animation effect of the avatar 911 to correspond to the captured facial movements of the user of the computer system 101a while the user speaks the words "free to go to dinner tonight" of the speech input 916b. Additionally, the computer system records the audio of the user speaking the words "free to go to dinner tonight." In some embodiments, in response detecting an end of the speech input 916b (e.g., after the word "tonight"), the computer system 101a optionally initiates a countdown for sending information to the first user that enables a computer system (e.g., computer system 101*b* discussed below) associated with the first user to present the audio message including the avatar 911 and the recorded audio corresponding to the speech input to the first user. For example, as shown in FIG. 9C, the computer system 101*a* displays a timer indication (e.g., a countdown element) 912 in three-dimensional environment 902 indicating that, once a duration (e.g., 0.5, 1, 1.5, 2, 2.5, 3, 4, or 5 seconds) of the countdown elapses, the information for presenting the audio message including the avatar 911 and the recorded audio will be sent to the first user. In some embodiments, the computer system 101*a* replaces display of the recording indication 907 of FIG. 9B with the timer indication 912 in three-dimensional environment 902, as shown.

Figure 9D:
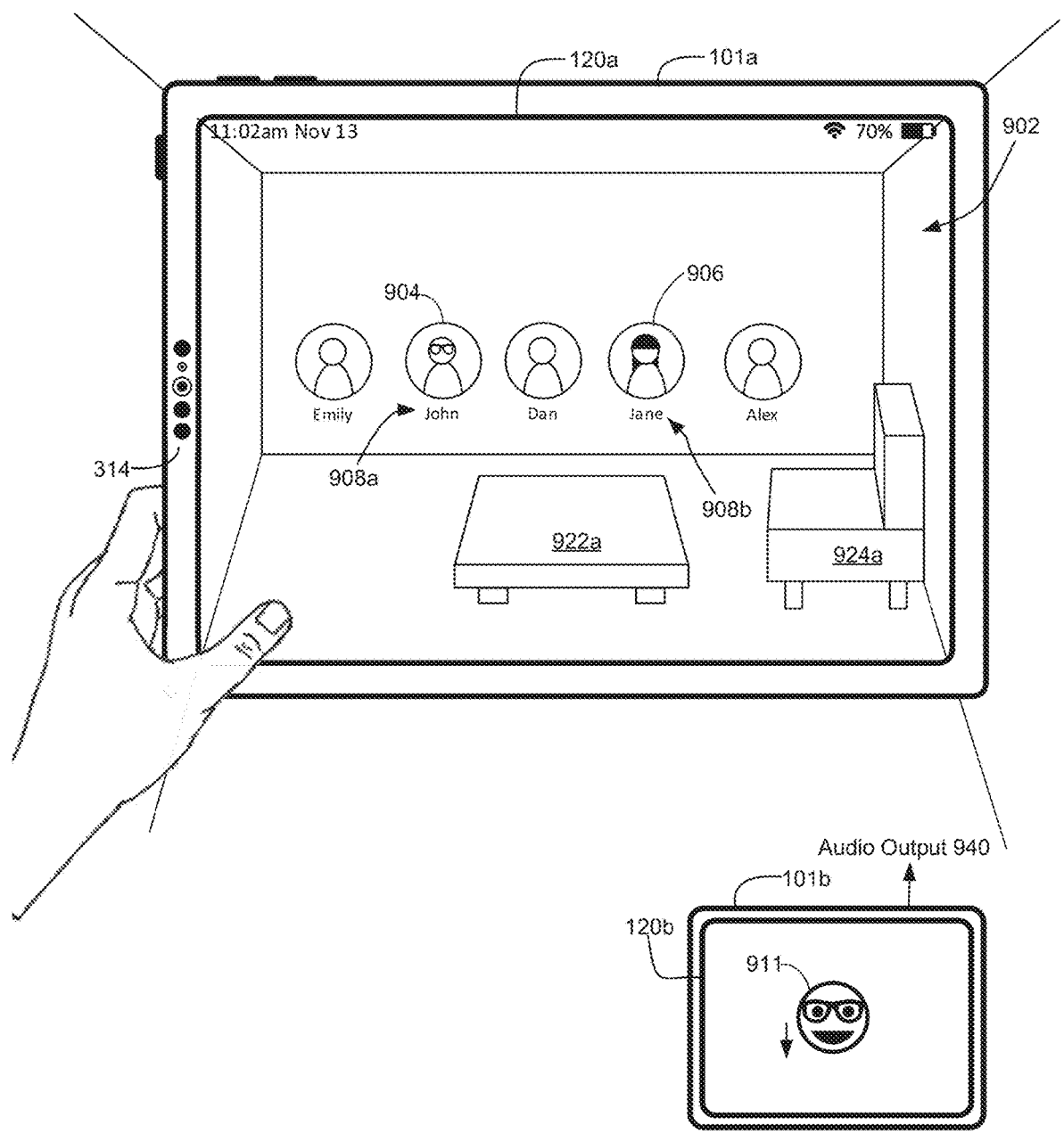
Figure 10B:
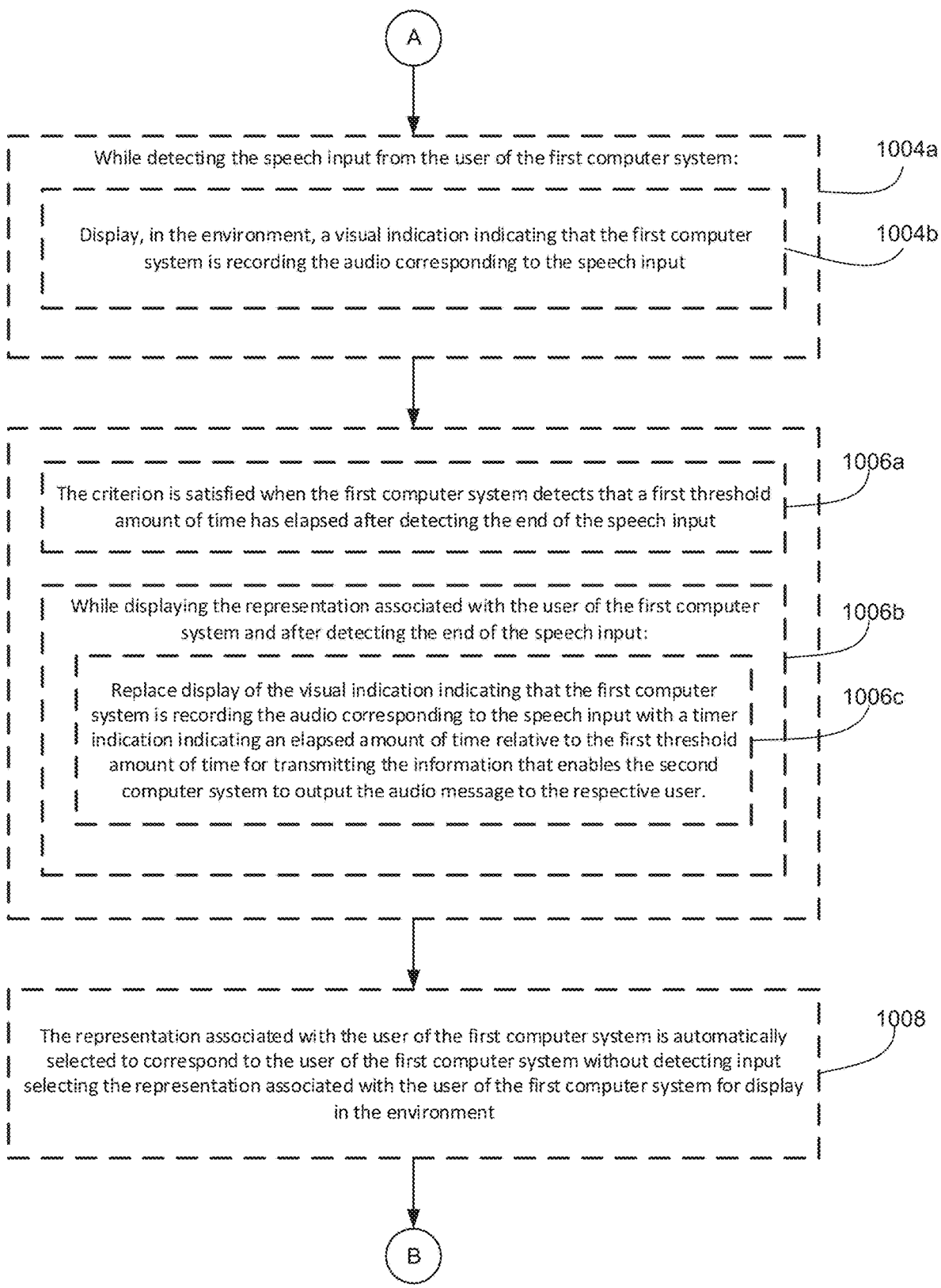
Figure 10C:
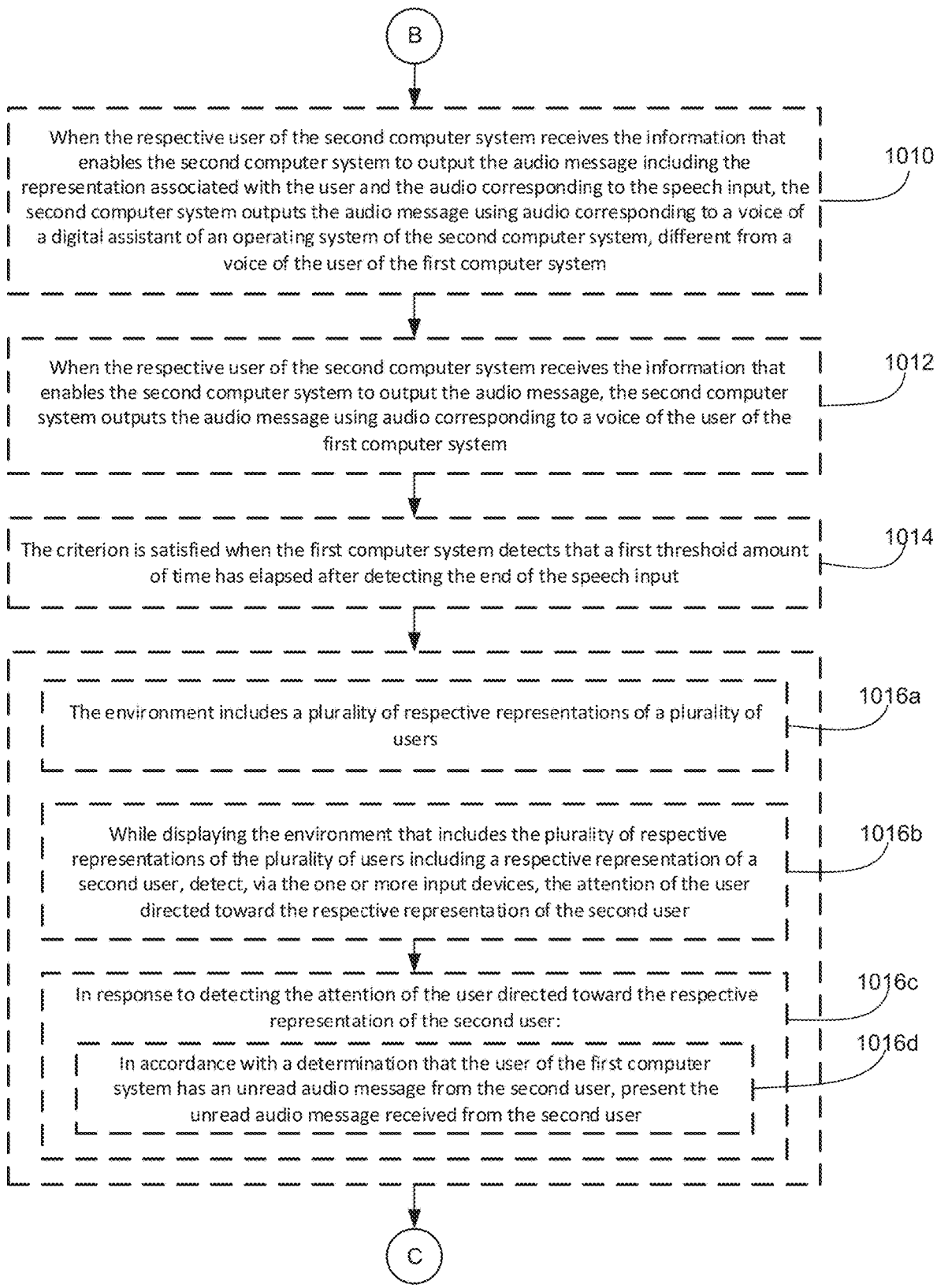
Figure 10D:
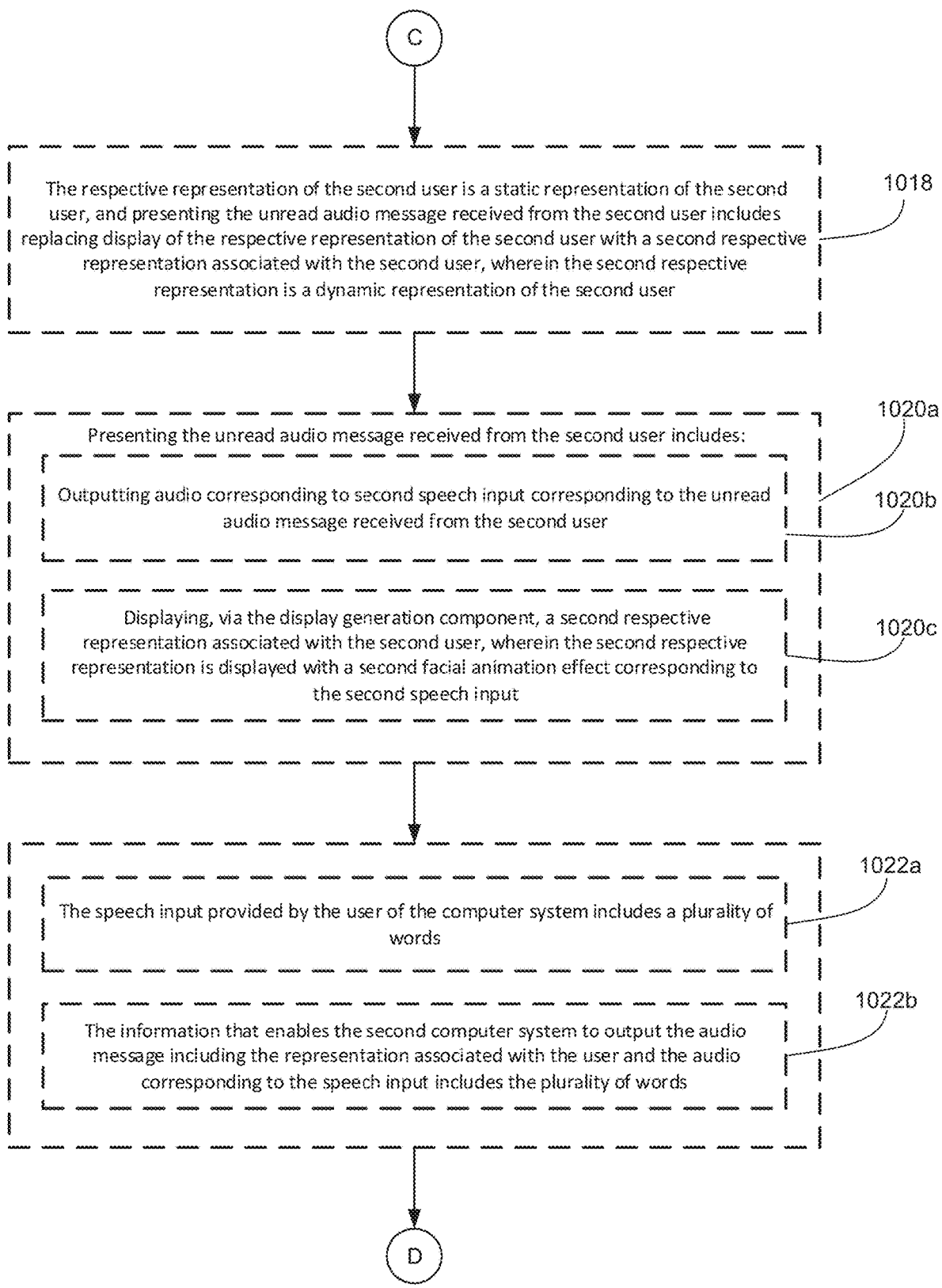
Figure 10E:
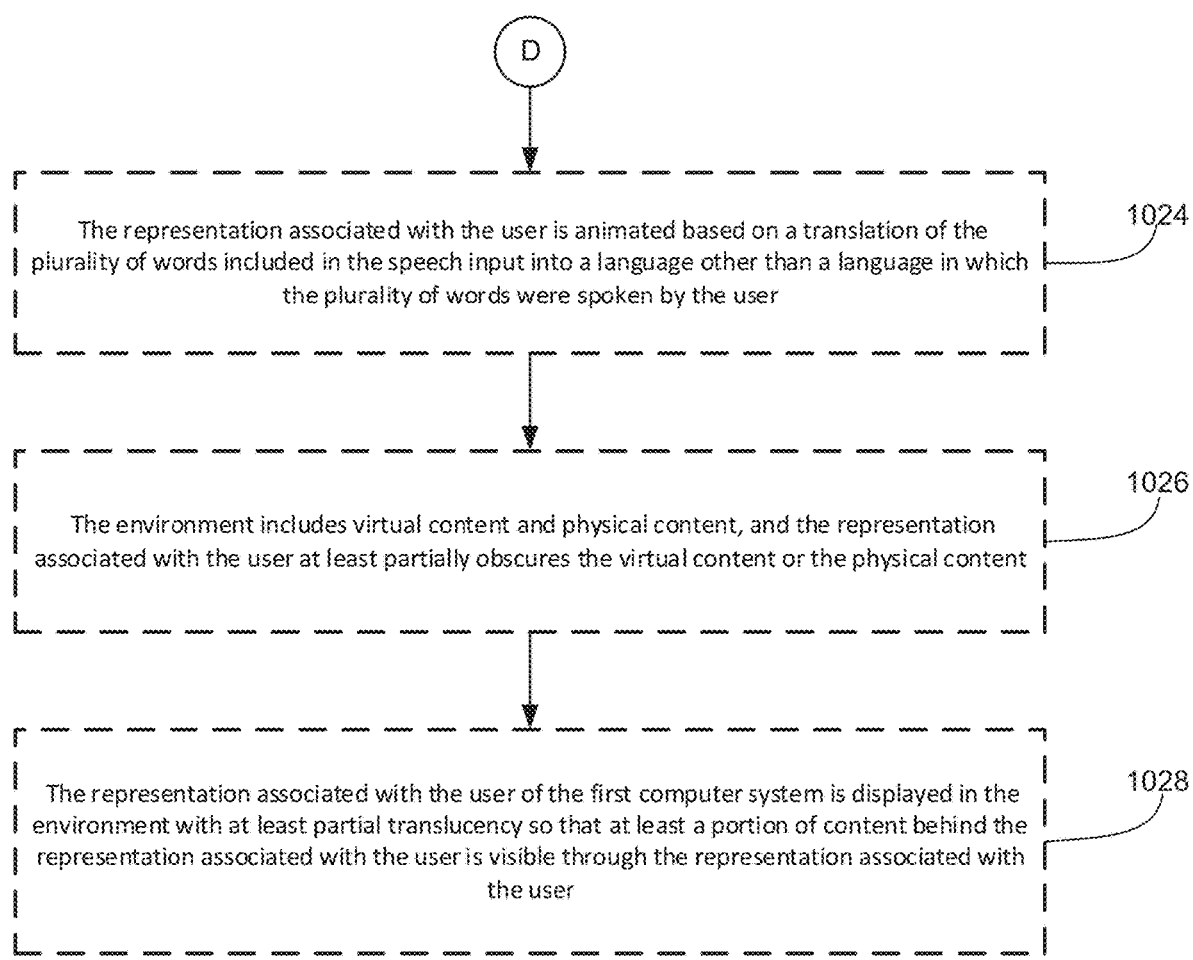

Additionally, in some embodiments, the computer system 101*a* updates display of the avatar 909 corresponding to the second user in accordance with a progression of the audio message received from the second user. For example, as shown in FIG. 9C, the computer system 101*a* updates display of the facial animation effect of the avatar 909 corresponding to the second user in three-dimensional environment 902. Additionally, as shown in FIG. 9C, the computer system 101*a* outputs additional audio 930*b* corresponding to the progression of the audio message received from the second user. For example, the computer system 101*a* outputs additional audio recorded by the device of the second user corresponding to the audio message received from the second user. In some embodiments, in response to detecting an end of the audio message received from the second user, the computer system 101*a* ceases outputting the audio 930*b* of FIG. 9C corresponding to the audio message from the second user, as shown in FIG. 9D. Additionally, as shown in FIG. 9D, in response to detecting the end of the audio message received from the second user, the computer system 101*a* optionally ceases display of the avatar 909 corresponding to the second user in the three-dimensional environment 902. For example, the computer system 101*a* redisplays the second representation 906 of the second user, including the representation 908*b* of the name associated with the second user, in the three-dimensional environment 902 at the same location prior to receiving the speech input and/or at the location of the avatar 909, as shown.

In some embodiments, when the countdown for sending the information for presenting the audio message, including the avatar 911 and the recorded audio corresponding to the speech input, to the first user elapses, the computer system 101*a* transmits the information to the first user. For example, as shown in FIG. 9D, the computer system 101*a* ceases display of the avatar 911 corresponding to the user in three-dimensional environment when the computer system 101*a* transmits the information for presenting the audio message to the first user without detecting input corresponding to a request to transmit the audio message to the first user. For example, as shown in FIG. 9D, the computer system 101*a* transmits the information for presenting the audio message to the first user without detecting selection of a "send" option in the three-dimensional environment 1102 or detecting additional speech input including a speech command (e.g., "send message" verbal command) corresponding to a request to transmit the audio message to the first user.

In some embodiments, the computer system 101*a* transmits information to a second computer system 101*b* associated with the first user that enables the second computer system 101*b* to present the audio message, including the avatar 911 and the recorded audio corresponding to the speech input from the user, to the first user. In some embodiments, as shown, in response to receiving the audio message from the user of the computer system 101*a*, the second computer system 101*b* displays, via display generation component 120*b*, the avatar 911 corresponding to the user (e.g., similar to as shown previously in FIGS. 9B-9C) with a facial animation effect that is based on the facial movements of the user captured by the computer system 101*a* when the user provided the speech input. Additionally, as shown, the second computer system 101*b* optionally outputs second audio 940 corresponding to the speech input recorded by the computer system 101*a*. For example, the second computer system 101*b* outputs recorded audio of the user of the computer system 101*a* speaking the words "Hey are you free to go to dinner tonight" as the second computer system 101*b* displays the avatar 911 with the facial animation effect that causes the avatar 911 to concurrently mouth, via display generation component 120*b*, the words "Hey are you free to go to dinner tonight" in accordance with the captured facial movements of the user when the speech input was recorded by the computer system 101*a*. In some embodiments, the second computer system 101*b* displays the avatar 911 corresponding to the user with a facial animation effect that is based on the words of the speech input recorded by the computer system 101*a*. For example, the avatar 911 is animated to mimic/mouth the words "Hey are you free to go to dinner tonight" without necessarily being animated based on the captured facial movements of the user when the speech input was recorded by the computer system 101*a*.

In some embodiments, the information transmitted by the computer system 101*a* enables the second computer system 101*b* to translate a language of the words of the audio recorded by the computer system 101*a* to a language of the second computer system 101*b*. For example, the language of the words of the audio recorded by the computer is the language of the user speaking the speech input, which is English in the examples of FIGS. 9A-9D. In some embodiments, the language of the second computer system 101*b* (e.g., the operating language assigned by the first user) is a language that is different from the language of the recorded speech input (e.g., Spanish, French, Mandarin, Cantonese, Arabic, and the like). In some embodiments, when the second computer system 101*b* receives the information from the computer system 101*a* for presenting the audio message to the first user, the second computer system 101*b* utilizes the information to translate the words of the recorded audio corresponding to the audio message to words in the language of the second computer system 101*b*. In some embodiments, the information transmitted by the computer system 101*a* includes the translation of the words of the recorded audio corresponding to the audio message to the language of the second computer system 101*b*. For example, the computer system 101*a* translates the words of the audio message prior to or when transmitting the information to the second computer system 101*b*. In some embodiments, the words of the recorded audio corresponding to the audio message are translated to the language of the second computer system 101*b* by an external server by which the information is transmitted to the second computer system 101*b*. In some embodiments, when the second computer system 101*b* presents the audio message to the first user, the second computer system 101*b* outputs the audio 940 corresponding to the audio message from the user in the language of the second computer system 101*b* using a voice of a virtual assistant associated with an operating system of the second computer system 101*b*. It should be understood that, in some embodiments, the computer system 101*a* is configured to translate a language of words of an audio message received from a respective user other than the user of the computer system 101a to the language of the computer system 101a and present the words of the audio message to the user in the language of the computer system 101a. For example, returning to FIG. 9B, if the language of the audio message received from the second user were a language different from the language of the computer system 101a (and/or a language of the user of the computer system 101a), the computer system 101a would output the words of the audio 930a corresponding to the audio message in the language of the computer system 101a (and/or the language of the user).

Additionally, in some embodiments, the information transmitted by the computer system 101a enables the second computer system 101b to present the avatar 911 corresponding to the user of the computer system 101a with a facial animation effect that is determined based on the translation of the words of the audio corresponding to the audio message. For example, as described above, the speech input from the user is recorded by the computer system 101a in the language of the user of the computer system 101a. When the computer system 101a transmits the information that enables the second computer system 101b to present the audio message to the first user, the information enables the second computer system 101b to animate the avatar 911 based on the translation of the words of the recorded audio to words in the language of the second computer system 101b. For example, when the second computer system 101b presents the avatar 911 with the facial animation effect to the first user, the facial animation effect causes the avatar 911 to mouth/mimic speaking the words of the audio message that are in the language of the second computer system 101b. In some embodiments, the information transmitted by the computer system 101a includes the animation of the avatar 911 based on the translation of the words of the recorded audio corresponding to the audio message to the language of the second computer system 101b. For example, the computer system 101a animates the avatar 911 based on the translation of the words of the audio message prior to or when transmitting the information to the second computer system 101b. In some embodiments, the avatar 911 is animated based on the translated words of the recorded audio corresponding to the audio message by an external server via which the information is transmitted to the second computer system 101b. It should be understood that, in some embodiments, the computer system 101a is configured to translate a language of words of an audio message received from a respective user other than the user of the computer system to the language of the computer system 101a and present the avatar corresponding to the respective user with a facial animation effect that is determined based on the translation of the words of the audio message. For example, returning to FIG. 9B, if the language of the audio message received from the second user were a language different from the language of the computer system 101a (and/or a language of the user of the computer system 101a), the computer system 101a would animate the avatar 909 corresponding to the second user based on a translation of the words of the audio message to the language of the computer system 101a (and/or the language of the user).

FIGS. 10A-10E is a flowchart illustrating a method 1000 of sending an audio message to a respective user based on speech input provided by a user of the computer system in a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a first computer system (e.g., computer system 101a) in communication with a display generation component (e.g., 120a) and one or more input devices (e.g., 314). In some embodiments, the computer system is or includes an electronic device. In some embodiments, the computer system has one or more of the characteristics of the computer system(s) in method 800. In some embodiments, the display generation component has one or more of the characteristics of the display generation component(s) in method 800. In some embodiments, the one or more input devices have one or more of the characteristics of the one or more input devices in method 800.

In some embodiments, while an environment (e.g., three-dimensional environment 902 in FIG. 9A) is visible via the display generation component, the computer system detects (1002a), via the one or more input devices, a first input corresponding to a request to transmit an audio message to a respective user of a second computer system (e.g., a first user ("John") in FIG. 9A), different from a user of the first computer system, wherein the first input includes speech input from the user of the first computer system (e.g., speech input 916a while gaze 921 is directed toward the first representation 904 of the first user as shown in FIG. 9A). For example, an environment that corresponds to a physical environment surrounding the display generation component and/or the first computer system or a virtual environment. In some embodiments, the first computer system displays a three-dimensional environment, such as a three-dimensional environment as described with reference to method 800. In some embodiments, the three-dimensional environment includes a representation of the respective user of the second computer system. In some embodiments, the representation of the respective user has one or more characteristics of the representations of users in method 800. In some embodiments, the first input includes attention (e.g., gaze) of the user directed to the representation of the respective user of the second computer system. In some embodiments, the first input includes speaking a name of the respective user of the second computer system to initiate transmitting an audio message to the respective user. In some embodiments, the first computer system detects the first speech input from the user of the first computer system while attention of the user is directed to the representation of the respective user. In some embodiments, the first computer system detects the first speech input from the user of the first computer system irrespective of the location of the attention of the user of the first computer system. In some embodiments, the first input has one or more characteristics of the inputs in method 800. In some embodiments, the speech input includes words, numbers, letters and/or special characters (e.g., non-letter symbols included in written text). In some embodiments, the first input does not include selection of an option that is selectable to initiate recording of the audio message (e.g., the three-dimensional environment does not include a record button to initiate recording of the audio message). In some embodiments, the speech input has one or more characteristics of the speech input in method 800.

In some embodiments, while detecting the speech input from the user of the first computer system (1002*b*), the computer system displays (1002*c*), in the environment, a representation associated with the user of the first computer system (e.g., avatar 911 in FIG. 9B), wherein the representation is displayed with a facial animation effect that is determined based on facial movements of the user of the first computer system detected while the user is providing the speech input, as indicated by the arrow illustrated with the avatar 911 in FIG. 9B. For example, the first computer system displays the representation associated with the user of the first computer system in the three-dimensional environment. In some embodiments, the representation associated with the user is automatically selected for the user of the first computer system, as will be described in more detail later. In some embodiments, the representation associated with the user includes a three-dimensional representation of a face of the user. In some embodiments, the representation associated with the user includes an animated character or avatar, such as a humanoid, an animal, a fictional creature, a robot, or some other inanimate object, that is optionally selected by the user of the first computer system. In some embodiments, the facial animation effect displayed by the representation of the user of the first computer system mimics the facial movements of the user as the user provides the speech input. For example, in response to detecting the first input, the first computer system displays an animated avatar whose facial elements (e.g., eyes, mouth, eyebrows, nose, cheeks, forehead, and/or ears (or their equivalents)) move as the facial elements of the user of the first computer system move in accordance with detection of such facial movements of the user by the first computer system and/or the speech input in real-time (e.g., within 0.05, 0.1, 0.4, 0.5, 0.8, 1, 1.2, or 1.5 seconds of detecting the words and/or characters spoken by the user). In some embodiments, the movements of the facial elements of the user are detected and tracked via camera, eye-tracking sensors, mouth-tracking sensors, or other facial tracking sensors in communication with the first computer system. In some embodiments, the representation associated with the user of the first computer system replaces display of the representation of the respective user of the second computer system. For example, the animated avatar associated with the user of the first computer system is displayed in place of (e.g., at a location of) the representation of the respective user of the second computer system in the three-dimensional environment in response to detecting the first input and/or while detecting the first input.

In some embodiments, the first computer system records (1002*d*) audio corresponding to the speech input, as described with reference to FIG. 9B. For example, the words and/or characters spoken by the user and detected via a microphone in communication with the first computer system are recorded by the first computer system. In some embodiments, as discussed below, the first computer system displays a recording indicator with the representation associated with the user of the first computer system that indicates the recording is ongoing. In some embodiments, the audio recorded by the first computer system is integrated with the facial animation effect of the representation associated with the user of the first computer system. For example, in addition to recording the audio corresponding to the words and/or characters spoken by the user, the first computer system records (e.g., compiles a video of) the facial movements of the animated avatar associated with the user displayed while the first computer system is detecting the speech input. In some embodiments, after an end of the speech input, the user of the first computer system is able to play back the recorded audio with the recorded facial effect of the representation associated with the user (e.g., by selecting a "play" option displayed with the representation associated with the user in the three-dimensional environment).

In some embodiments, while displaying the representation associated with the user of the first computer system and after detecting an end of the speech input (1002*e*), such as an end of speech input 916*b* as shown in FIG. 9B), in accordance with a determination that a first set of one or more criteria is satisfied, wherein the first set of one or more criteria includes a criterion that is satisfied without detecting input selecting an element to transmit the audio message to the respective user of the second computer system, the first computer system transmits (1002O, to the respective user of the second computer system (e.g., computer system 101*b* in FIG. 9D), information that enables the second computer system to output the audio message including the representation associated with the user (e.g., avatar 911 in FIG. 9D) and the audio corresponding to the speech input (e.g., audio output 940 in FIG. 9D). For example, the first set of one or more criteria is satisfied when the first computer system detects a first threshold amount of time (e.g., 0.5, 1, 1.2, 1.5, 2, 2.5, 3, 4, 5, or 6 seconds) elapse since detecting a pause or end in the words and/or characters spoken by the user. In some embodiments, before the first threshold amount of time has elapsed, the first computer system maintains display of the representation associated with the user of the first computer system after the end of the speech input while the attention of the user is and/or remains directed toward the representation associated with the user of the first computer system. In some embodiments, in response to detecting that the first set of one or more criteria is satisfied, the first computer system automatically sends the information (e.g., a video file or instructions for recreating the representation associated with the user) that enables the second computer system to output the audio message to the respective user of the second computer system, without detecting explicit input from the user selecting an element (e.g., a "send message" option) to send the audio message to the respective user. In some embodiments, the audio message includes the animated representation associated with the user and the audio recording of the speech input. For example, when the respective user receives the audio message from the user of the first computer system, the respective user, via the second computer system, will optionally see and hear (e.g., in a three-dimensional environment displayed at the second computer system) the animated avatar associated with the user of the first computer system speak (e.g., verbalize or play) the audio recorded by the first computer message in accordance with the facial animation effect of the avatar. In some embodiments, the audio corresponding to the speech input is played for the respective user in a voice of the user of the first computer system. In some embodiments, the audio corresponding to the speech input is played for the respective user in a voice of a virtual assistant of an operating system of the second computer system. In some embodiments, after and/or in response to transmitting the audio message to the respective user, the first computer system ceases display of the representation associated with the user of the first computer system in the three-dimensional environment. In some embodiments, after and/or in response to transmitting the audio message to the respective user, the first computer system redisplays the representation of the respective user of the second computer system in place of the representation associated with the user of the first computer system in the three-dimensional environment. Automatically transmitting an audio message including a representation of a sender of the audio message and audio corresponding to speech input to a recipient in response to detecting an end of the speech input reduces the number of inputs needed to transmit an audio message to a recipient, thereby improving user-device interaction.

In some embodiments, while detecting the speech input from the user of the first computer system (1004*a*), the first computer system displays (1004*b*), in the environment, a visual indication indicating that the first computer system is recording the audio corresponding to the speech input, such as display of recording indicator 907 as shown in FIG. 9C. For example, the first computer system concurrently displays the visual indication with the representation associated with the user of the first computer system in the three-dimensional environment. In some embodiments, the visual indication indicating that the first computer system is recording the audio corresponding to the speech input includes a recording indicator provided as a dot, circle, an oval, a square, a rectangle, or any other form/shape in the three-dimensional environment. In some embodiments, as described below, the visual indication that the recording of the speech input is ongoing is displayed for the duration of the speech input from the user. In some embodiments, when the first computer system transmits the information that enables the second computer system to output the audio message to the second computer system, the first computer system ceases displaying the visual indication in the three-dimensional environment. Displaying a recording indicator in the three-dimensional environment when an audio message is being recorded provides feedback that speech input from a user of the computer system is being recorded, thereby improving user-device interaction.

In some embodiments, the criterion is satisfied when the first computer system detects that a first threshold amount of time (e.g., 0.5, 1, 1.2, 1.5, 2, 2.5, 3, 4, 5, 10, or 20 seconds) has elapsed after detecting the end of the speech input (1006*a*). In some embodiments, while displaying the representation associated with the user of the first computer system (e.g., avatar 911 in FIG. 9C) and after (e.g., in response to) detecting the end of the speech input (1006*b*) (e.g., the first computer system detects that the user is no longer speaking words and/or characters), such as the end of speech input 916*b* as shown in FIG. 9B, the first computer system replaces (1006*c*) display of the visual indication indicating that the first computer system is recording the audio corresponding to the speech input with a timer indication (e.g., timer indication 912 in FIG. 9C) indicating an elapsed amount of time relative to the first threshold amount of time for transmitting the information that enables the second computer system to output the audio message to the respective user. For example, the first computer system concurrently displays the timer indication with the representation associated with the user of the first computer system in the three-dimensional environment. In some embodiments, the first computer system replaces display of the recording indicator with the timer indication when the first computer system begins elapsing the first threshold amount of time. In some embodiments, the first computer system updates display of the timer indication as the first threshold amount of time elapses (e.g., the timer indication is displayed with an animation effect that conveys the timer is counting down). In some embodiments, when the first threshold amount of time elapses, the first computer system automatically transmits the information that enables the second computer system to output the audio message to the respective user. In some embodiments, the first computer system ceases display of the timer indication in the three-dimensional environment when the first computer system detects that the first threshold amount of time has elapsed. Displaying a timer indicator in the three-dimensional environment indicating an elapsing of a timer for transmitting an audio message to a recipient provides feedback that audio message will be transmitted to the recipient when the timer expires, thereby improving user-device interaction.

In some embodiments, the representation associated with the user of the first computer system (e.g., avatar 911 in FIG. 9B) is automatically selected to correspond to the user of the first computer system without detecting input selecting the representation associated with the user of the first computer system for display in the environment (1008), as described with reference to FIG. 9B. For example, the representation associated with the user of the first computer system is automatically selected based on an enrolled or default representation of the user of the first computer system. In some embodiments, the representation associated with the user of the first computer system is automatically selected from a library of representations. In some embodiments, the representation associated with the user of the first computer system is automatically selected based on user-preference configured by the user in a settings of a respective communication application via which the audio message is recorded and transmitted to the respective user of the second computer system. In some embodiments, the representation associated with the user of the first computer system is displayed in the three-dimensional environment without detecting input designating the representation for use in compiling the audio message. In some embodiments, the representation associated with the user of the first computer system is selected based on facial recognition. For example, the first computer system generates an avatar that has an appearance (e.g., based on facial features, including eyes, mouth, nose, ears, hair, and/or chin) that is similar to and/or selected based on an appearance of the user. Automatically selecting a representation of a sender of an audio message for transmitting the audio message including the representation of the sender to a recipient reduces the number of inputs needed to transmit an audio message to a recipient, thereby improving user-device interaction.

In some embodiments, when the respective user of the second computer system (e.g., computer system 101*b* in FIG. 9D) receives the information that enables the second computer system to output the audio message including the representation associated with the user and the audio corresponding to the speech input, the second computer system outputs the audio message using audio (e.g., audio output 940 in FIG. 9D) corresponding to a voice of a digital assistant of an operating system of the second computer system, different from a voice of the user of the first computer system (1010), as described with reference to FIG. 9D. For example, when the second computer system receives the audio message and/or information transmitted by the first computer system, the second computer system outputs the audio corresponding to the speech input (e.g., via a speaker device in communication with the second computer system) in a voice of a virtual assistant of an operating system of the second computer system. In some embodiments, the virtual assistant of the operating system of the second computer system assists with and/or facilitates interaction between the respective user of the second computer system and the second computer system. For example, in response to detecting a verbal query from the respective user, the virtual assistant verbally (e.g., in the voice of the virtual assistant) responds to the query from the respective user (e.g., asks the respective user for clarification regarding the query and/or presents information associated with the query to the respective user). In some embodiments, the second computer system outputs the audio corresponding to the speech input using audio selected by the respective user of the second computer system. For example, the respective user of the second computer system has (e.g., prior to receiving the audio message from the user of the first computer system) designated and/or customized (e.g., via user preferences in a settings user interface associated with the communication application via which the audio message is presented) a particular voice by which the speech input will be presented to the respective user at the second computer system. In some embodiments, the second computer system forgoes outputting the audio corresponding to the speech input in the voice of the user of the first computer system (e.g., the voice of the user that was recorded with the speech input). Outputting audio of an audio message to a recipient using audio corresponding to a voice of a digital assistant of an operating system of a computer system of the recipient provides improved privacy by obfuscating a voice of a sender of the audio message, thereby improving user-device interaction.

In some embodiments, when the respective user of the second computer system receives the information that enables the second computer system to output the audio message, the second computer system outputs the audio message using audio (e.g., audio output 940 in FIG. 9D) corresponding to a voice of the user of the first computer system (1012), as described with reference to FIG. 9D. For example, when the second computer system receives the audio message and/or information transmitted by the first computer system, the second computer system outputs the audio corresponding to the speech input (e.g., via a speaker device in communication with the second computer system) in a voice of the user of the first computer system. In some embodiments, the second computer system outputs the audio corresponding to the speech input using audio of the voice of the user that was recorded with the speech input. Outputting audio of an audio message to a recipient using audio corresponding to a voice of a sender of the audio message helps the recipient identify the sender of the audio message, thereby improving user-device interaction.

In some embodiments, the criterion is satisfied when the first computer system detects that a first threshold amount of time (e.g., 0.5, 1, 1.2, 1.5, 2, 2.5, 3, 4, 5, 10, or 20 seconds) has elapsed after detecting the end of the speech input (1014), such as the end of speech input 916b as shown in FIG. 9B. For example, when the first computer system detects that the first threshold amount of time has elapsed since detecting the end of the speech input, the first computer system transmits the information that enables the second computer system to output the audio message to the respective user of the second computer system. In some embodiments, if the first threshold amount of time has not elapsed since detecting the end of the speech input (e.g., due to user action, such as subsequent speech input before the first threshold amount of time has elapsed), the first computer system forgoes transmitting the information to the second computer system. Automatically transmitting an audio message including a representation of a sender of the audio message and audio corresponding to speech input to a recipient after a threshold amount of time has elapsed since detecting an end of the speech input reduces the number of inputs needed to transmit an audio message to a recipient, thereby improving user-device interaction.

In some embodiments, the environment includes a plurality of respective representations of a plurality of users (1016a), such as the plurality of representations in FIG. 9A, (e.g., the three-dimensional environment includes a plurality of representations of a plurality of users that are associated with a communication application (e.g., a messaging application, a phone application, and/or an email application) operating via the computer system, as described above. In some embodiments, the plurality of representations of the plurality of users has one or more characteristics of the plurality of representations in method 800.). In some embodiments, while displaying the environment that includes the plurality of respective representations of the plurality of users including a respective representation of a second user, such as the second representation 906 of the second user ("Jane") in FIG. 9A, (e.g., the respective user of the second computer system or a different user), the first computer system detects (1016b), via the one or more input devices, the attention (e.g., gaze) of the user directed toward the respective representation of the second user, such as gaze 923 directed toward the second representation 906 as shown in FIG. 9A. For example, the first computer system detects the attention of the user directed toward the respective representation of the second user in the three-dimensional environment.

In some embodiments, in response to detecting the attention of the user directed toward the respective representation of the second user (1016c), in accordance with a determination that the user of the first computer system has an unread audio message from the second user (e.g., indicated by visual indication 910 in FIG. 9A), the first computer system presents (1016d) the unread audio message received from the second user, such as the display of avatar 909 corresponding to the second user as shown in FIG. 9B. For example, if the user of the first computer system has received (e.g., within the last 1, 2, 3, 5, 10, 15, 25, 30, 45, 60, or 90 minutes, or 3, 4, 6, or 8 hours) an audio message from the second user, the first computer system presents the unread audio message from the second user to the user in response to detecting the attention directed toward the respective representation of the second user. In some embodiments, as described below, the first computer system displays an animated avatar corresponding to the second user in the three-dimensional environment. In some embodiments, as described below, the first computer system outputs audio corresponding to the unread audio message (e.g., via a speaker device in communication with the first computer system). In some embodiments, if the user of the first computer system has not received an audio message from the second user, the first computer system forgoes presenting an audio message from the second user to the user in response to detecting the attention directed toward the representation of the second user. In some embodiments, the user of the first computer system is able to send a transcribed message to a user of the plurality of users utilizing any of the approaches described in method 800. Automatically presenting an audio message received from a sender of the audio message in response to detecting attention of a user of the computer system directed to a representation of the sender in the three-dimensional environment reduces the number of inputs needed to open an unread audio message from a sender, thereby improving user-device interaction.

In some embodiments, the respective representation of the second user is a static representation of the second user, such as the second representation 906 in FIG. 9A, (e.g., the respective representation is not displayed with any animation effects in the three-dimensional environment—for example, the respective representation is a still photograph or avatar of the second user), and presenting the unread audio message received from the second user includes replacing display of the respective representation of the second user with a second respective representation associated with the second user (e.g., replacing display of the second representation 906 with the avatar 909 as shown in FIG. 9B), wherein the second respective representation is a dynamic representation of the second user (1018), as indicated by the arrow illustrated with the avatar 909 in FIG. 9B. For example, the first computer system replaces the respective representation of the second user in the three-dimensional environment with an animated avatar corresponding to the second user. In some embodiments, as described below, the animated avatar corresponding to the second user is presented with audio corresponding to speech input received from the second user. For example, the avatar corresponding to the second user is displayed with a facial animation effect that is synchronized with the audio of the speech input from the second user, such that the avatar appears to speak the words and/or characters of the speech input from the second user. Automatically presenting an audio message including a dynamic representation of a sender of the audio message in response to detecting attention of a user of the computer system directed to a static representation of the sender in the three-dimensional environment reduces the number of inputs needed to open an unread audio message including a dynamic representation of a sender of the audio message, thereby improving user-device interaction.

In some embodiments, presenting the unread audio message received from the second user includes (1020*a*) outputting audio (e.g., audio output 930*a* in FIG. 9B) corresponding to second speech input corresponding to the unread audio message received from the second user (1020*b*). For example, the computer system outputs audio recorded by the second user (e.g., the second speech input) via a speaker device in communication with the first computer system. Outputting the audio corresponding to the second speech input optionally includes outputting words, characters, numbers, sentences and/or icons of the unread audio message in the voice of the second user. In some embodiments, the computer system outputs the audio corresponding to the second speech input using audio corresponding to a voice of a virtual assistant associated with an operating system of the first computer system. For example, outputting the audio includes outputting words, characters, numbers, sentences and/or icons of the unread message in the voice of the virtual assistant.

In some embodiments, presenting the unread audio message received from the second user includes displaying, via the display generation component, a second respective representation associated with the second user (e.g., avatar 909 in FIG. 9B), wherein the second respective representation is displayed with a second facial animation effect corresponding to the second speech input (1020*c*), as indicated by the arrow illustrated with the avatar 909 in FIG. 9B. For example, the second facial animation effect is based on facial movements of the second user detected by the computer system of the second user while the second user provided the second speech input. In some embodiments, the second respective representation associated with the second user corresponds to the dynamic representation of the second user described above. In some embodiments, as the audio corresponding to the second speech input is outputted from the first computer system, the second respective representation associated with the second user is updated according to the second facial animation effect. For example, the second respective representation associated with the second user is actively updated in the three-dimensional environment to mimic/mouth the words and/or characters that are concurrently being outputted by the first computer system. In some embodiments, the facial animation effect of the second representation associated with the second user causes the second representation associated with the second user to move based on the facial movements of the second user of the second computer system (e.g., based on the facial movements of the second user recorded during the second speech input). Presenting an animated representation of a sender in the three-dimensional environment with audio corresponding to an unread audio message from the sender in response to detecting the attention of a user of the computer system directed toward a representation of the sender reduces the number of inputs needed to consume the audio message, thereby improving user-device interaction.

In some embodiments, the speech input provided by the user of the first computer system includes a plurality of words (1022*a*), such as the words of speech input 916*a*/918*b* in FIGS. 9A-9B, (e.g., words forming phrases and/or sentences for sending via the audio message to the respective user of the second computer system). In some embodiments, the information that enables the second computer system to output the audio message including the representation associated with the user and the audio corresponding to the speech input includes the plurality of words (1022*b*), as described with reference to FIG. 9D. For example, the first computer system does not need to send additional information about changes in facial expressions of the user in order to animate the representation of the user because the representation of the user can be animated based on the plurality of words in the audio message. In some embodiments, when the second computer system receives the information that enables the second computer system to present the representation associated with the user with a facial animation effect that is determined based on the plurality of words, the second computer system is enabled to display the representation associated with the user (e.g., in a three-dimensional environment at the second computer system) with a facial animation effect. In some embodiments, when the second computer system presents the audio message including the audio corresponding to the speech input from the user, the representation associated with the user is updated according to the facial animation effect. For example, at the second computer system, the representation associated with the user is actively updated to mimic/mouth the words of the speech input that are concurrently being outputted as audio by the second computer system (e.g., via a speaker device in communication with the second computer system). In some embodiments, the facial animation effect of the representation associated with the user causes the representation associated with the user to move based on the facial movements of the user of the first computer system (e.g., based on the facial movements of the user recorded during the speech input). Transmitting an audio message including an animated representation of a user of the computer system that is animated based on words of the audio message reveals less information about the sender's facial expressions, thereby increasing user privacy, and reduces bandwidth usage associated with transmitting the audio message.

In some embodiments, the representation associated with the user is animated based on a translation of the plurality of words included in the speech input (e.g., the words of speech input 916a/916b in FIGS. 9A-9B) into a language other than a language in which the plurality of words were spoken by the user (1024), as described with reference to FIG. 9D. For example, the language of the words and/or characters spoken by the user of the first computer system when providing the speech input is a first language, such as English, Spanish, French, Mandarin, and/or Arabic. In some embodiments, a language of the respective user of the second computer system is different from the first language and/or a language of the second computer system (e.g., a default language or a language associated with the operating system of the second computer system) is different from the first language. In some embodiments, the first computer system transmits information to the second computer system that enables the second computer system to translate the audio corresponding to the first speech input from the first language of the user to the second language. In some embodiments, when the second computer system presents the audio message to the respective user of the second computer system, the second computer system outputs audio corresponding to the speech input from the user in the second language. For example, the second computer system outputs the audio corresponding to the speech input using audio corresponding to a voice of a digital assistant of the operating system of the second computer system in the second language, as discussed above. In some embodiments, the first computer system translates the audio corresponding to the first speech input from the first language of the user to the second language before transmitting the information to the second computer system. In some embodiments, the audio corresponding to the first speech input is translated from the first language to the second language by an intermediate server via which the information is conveyed to the second user. In some embodiments, the first computer system transmits information to the second computer system that enables the second computer system to update/reconfigure the facial animation effect that is determined based on the plurality of words in the first language to be based on the plurality of words in the second language. In some embodiments, when the second computer system presents the audio message including the audio corresponding to the speech input from the user in the second language, the representation associated with the user is updated according to the facial animation effect. For example, at the second computer system, the representation associated with the user is actively updated to mimic/mouth the words of the speech input in the second language that are concurrently being outputted as audio by the second computer system. In some embodiments, the first computer system animates the avatar corresponding to the user of the first computer system to be based on the translation of the words of the audio from the first language of the user to the second language before transmitting the information to the second computer system. In some embodiments, the avatar corresponding to the user is animated to be based on the translation of the words of the audio from the first language to the second language by an intermediate server via which the information is conveyed to the second user. Transmitting information with an audio message in a first language for presenting the audio message in a second language of the recipient enables the recipient of the audio message to consume the audio message in the second language without providing input for translating the first language to the second language, thereby improving user-device interaction.

In some embodiments, the environment includes virtual content and physical content, and the representation associated with the user at least partially obscures the virtual content or the physical content (1026), such as avatar 911 obscuring a portion of the representation 922a of the table as shown in FIG. 9B. For example, the three-dimensional environment includes virtual content, such as a representation of the respective user, one or more application windows, three-dimensional models (e.g., virtual cars, virtual balls, or other virtual objects), interactive games, and the like. In some embodiments, the three-dimensional environment includes physical content, such as physical objects including tables, chairs, lamps, walls, ceilings, fans, and the like that are located in the physical environment surrounding the display generation component and/or the user and are visible via the display generation component. In some embodiments, when the representation associated with the user is displayed in the three-dimensional environment in response to detecting the first input, the representation associated with the user is displayed over (e.g., in front of) a portion of the virtual content and/or the physical content from the viewpoint of the user. Displaying a representation of a user of the computer system in the three-dimensional environment over portions of other objects in the three-dimensional environment allows for message-based interaction with another user without the user of the computer system losing context of a physical environment surrounding the user, thereby improving user-device interaction.

In some embodiments, the representation associated with the user of the first computer system is displayed in the environment with at least partial translucency so that at least a portion of content behind the representation associated with the user is visible through the representation associated with the user (1028), such as visibility of portions of the representation 922a of the table and the back wall through the avatar 911 as shown in FIG. 9B. For example, when the representation associated with the user of the first computer system is displayed in the three-dimensional environment in response to detecting the first input, the representation associated with the user is at least partially translucent, such that the content (e.g., virtual or physical objects) within the three-dimensional environment located behind the representation are at least partially visible through the representation from the viewpoint of the user. In some embodiments, when the first computer system receives an audio message from another user and presents the audio message to the user of the first computer system (e.g., in the manner described above), a representation associated with the other user is displayed in the three-dimensional environment with at least partial translucency. Displaying a representation of a user of the computer system in the three-dimensional environment with partial translucency enables other objects in the three-dimensional environment located behind the representation of the user to remain partially visible from a viewpoint of the user of the computer system, thereby improving user-device interaction.

It should be understood that the particular order in which the operations in method 1000 have been described is merely exemplary and is not intended to indicate that the described order is the only order in which the operations could be performed. One of ordinary skill in the art would recognize various ways to reorder the operations described herein. In some embodiments, aspects/operations of methods 800 and/or 1000 may be interchanged, substituted, and/or added between these methods. For example, the three-dimensional environments of methods 800 and/or 1000, the quick messages being sent and/or opened in methods 800 and/or 1000, and/or display of animated representations associated with users in methods 800 and/or 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:
1. A method comprising:
at a computer system in communication with a display generation component and one or more input devices:
displaying, via the display generation component, a representation of a first user other than a user of the computer system;
while displaying the representation of the first user, detecting, via the one or more input devices, a first input that includes:
attention of the user of the computer system; and
speech input from the user while the attention of the user satisfies one or more first criteria;

in response to detecting the first input, in accordance with a determination that one or more second criteria are satisfied, displaying, via the display generation component, a text representation of the speech input in a message entry region associated with transmitting messages to the first user without providing a representation of the speech input to the first user;

while displaying the text representation of the speech input in the message entry region and after detecting an end of the speech input, determining that a first threshold amount of time has elapsed since detecting the end of the speech input; and in response to determining that the first threshold amount of time has elapsed since detecting the end of the speech input:

in accordance with a determination that one or more third criteria are satisfied, including a first criterion that is satisfied when the attention of the user has been directed to the message entry region for a second threshold amount of time after detecting the end of the speech input, initiating transmission of a message including the text representation of the speech input to the first user.

2. The method of claim 1, further comprising:
in response to determining that the first threshold amount of time has elapsed since detecting the end of the speech input:
in accordance with a determination that the one or more third criteria are not satisfied, forgoing initiating transmission of the message including the text representation of the speech input to the first user.

3. The method of claim 1, wherein the one or more second criteria include a criterion that is satisfied when the user of the computer system has recently received an indication of communication from the first user.

4. The method of claim 1, wherein the one or more second criteria include a criterion that is satisfied when the speech input from the user of the computer system begins with a first word that corresponds to a name of the first user.

5. The method of claim 1, wherein the one or more second criteria include a criterion that is satisfied when:
the attention of the user is directed to the representation of the first user when the speech input from the user is received and the speech input from the user begins with a first word that corresponds to a name of the first user; or
the attention of the user is directed to the representation of the first user when the speech input from the user is received and the user of the computer system has recently received an indication of communication from the first user.

6. The method of claim 1, further comprising:
while displaying the text representation of the speech input in the message entry region and after detecting an end of the speech input, determining that one or more fourth criteria are satisfied, including a criterion that is satisfied when the computer system detects a second speech input from the user after detecting the end of the speech input from the user, wherein the second speech input includes a command corresponding to a request to transmit the message to the first user; and
in response to determining that the one or more fourth criteria are satisfied, initiating transmission of the message including the text representation of the speech input to the first user.

7. The method of claim 6, wherein the one or more fourth criteria include a second criterion that is satisfied when:
the command corresponding to the request to transmit the message to the first user is provided after a third threshold amount of time has elapsed since detecting the end of the speech input; and/or
a fourth threshold amount of time elapses after detecting an end of the command without detecting additional speech input.

8. The method of claim 1, wherein the one or more third criteria includes a second criterion that is satisfied when the attention of the user is directed to a predefined portion of the message entry region for a duration of the second threshold amount of time, and is not satisfied if the attention of the user is not directed to the predefined portion of the message entry region for the duration of the second threshold amount of time.

9. The method of claim 1, further comprising:
prior to detecting the first input, in accordance with a determination that the attention of the user of the computer system is directed to the representation of the first user for a third threshold amount of time, displaying, via the display generation component, the message entry region concurrently with the representation of the first user.

10. The method of claim 9, wherein:
prior to displaying the message entry region, the representation of the first user is displayed concurrently with a representation of a name of the first user; and
prior to detecting the first input, in accordance with the determination that the attention of the user of the computer system is directed to the representation of the first user for the third threshold amount of time, the message entry region replaces display of the representation of the name of the first user.

11. The method of claim 1, further comprising while detecting the speech input, updating the message entry region to include sequential portions of the text representation of the speech input as corresponding sequential portions of the speech input are detected.

12. The method of claim 1, wherein the second threshold amount of time during which the attention of the user is directed to the message entry region is associated with a timer for initiating transmission of the message to the first user, the method further comprising:
after detecting the end of the speech input, concurrently displaying, via the display generation component, a visual indication of an elapsing of the timer with the text representation of the speech input in the message entry region.

13. The method of claim 1, wherein the second threshold amount of time during which the attention of the user is directed to the message entry region is associated with a timer for initiating transmission of the message to the first user, the method further comprising:
after detecting the end of the speech input and before the second threshold amount of time has elapsed during which the attention of the user is directed to the message entry region, detecting, via the one or more input devices, the attention of the user directed away from message entry region; and
in response to detecting the attention of the user directed away from the message entry region:
pausing an elapsing of the timer; and
forgoing initiating transmission of the message to the first user.

14. The method of claim 13, further comprising:
after detecting the attention of the user directed away from the message entry region, detecting, via the one or more input devices, the attention of the user directed toward the message entry region;

in response to detecting the attention of the user directed toward the message entry region, resuming the elapsing of the timer; and after resuming the elapsing of the timer and in response to determining that the elapsing of the timer has reached the second threshold amount of time, initiating transmission of the message to the first user.

15. The method of claim 13, further comprising:

after detecting the attention of the user directed away from the message entry region, detecting, via the one or more input devices, a second input that includes:
    the attention of the user directed toward the message entry region; and
    a speech command corresponding to a request to transmit the message to the first user; and
in response to detecting the second input, initiating transmission of the message to the first user.

16. The method of claim 1, further comprising:

after detecting the end of the speech input and before the second threshold amount of time has elapsed during which the attention of the user is directed to the message entry region, detecting, via the one or more input devices, a speech command corresponding to a request to forgo initiating transmission of the message to the first user; and
in response to detecting the speech command, forgoing initiating transmission of the message to the first user.

17. The method of claim 1, further comprising:

after detecting the end of the speech input and before the second threshold amount of time has elapsed during which the attention of the user is directed to the message entry region, detecting, via the one or more input devices, a speech command corresponding to a request to initiate transmission of the message to the first user; and
in response to detecting the speech command, initiating transmission of the message to the first user before the second threshold amount of time has elapsed.

18. The method of claim 1, wherein the representation of the first user is displayed among a plurality of representations of a plurality of users other than the user of the computer system.

19. The method of claim 18, wherein displaying a respective representation of a respective user of the plurality of representations of the plurality of users includes:

in accordance with a determination that the user has an unread message from the respective user, displaying, via the display generation component, the respective representation of the respective user with a visual indication indicating that the user has the unread message from the respective user; and
in accordance with a determination that the user does not have an unread message from the respective user, displaying, via the display generation component, the respective representation of the respective user without the visual indication.

20. The method of claim 19, further comprising:

while displaying the respective representation of the respective user with the visual indication, detecting, via the one or more input devices, the attention of the user directed toward the respective representation of the respective user; and
in response to detecting the attention of the user directed toward the respective representation of the respective user, replacing display of the visual indication with a representation of the unread message received from the respective user.

21. The method of claim 18, wherein the user has an unread message from a respective user of the plurality of users, the method further comprising:

while displaying the plurality of representations of the plurality of users including a respective representation of the respective user, detecting, via the one or more input devices, the attention of the user directed toward the respective representation of the respective user; and
in response to detecting the attention of the user directed toward the respective representation of the respective user, presenting the unread message received from the respective user.

22. The method of claim 21, wherein presenting the unread message received from the respective user includes outputting audio corresponding to the unread message received from the respective user.

23. The method of claim 21, wherein presenting the unread message received from the respective user includes displaying, via the display generation component, a text representation corresponding to the unread message received from the respective user.

24. The method of claim 18, further comprising:

while displaying the plurality of representations of the plurality of users including the representation of the first user, receiving, via the one or more input devices, a second input corresponding to selection of a respective representation of a respective user of the plurality of representations of the plurality of users; and
in response to receiving the second input, initiating a process to participate in live-communication with the respective user.

25. The method of claim 18, further comprising:

while displaying the plurality of representations of the plurality of users including a respective representation of a respective user, detecting, via the one or more input devices, a second input corresponding to a request to transmit a first message to the respective user, wherein the second input includes:
    first speech input from the user directed to the respective representation of the respective user, wherein no previous messages have been recently transmitted to the respective user; and
in response to detecting the second input:
    in accordance with a determination that the first speech input from the user begins with a first word corresponding to a name of the respective user, initiating transmission of the first message to the respective user; and
    in accordance with a determination that the first speech input from the user does not begin with the first word corresponding to the name of the respective user, forgoing initiating transmission of the first message to the respective user.

26. The method of claim 25, further comprising:

after initiating transmission of the first message to the respective user because the first speech input begins with the first word corresponding to the name of the respective user, detecting, via the one or more input devices, a third input corresponding to a request to initiate transmission of a second message and that includes second speech input from the user;
in response to detecting the second input:
    in accordance with a determination that the user has not designated a user other than the respective user to receive messages after initiating transmission of the first message to the respective user:
  initiating transmission of the second message to the respective user; and
in accordance with a determination that the user has designated the user other than the respective user to receive messages after initiating transmission of the first message to the respective user:
  initiating transmission of the second message to the user other than the respective user.

27. The method of claim 1, further comprising:
in response to determining that the first threshold amount of time has elapsed since detecting the end of the speech input:
  in accordance with the determination that the one or more third criteria are satisfied, presenting audio feedback indicating that the message has been sent to the first user.

28. The method of claim 1, wherein the attention of the user satisfies the one or more first criteria when the attention of the user is directed toward the message entry region.

29. The method of claim 28, further comprising:
while detecting the speech input, detecting, via the one or more input devices, the attention of the user directed away from the message entry region; and
in response to detecting the attention of the user directed away from the message entry region, forgoing display, in the message entry region, of additional text representation of one or more portions the speech input detected after detecting the attention of the user directed away from the message entry region.

30. A computer system that is in communication with a display generation component and one or more input devices, the computer system comprising:
one or more processors;
memory; and
one or more programs, wherein the one or more programs are stored in the memory and configured to be executed by the one or more processors, the one or more programs including instructions for:
  displaying, via the display generation component, a representation of a first user other than a user of the computer system;
  while displaying the representation of the first user, detecting, via the one or more input devices, a first input that includes:
    attention of the user of the computer system; and
    speech input from the user while the attention of the user satisfies one or more first criteria;
  in response to detecting the first input, in accordance with a determination that one or more second criteria are satisfied, displaying, via the display generation component, a text representation of the speech input in a message entry region associated with transmitting messages to the first user without providing a representation of the speech input to the first user;
  while displaying the text representation of the speech input in the message entry region and after detecting an end of the speech input, determining that a first threshold amount of time has elapsed since detecting the end of the speech input; and
  in response to determining that the first threshold amount of time has elapsed since detecting the end of the speech input:
    in accordance with a determination that one or more third criteria are satisfied, including a first criterion that is satisfied when the attention of the user has been directed to the message entry region for a second threshold amount of time after detecting the end of the speech input, initiating transmission of a message including the text representation of the speech input to the first user.

31. A non-transitory computer readable storage medium storing one or more programs, the one or more programs comprising instructions, which when executed by one or more processors of a computer system that is in communication with a display generation component and one or more input devices, cause the computer system to perform a method comprising:
displaying, via the display generation component, a representation of a first user other than a user of the computer system;
while displaying the representation of the first user, detecting, via the one or more input devices, a first input that includes:
  attention of the user of the computer system; and
  speech input from the user while the attention of the user satisfies one or more first criteria;
in response to detecting the first input, in accordance with a determination that one or more second criteria are satisfied, displaying, via the display generation component, a text representation of the speech input in a message entry region associated with transmitting messages to the first user without providing a representation of the speech input to the first user;
while displaying the text representation of the speech input in the message entry region and after detecting an end of the speech input, determining that a first threshold amount of time has elapsed since detecting the end of the speech input; and
in response to determining that the first threshold amount of time has elapsed since detecting the end of the speech input:
  in accordance with a determination that one or more third criteria are satisfied, including a first criterion that is satisfied when the attention of the user has been directed to the message entry region for a second threshold amount of time after detecting the end of the speech input, initiating transmission of a message including the text representation of the speech input to the first user.

32. The computer system of claim 30, wherein the one or more programs further include instructions for:
in response to determining that the first threshold amount of time has elapsed since detecting the end of the speech input:
  in accordance with a determination that the one or more third criteria are not satisfied, forgoing initiating transmission of the message including the text representation of the speech input to the first user.

33. The computer system of claim 30, wherein the one or more second criteria include a criterion that is satisfied when the user of the computer system has recently received an indication of communication from the first user.

34. The computer system of claim 30, wherein the one or more second criteria include a criterion that is satisfied when the speech input from the user of the computer system begins with a first word that corresponds to a name of the first user.

35. The computer system of claim 30, wherein the one or more second criteria include a criterion that is satisfied when:
the attention of the user is directed to the representation of the first user when the speech input from the user is received and the speech input from the user begins with a first word that corresponds to a name of the first user; or the attention of the user is directed to the representation of the first user when the speech input from the user is received and the user of the computer system has recently received an indication of communication from the first user.

36. The computer system of claim 30, wherein the one or more programs further include instructions for:

while displaying the text representation of the speech input in the message entry region and after detecting an end of the speech input, determining that one or more fourth criteria are satisfied, including a criterion that is satisfied when the computer system detects a second speech input from the user after detecting the end of the speech input from the user, wherein the second speech input includes a command corresponding to a request to transmit the message to the first user; and in response to determining that the one or more fourth criteria are satisfied, initiating transmission of the message including the text representation of the speech input to the first user.

37. The computer system of claim 36, wherein the one or more fourth criteria include a second criterion that is satisfied when:

the command corresponding to the request to transmit the message to the first user is provided after a third threshold amount of time has elapsed since detecting the end of the speech input; and/or a fourth threshold amount of time elapses after detecting an end of the command without detecting additional speech input.

38. The computer system of claim 30, wherein the one or more third criteria includes a second criterion that is satisfied when the attention of the user is directed to a predefined portion of the message entry region for a duration of the second threshold amount of time, and is not satisfied if the attention of the user is not directed to the predefined portion of the message entry region for the duration of the second threshold amount of time.

39. The computer system of claim 30, wherein the one or more programs further include instructions for:

prior to detecting the first input, in accordance with a determination that the attention of the user of the computer system is directed to the representation of the first user for a third threshold amount of time, displaying, via the display generation component, the message entry region concurrently with the representation of the first user.

40. The computer system of claim 39, wherein:

prior to displaying the message entry region, the representation of the first user is displayed concurrently with a representation of a name of the first user; and prior to detecting the first input, in accordance with the determination that the attention of the user of the computer system is directed to the representation of the first user for the third threshold amount of time, the message entry region replaces display of the representation of the name of the first user.

41. The computer system of claim 30, wherein the one or more programs further include instructions for, while detecting the speech input, updating the message entry region to include sequential portions of the text representation of the speech input as corresponding sequential portions of the speech input are detected.

42. The computer system of claim 30, wherein the second threshold amount of time during which the attention of the user is directed to the message entry region is associated with a timer for initiating transmission of the message to the first user, and wherein the one or more programs further include instructions for:

after detecting the end of the speech input, concurrently displaying, via the display generation component, a visual indication of an elapsing of the timer with the text representation of the speech input in the message entry region.

43. The computer system of claim 30, wherein the second threshold amount of time during which the attention of the user is directed to the message entry region is associated with a timer for initiating transmission of the message to the first user, and wherein the one or more programs further include instructions for:

after detecting the end of the speech input and before the second threshold amount of time has elapsed during which the attention of the user is directed to the message entry region, detecting, via the one or more input devices, the attention of the user directed away from message entry region; and in response to detecting the attention of the user directed away from the message entry region:

pausing an elapsing of the timer; and forgoing initiating transmission of the message to the first user.

44. The computer system of claim 43, wherein the one or more programs further include instructions for:

after detecting the attention of the user directed away from the message entry region, detecting, via the one or more input devices, the attention of the user directed toward the message entry region;

in response to detecting the attention of the user directed toward the message entry region, resuming the elapsing of the timer; and after resuming the elapsing of the timer and in response to determining that the elapsing of the timer has reached the second threshold amount of time, initiating transmission of the message to the first user.

45. The computer system of claim 43, wherein the one or more programs further include instructions for:

after detecting the attention of the user directed away from the message entry region, detecting, via the one or more input devices, a second input that includes:

the attention of the user directed toward the message entry region; and a speech command corresponding to a request to transmit the message to the first user; and in response to detecting the second input, initiating transmission of the message to the first user.

46. The computer system of claim 30, wherein the one or more programs further include instructions for:

after detecting the end of the speech input and before the second threshold amount of time has elapsed during which the attention of the user is directed to the message entry region, detecting, via the one or more input devices, a speech command corresponding to a request to forgo initiating transmission of the message to the first user; and in response to detecting the speech command, forgoing initiating transmission of the message to the first user.

47. The computer system of claim 30, wherein the one or more programs further include instructions for:

after detecting the end of the speech input and before the second threshold amount of time has elapsed during which the attention of the user is directed to the message entry region, detecting, via the one or more input devices, a speech command corresponding to a request to initiate transmission of the message to the first user; and in response to detecting the speech command, initiating transmission of the message to the first user before the second threshold amount of time has elapsed.

48. The computer system of claim 30, wherein the representation of the first user is displayed among a plurality of representations of a plurality of users other than the user of the computer system.

49. The computer system of claim 48, wherein displaying a respective representation of a respective user of the plurality of representations of the plurality of users includes:

in accordance with a determination that the user has an unread message from the respective user, displaying, via the display generation component, the respective representation of the respective user with a visual indication indicating that the user has the unread message from the respective user; and in accordance with a determination that the user does not have an unread message from the respective user, displaying, via the display generation component, the respective representation of the respective user without the visual indication.

50. The computer system of claim 49, wherein the one or more programs further include instructions for:

while displaying the respective representation of the respective user with the visual indication, detecting, via the one or more input devices, the attention of the user directed toward the respective representation of the respective user; and in response to detecting the attention of the user directed toward the respective representation of the respective user, replacing display of the visual indication with a representation of the unread message received from the respective user.

51. The computer system of claim 48, wherein the user has an unread message from a respective user of the plurality of users, and wherein the one or more programs further include instructions for:

while displaying the plurality of representations of the plurality of users including a respective representation of the respective user, detecting, via the one or more input devices, the attention of the user directed toward the respective representation of the respective user; and in response to detecting the attention of the user directed toward the respective representation of the respective user, presenting the unread message received from the respective user.

52. The computer system of claim 51, wherein presenting the unread message received from the respective user includes outputting audio corresponding to the unread message received from the respective user.

53. The computer system of claim 51, wherein presenting the unread message received from the respective user includes displaying, via the display generation component, a text representation corresponding to the unread message received from the respective user.

54. The computer system of claim 48, wherein the one or more programs further include instructions for:

while displaying the plurality of representations of the plurality of users including the representation of the first user, receiving, via the one or more input devices, a second input corresponding to selection of a respective representation of a respective user of the plurality of representations of the plurality of users; and in response to receiving the second input, initiating a process to participate in live-communication with the respective user.

55. The computer system of claim 48, wherein the one or more programs further include instructions for:

while displaying the plurality of representations of the plurality of users including a respective representation of a respective user, detecting, via the one or more input devices, a second input corresponding to a request to transmit a first message to the respective user, wherein the second input includes:

first speech input from the user directed to the respective representation of the respective user, wherein no previous messages have been recently transmitted to the respective user; and in response to detecting the second input:

in accordance with a determination that the first speech input from the user begins with a first word corresponding to a name of the respective user, initiating transmission of the first message to the respective user; and in accordance with a determination that the first speech input from the user does not begin with the first word corresponding to the name of the respective user, forgoing initiating transmission of the first message to the respective user.

56. The computer system of claim 55, wherein the one or more programs further include instructions for:

after initiating transmission of the first message to the respective user because the first speech input begins with the first word corresponding to the name of the respective user, detecting, via the one or more input devices, a third input corresponding to a request to initiate transmission of a second message and that includes second speech input from the user;

in response to detecting the second input:

in accordance with a determination that the user has not designated a user other than the respective user to receive messages after initiating transmission of the first message to the respective user:

initiating transmission of the second message to the respective user; and in accordance with a determination that the user has designated the user other than the respective user to receive messages after initiating transmission of the first message to the respective user:

initiating transmission of the second message to the user other than the respective user.

57. The computer system of claim 30, wherein the one or more programs further include instructions for:

in response to determining that the first threshold amount of time has elapsed since detecting the end of the speech input:

in accordance with the determination that the one or more third criteria are satisfied, presenting audio feedback indicating that the message has been sent to the first user.

58. The computer system of claim 30, wherein the attention of the user satisfies the one or more first criteria when the attention of the user is directed toward the message entry region.

59. The computer system of claim 58, wherein the one or more programs further include instructions for:

while detecting the speech input, detecting, via the one or more input devices, the attention of the user directed away from the message entry region; and in response to detecting the attention of the user directed away from the message entry region, forgoing display, in the message entry region, of additional text representation of one or more portions the speech input detected after detecting the attention of the user directed away from the message entry region.

60. The non-transitory computer readable storage medium of claim 31, wherein the method further comprises:

in response to determining that the first threshold amount of time has elapsed since detecting the end of the speech input:

in accordance with a determination that the one or more third criteria are not satisfied, forgoing initiating transmission of the message including the text representation of the speech input to the first user.

61. The non-transitory computer readable storage medium of claim 31, wherein the one or more second criteria include a criterion that is satisfied when the user of the computer system has recently received an indication of communication from the first user.

62. The non-transitory computer readable storage medium of claim 31, wherein the one or more second criteria include a criterion that is satisfied when the speech input from the user of the computer system begins with a first word that corresponds to a name of the first user.

63. The non-transitory computer readable storage medium of claim 31, wherein the one or more second criteria include a criterion that is satisfied when:

the attention of the user is directed to the representation of the first user when the speech input from the user is received and the speech input from the user begins with a first word that corresponds to a name of the first user; or the attention of the user is directed to the representation of the first user when the speech input from the user is received and the user of the computer system has recently received an indication of communication from the first user.

64. The non-transitory computer readable storage medium of claim 31, wherein the method further comprises:

while displaying the text representation of the speech input in the message entry region and after detecting an end of the speech input, determining that one or more fourth criteria are satisfied, including a criterion that is satisfied when the computer system detects a second speech input from the user after detecting the end of the speech input from the user, wherein the second speech input includes a command corresponding to a request to transmit the message to the first user; and in response to determining that the one or more fourth criteria are satisfied, initiating transmission of the message including the text representation of the speech input to the first user.

65. The non-transitory computer readable storage medium of claim 64, wherein the one or more fourth criteria include a second criterion that is satisfied when:

the command corresponding to the request to transmit the message to the first user is provided after a third threshold amount of time has elapsed since detecting the end of the speech input; and/or a fourth threshold amount of time elapses after detecting an end of the command without detecting additional speech input.

66. The non-transitory computer readable storage medium of claim 31, wherein the one or more third criteria includes a second criterion that is satisfied when the attention of the user is directed to a predefined portion of the message entry region for a duration of the second threshold amount of time, and is not satisfied if the attention of the user is not directed to the predefined portion of the message entry region for the duration of the second threshold amount of time.

67. The non-transitory computer readable storage medium of claim 31, wherein the method further comprises:

prior to detecting the first input, in accordance with a determination that the attention of the user of the computer system is directed to the representation of the first user for a third threshold amount of time, displaying, via the display generation component, the message entry region concurrently with the representation of the first user.

68. The non-transitory computer readable storage medium of claim 67, wherein:

prior to displaying the message entry region, the representation of the first user is displayed concurrently with a representation of a name of the first user; and prior to detecting the first input, in accordance with the determination that the attention of the user of the computer system is directed to the representation of the first user for the third threshold amount of time, the message entry region replaces display of the representation of the name of the first user.

69. The non-transitory computer readable storage medium of claim 31, wherein the method further comprises while detecting the speech input, updating the message entry region to include sequential portions of the text representation of the speech input as corresponding sequential portions of the speech input are detected.

70. The non-transitory computer readable storage medium of claim 31, wherein the second threshold amount of time during which the attention of the user is directed to the message entry region is associated with a timer for initiating transmission of the message to the first user, the method further comprising:

after detecting the end of the speech input, concurrently displaying, via the display generation component, a visual indication of an elapsing of the timer with the text representation of the speech input in the message entry region.

71. The non-transitory computer readable storage medium of claim 31, wherein the second threshold amount of time during which the attention of the user is directed to the message entry region is associated with a timer for initiating transmission of the message to the first user, the method further comprising:

after detecting the end of the speech input and before the second threshold amount of time has elapsed during which the attention of the user is directed to the message entry region, detecting, via the one or more input devices, the attention of the user directed away from message entry region; and in response to detecting the attention of the user directed away from the message entry region:

pausing an elapsing of the timer; and forgoing initiating transmission of the message to the first user.

72. The non-transitory computer readable storage medium of claim 71, wherein the method further comprises:

after detecting the attention of the user directed away from the message entry region, detecting, via the one or more input devices, the attention of the user directed toward the message entry region;

in response to detecting the attention of the user directed toward the message entry region, resuming the elapsing of the timer; and after resuming the elapsing of the timer and in response to determining that the elapsing of the timer has reached the second threshold amount of time, initiating transmission of the message to the first user.

73. The non-transitory computer readable storage medium of claim 71, wherein the method further comprises:

after detecting the attention of the user directed away from the message entry region, detecting, via the one or more input devices, a second input that includes:

the attention of the user directed toward the message entry region; and a speech command corresponding to a request to transmit the message to the first user; and in response to detecting the second input, initiating transmission of the message to the first user.

74. The non-transitory computer readable storage medium of claim 31, wherein the method further comprises:

after detecting the end of the speech input and before the second threshold amount of time has elapsed during which the attention of the user is directed to the message entry region, detecting, via the one or more input devices, a speech command corresponding to a request to forgo initiating transmission of the message to the first user; and in response to detecting the speech command, forgoing initiating transmission of the message to the first user.

75. The non-transitory computer readable storage medium of claim 31, wherein the method further comprises:

after detecting the end of the speech input and before the second threshold amount of time has elapsed during which the attention of the user is directed to the message entry region, detecting, via the one or more input devices, a speech command corresponding to a request to initiate transmission of the message to the first user; and in response to detecting the speech command, initiating transmission of the message to the first user before the second threshold amount of time has elapsed.

76. The non-transitory computer readable storage medium of claim 31, wherein the representation of the first user is displayed among a plurality of representations of a plurality of users other than the user of the computer system.

77. The non-transitory computer readable storage medium of claim 76, wherein displaying a respective representation of a respective user of the plurality of representations of the plurality of users includes:

in accordance with a determination that the user has an unread message from the respective user, displaying, via the display generation component, the respective representation of the respective user with a visual indication indicating that the user has the unread message from the respective user; and in accordance with a determination that the user does not have an unread message from the respective user, displaying, via the display generation component, the respective representation of the respective user without the visual indication.

78. The non-transitory computer readable storage medium of claim 77, wherein the method further comprises:

while displaying the respective representation of the respective user with the visual indication, detecting, via the one or more input devices, the attention of the user directed toward the respective representation of the respective user; and in response to detecting the attention of the user directed toward the respective representation of the respective user, replacing display of the visual indication with a representation of the unread message received from the respective user.

79. The non-transitory computer readable storage medium of claim 76, wherein the user has an unread message from a respective user of the plurality of users, the method further comprising:

while displaying the plurality of representations of the plurality of users including a respective representation of the respective user, detecting, via the one or more input devices, the attention of the user directed toward the respective representation of the respective user; and in response to detecting the attention of the user directed toward the respective representation of the respective user, presenting the unread message received from the respective user.

80. The non-transitory computer readable storage medium of claim 79, wherein presenting the unread message received from the respective user includes outputting audio corresponding to the unread message received from the respective user.

81. The non-transitory computer readable storage medium of claim 79, wherein presenting the unread message received from the respective user includes displaying, via the display generation component, a text representation corresponding to the unread message received from the respective user.

82. The non-transitory computer readable storage medium of claim 76, wherein the method further comprises:

while displaying the plurality of representations of the plurality of users including the representation of the first user, receiving, via the one or more input devices, a second input corresponding to selection of a respective representation of a respective user of the plurality of representations of the plurality of users; and in response to receiving the second input, initiating a process to participate in live-communication with the respective user.

83. The non-transitory computer readable storage medium of claim 76, wherein the method further comprises:

while displaying the plurality of representations of the plurality of users including a respective representation of a respective user, detecting, via the one or more input devices, a second input corresponding to a request to transmit a first message to the respective user, wherein the second input includes:

first speech input from the user directed to the respective representation of the respective user, wherein no previous messages have been recently transmitted to the respective user; and in response to detecting the second input:

in accordance with a determination that the first speech input from the user begins with a first word corresponding to a name of the respective user, initiating transmission of the first message to the respective user; and in accordance with a determination that the first speech input from the user does not begin with the first word corresponding to the name of the respective user, forgoing initiating transmission of the first message to the respective user.

84. The non-transitory computer readable storage medium of claim 83, wherein the method further comprises:

after initiating transmission of the first message to the respective user because the first speech input begins with the first word corresponding to the name of the respective user, detecting, via the one or more input devices, a third input corresponding to a request to initiate transmission of a second message and that includes second speech input from the user;

in response to detecting the second input:
- in accordance with a determination that the user has not designated a user other than the respective user to receive messages after initiating transmission of the first message to the respective user:
  - initiating transmission of the second message to the respective user; and
- in accordance with a determination that the user has designated the user other than the respective user to receive messages after initiating transmission of the first message to the respective user:
  - initiating transmission of the second message to the user other than the respective user.

85. The non-transitory computer readable storage medium of claim 31, wherein the method further comprises:

in response to determining that the first threshold amount of time has elapsed since detecting the end of the speech input:
- in accordance with the determination that the one or more third criteria are satisfied, presenting audio feedback indicating that the message has been sent to the first user.

86. The non-transitory computer readable storage medium of claim 31, wherein the attention of the user satisfies the one or more first criteria when the attention of the user is directed toward the message entry region.

87. The non-transitory computer readable storage medium of claim 86, wherein the method further comprises:

while detecting the speech input, detecting, via the one or more input devices, the attention of the user directed away from the message entry region; and in response to detecting the attention of the user directed away from the message entry region, forgoing display, in the message entry region, of additional text representation of one or more portions the speech input detected after detecting the attention of the user directed away from the message entry region.

* * * * *